(12) United States Patent
Qin et al.

(10) Patent No.: US 10,286,382 B2
(45) Date of Patent: May 14, 2019

(54) SILVER NANOWIRES, METHODS OF MAKING SILVER NANOWIRES, CORE-SHELL NANOSTRUCTURES, METHODS OF MAKING CORE-SHELL NANOSTRUCTURES, CORE-FRAME NANOSTRUCTURES, METHODS OF MAKING CORE-FRAME NANOSTRUCTURES

(71) Applicant: Georgia Tech Research Corporation, Atlanta, GA (US)

(72) Inventors: Dong Qin, Atlanta, GA (US); Younan Xia, Atlanta, GA (US); Yin Yang, Atlanta, GA (US); Jumei Li, Atlanta, GA (US); Xiaojun Sun, Atlanta, GA (US); Robson Rosa da Silva, Inhumas Goiás (BR); Miaoxin Yang, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 15/728,619

(22) Filed: Oct. 10, 2017

(65) Prior Publication Data
US 2018/0050324 A1 Feb. 22, 2018

Related U.S. Application Data

(63) Continuation of application No. 14/858,283, filed on Sep. 18, 2015, now Pat. No. 9,878,306.

(60) Provisional application No. 62/052,677, filed on Sep. 19, 2014.

(51) Int. Cl.
| | |
|---|---|
| *B01J 23/50* | (2006.01) |
| *B01J 35/02* | (2006.01) |
| *B22F 9/24* | (2006.01) |
| *B01J 37/02* | (2006.01) |
| *B01J 37/16* | (2006.01) |
| *B01J 35/00* | (2006.01) |
| *B01J 35/06* | (2006.01) |
| *B22F 1/00* | (2006.01) |
| *B22F 9/26* | (2006.01) |
| *C23F 1/02* | (2006.01) |
| *C23F 1/30* | (2006.01) |

(52) U.S. Cl.
CPC ............ *B01J 23/50* (2013.01); *B01J 35/008* (2013.01); *B01J 35/0013* (2013.01); *B01J 35/023* (2013.01); *B01J 35/026* (2013.01); *B01J 35/06* (2013.01); *B01J 37/0219* (2013.01); *B01J 37/0225* (2013.01); *B01J 37/16* (2013.01); *B22F 1/0025* (2013.01); *B22F 9/24* (2013.01); *B22F 9/26* (2013.01); *B01J 35/002* (2013.01); *B22F 2001/0037* (2013.01); *C23F 1/02* (2013.01); *C23F 1/30* (2013.01)

(58) Field of Classification Search
CPC ...... B01J 23/50; B01J 35/0013; B01J 35/008; B01J 35/023; B01J 35/026; B01J 35/06; B01J 37/0219; B01J 37/0225; B01J 37/16; B22F 1/0025; B22F 9/24; B22F 9/26
USPC ......................................................... 502/330
See application file for complete search history.

(56) References Cited

U.S. PATENT DOCUMENTS

| | | | |
|---|---|---|---|
| 2013/0004765 A1 | 1/2013 | Zou et al. | |
| 2014/0020737 A1 | 1/2014 | Jung et al. | |
| 2014/0255708 A1 | 9/2014 | Philip, Jr. et al. | |
| 2014/0262454 A1 | 9/2014 | Zou et al. | |
| 2015/0283615 A1* | 10/2015 | Wang | B22F 9/24 75/370 |
| 2016/0114395 A1* | 4/2016 | Kim | B22F 9/20 252/514 |
| 2016/0325352 A1* | 11/2016 | Alsayed | C08F 226/10 |
| 2016/0361724 A1* | 12/2016 | Athens | B22F 9/24 |

OTHER PUBLICATIONS

N.Murshid et al. "Gold plating of silver nanoparticles for superior stability . . . " Chem. Commun. 2013, 49, 11355-11357.*
Seo, D.; Yoo, C. I.; Park, J. C.; Park, S. M.; Ryu, S.; Song, H. Angew. Chem. Int. Ed. 2008, 47, 775.
Shahjamali, M. M.; Bosman, M.; Cao, S.; Huang, X.; Saadat, S.; Martinsson, E.; Aili, D.; Tay, Y. Y.; Liedberg, B.; Loo, S. C. J.; Zhang, H.; Boey, F.; Xue, C. Adv. Funct. Mater. 2012, 22, 849.
Sherry, L. J.; Chang, S.-H.; Schatz, G. C.; Van Duyne, R. P.; Willey, B. J.; Xia, Y. Nano Lett. 2005, 5, 2034.
Skrabalak, S. E.; Wiley, B. J.; Kim, M.; Formo, E. V.; Xia, Y., On the polyol synthesis of silver nanostructures: glycolaldehyde as a reducing agent. Nano letters 2008, 8 (7), 2077-81.
Song, Y. J.; Wang, M.; Zhang, X. Y.; Wu, J. Y.; Zhang, T., Investigation on the role of the molecular weight of polyvinyl pyrrolidone in the shape control of high-yield silver nanospheres and nanowires. Nanoscale research letters 2014, 9 (1), 17.
Stiles, P. L.; Dieringer, J. A.; Shah, N. C.; Van Duyne, R. R Annu. Rev. Anal. Chem. 2008, 1, 601.

(Continued)

*Primary Examiner* — Leszek B Kiliman
(74) *Attorney, Agent, or Firm* — Thomas | Horstemeyer, LLP

(57) ABSTRACT

In accordance with the purpose(s) of the present disclosure, as embodied and broadly described herein, embodiments of the present disclosure provide for silver nanowires, methods of making silver nanowires, core-shell nanostructures, methods of making core-shell nanostructures, core-frame nanostructures, methods of making core-frame nanostructures, and the like.

8 Claims, 39 Drawing Sheets

(56) References Cited

OTHER PUBLICATIONS

Straney, P. J.; Marbella, L. E.; Andolina, C. M.; Nuhfer, N. T.; Millstone, J. E. J. Am. Chem. Soc. 2014, 136, 7873.
Sun, Y.; Wang, Y. Nano Lett. 2011, 11, 4386.
Sun, Y.; Xia, Y., Large-Scale Synthesis of Uniform Silver Nanowires Through a Soft, Self-Seeding, Polyol Process. Advanced Materials 2002, 14 (11), 833.
Sun, Y.; Mayers, B.; Xia, Y. Adv. Mater. 2003, 15, 641.
Sun, Y.; Yin, Y.; Mayers, B. T.; Herricks, T.; Xia, Y., Uniform Silver Nanowires Synthesis by Reducing AgNO3 with Ethylene Glycol in the Presence of Seeds and Poly(Vinyl Pyrrolidone). Chemistry of Materials 2002, 14 (11), 4736-4745.
Sun; Y. Xia, Y. J. Am. Chem. Soc. 2004, 126, 3892-3901.
Sun, Y.; Gates, B.; Mayers, B.; Xia, Y., Crystalline Silver Nanowires by Soft Solution Processing. Nano letters 2002, 2 (2), 165-168.
Sun, Y.; Mayers, B.; Herricks, T.; Xia, Y., Polyol Synthesis of Uniform Silver Nanowires: A Plausible Growth Mechanism and the Supporting Evidence. Nano letters 2003, 3 (7), 955-960.
Zhang, H.; Jin, M.; Xia, Y. Angew. Chem. Int. Ed. 2012, 51, 7656-7673.
Tao, A.; Sinsermsuksakul, P.; Yang, P. Angew. Chem. Int. Ed. 2006, 45, 4597.
Tao, A.; Sinsermsuksakul, P.; Yang, P. Nat. Nanotechnol. 2007, 2, 435.
Tian, Z.-Q.; Ren, B. Annu. Rev. Phys. Chem. 2004, 55, 197.
Tian, Z.-Q.; Ren, B.; Li, J.-F.; Yang, Z.-L. Chem. Commun. 2007, 34, 3514.
Ulman, A. Chem. Rev. 1996, 96, 1533.
Valley, N.; Greeneltch, N.; Van Duyne, R. P.; Schatz, G. C. J. Phys. Chem. Lett. 2013, 4, 2599.
Wang, F.; Li, C. H.; Sun, L. D.; Xu, C.-H.; Wang, J. F.; Yu, J. C.; Yan, C.-H. Angew. Chem. Int. Ed. 2012, 51, 4872.
Wang, X.; Zhang, Z.; Hartland, G. V. J. Phys. Chem. B 2005, 109, 20324.
Weiner, R. G.; DeSantis, C. J.; Cardoso, M. B. T.; Skrabalak, S. E. ACS Nano 2014, 8, 8625.
Wiley, B. J.; Chen, Y.; McLellan, J. M.; Xiong, Y.; Li, Z. Y.; Ginger, D.; Xia, Y., Synthesis and optical properties of silver nanobars and nanorice. Nano letters 2007, 7 (4), 1032-6.
Wiley, B. J.; Xiong, Y.; Li, Z. Y.; Yin, Y.; Xia, Y., Right bipyramids of silver: a new shape derived from single twinned seeds. Nano letters 2006, 6 (4), 765-8.
Wiley, B.; Herricks, T.; Sun, Y.; Xia, Y., Polyol Synthesis of Silver Nanoparticles: Use of Chloride and Oxygen to Promote the Formation of Single-Crystal, Truncated Cubes and Tetrahedrons. Nano letters 2004, 4 (9), 1733-1739.
Wiley, B.; Sun, Y.; Xia, Y., Polyol synthesis of silver nanostructures: control of product morphology with Fe(II) or Fe(III) species. Langmuir : the ACS journal of surfaces and colloids 2005, 21 (18), 8077-80.
Willets K. A.; Van Duyne, R. P. Ann. Rev. of Phys. Chem. 2007, 58, 267-297.
Wu, J.; Gao, W.; Wen, J.; Miller, D. J.; Lu, P.; Zuo, J.-M.; Yang, H. Nano Lett. 2015, DOI: 10.1021/acs.nanolett.5b00414.
Wu, D.-Y.; Liu, X.-M.; Duan, S.; Xu, X.; Ren, B.; Lin, S.-H.; Tian, Z.- Q. J. Phys. Chem. C 2008, 112, 4195.
Wu, Y.; Wang, D.; Zhou, G.; Yu, R.; Chen, C.; Li, Y. J. Am. Chem. Soc. 2014, 136, 11594.
Xia, B. Y.; Wu, H. B.; Wang, X.; Lou, X. W. Angew. Chem. Int. Ed. 2013, 52, 12337.
Xia, X.; Figueroa-Cosme, L.; Tao, J.; Peng, H.-C.; Niu, G.; Zhu, Y.; Xia, Y. J. Am. Chem. Soc. 2014, 136, 10878.
Xia, X.; Wang, Y.; Ruditskiy, A.; Xia, Y. Adv. Mater. 2013, 25, 6313.
Xia, X.; Xie, S.; Liu, M.; Peng, H.-C.; Lu, N.; Wang, J.; Kim, M. J.; Xia. Y. Proc. Natl. Acad. Sci. USA 2013, 110, 6669-6673.
Xia, X.; Zeng, J.; McDearmon, B.; Zheng, Y.; Li, Q.; Xia, Y. Angew. Chem. Int. Ed. 2011, 123, 12750.
Xia, X.; Zeng, J.; Oetjen, L. K.; Li, Q.; Xia, Y. J. Am. Chem. Soc. 2012, 134, 1793.
Xia, Y.; Li, W.; Cobley, C. M.; Chen, J.; Xia, X.; Zhang, Q.; Yang, M.; Cho, E. C.; Brown, P. K. Acc. Chem. Res. 2011, 44, 914-924.
Xia, Y.; Xiong, Y.; Lim, B.; Skrabalak, S. E. Angew. Chem. Int. Ed. 2009, 48, 60-103.
Xie, W.; Herrmann, C.; Kompe, K.; Haase, M.; Schlucker, S. J. Am. Chem. Soc. 2011, 133, 19302.
Xiong, Y.; Cai, H.; Wiley, B. J.; Wang, J.; Kim, M. J.; Xia, Y., Synthesis and mechanistic study of palladium nanobars and nanorods. Journal of the American Chemical Society 2007, 129 (12), 3665-75.
Yang, Y.; Liu, J.; Fu, Z. W.; Qin, D. J. Am. Chem. Soc. 2014, 136, 8153-8156.
Yang, Y.; Zhong, X.-L.; Zhang, Q.; Blackstad, L. G.; Fu, Z.-W.; Li, Z.-Y.; Qin, D. Small 2014, 10, 1430.
Yang, Y.; Zhang, Q.; Fu, Z.-W.; Qin, D. ACS Appl. Mater. Interfaces 2014, 6, 3750-3757.
Yim, J. H.; Joe, S. Y.; Pang, C.; Lee, K. M.; Jeong, H.; Park, J. Y.; Ahn, Y. H.; de Mello, J. C.; Lee, S., Fully solution-processed semitransparent organic solar cells with a silver nanowire cathode and a conducting polymer anode. ACS nano 2014, 8 (3), 2857-63.
Yoo, H.; Millstone, J. E.; Li, S.; Jang, J.-W.; Wei, W.; Wu, J.; Schatz, G. G.; Mirkin, C. A. Nano Left. 2009, 9, 3038.
Zeng, X.; Zhou, B.; Gao, Y.; Wang, C.; Li, S.; Yeung, C. Y.; Wen, W., Structural dependence of silver nanowires on polyvinyl pyrrolidone (PVP) chain length. Nanotechnology 2014, 25 (49), 495601.
Zhang, H.; Jin, M.; Liu, H.; Wang, J.; Kim, M. J.; Yang, D.; Xie, Z.; Liu, J.; Xia, Y. ACS Nano 2011, 5, 8212.
Zhang, H.; Jin, M.; Xia, Y. Chem. Soc. Rev. 2012, 41, 8035-8049.
Zhang, J.; Hou, C.; Huang, H.; Zhang, L.; Jiang, Z.; Chen, G.; Jia, Y.; Kuang, Q.; Xie, Z.; Zheng, L. Small 2013, 9, 538.
Zhang, L.; Niu, W. ; Gao, W. ; Qi, L. ; Lai, J. ; Zhao, J. ; Xu, G. ACS Nano 2014, 8, 5953.
Zhang, Q.; Lee, I; Joo, J. B.; Zaera, F.; Yin, Y. Acc. Chem. Res. 2013, 44, 1618-1824.
Zhang Q., Li W., Wen L. P., JChen. and Xia Y., Chem. Eur. J., 2010, 16, 10234-10239.
Zhang, Q.; Moran, C. H.; Xia, X.; Rycenga, M.; Li, N.; Xia, Y., Synthesis of Ag nanobars in the presence of single-crystal seeds and a bromide compound, and their surface-enhanced Raman scattering (SERS) properties. Langmuir : the ACS journal of surfaces and colloids 2012, 28 (24), 9047-54.
Zhang, W.; Yang, J.; Lu, X. ACS Nano 2012, 6, 7397-405.
Zheng, Y.; Zeng, J.; Ruditskiy, A.; Liu, M.; Xia, Y., Oxidative Etching and Its Role in Manipulating the Nucleation and Growth of Noble-Metal Nanocrystals. Chemistry of Materials 2014, 26 (1), 22-33.
Zhu, J.-J.; Kan, C.-X.; Wan, J.-G.; Han, M.; Wang, G.-H., High-Yield Synthesis of Uniform Ag Nanowires with High Aspect Ratios by Introducing the Long-Chain PVP in an Improved Polyol Process. Journal of Nanomaterials 2011, 2011, 1-7.
Zhu, W.; Michalsky, R.; Metin, Ö.; Lv, H.; Guo, S.; Wright, C. J.; Sun, X.; Peterson, A. A. ; Sun, S. J. Am. Chem. Soc. 2013, 135, 16833.
Zou, S.; Chan, H. Y. H.; Williams, C. T.; Weaver, M. J. Langmuir 2000, 16, 754.
Lee, H.; Habas, S. E.; Kweskin, S.; Butcher, D.; Somorjai, G. A.; Yang, P. Morphological Control of Catalytically Active Platinum Nanocrystals. Angew. Chem. Int. Ed. 2006, 45, 7824-7828.
Lee, E.-J.; Chang, M.-H.; Kim, Y.-S.; Kim, J.-Y., High-pressure polyol synthesis of ultrathin silver nanowires: Electrical and optical properties. APL Materials 2013, 1 (4), 042118.
Li, J.; Liu, J.; Yang, Y.; D. Qin, J. Am. Chem. Soc. 2015, 137, 7039-7042.
Li, W.; Camargo, P. H. C.; Lu, X.; Y.; Xia, Y. Nano Lett. 2009, 9, 485.
Liang, H. P.; Zhang, H. M.; Hu, J. S.; Guo, Y. G.; Wan, L. J.; Bai, C. L. Angew. Chem. Int. Ed. 2004, 43, 1540-1541.
Lim, I.-I. S.; Chandrachud, U.; Wang, L.; Gal, S.; Zhong, C.-J. Anal. Chem. 2008, 80, 6038.
Link, S.; Wang, Z. L.; El-Sayed, M. A. J. Phys. Chem. B, 1999, 103, 3529-3533.
Lismont, M.; Dreesen, L. Mater. Sci. Eng. C 2012, 32, 1437-1442.
Liu, X.; Yin, Y.; Gao, C. Langmuir, 2013, 29, 10559.

(56) References Cited

OTHER PUBLICATIONS

Lohse, S. E.; Burrows, N. D.; Scarabelli, L.; Liz- Marzán L. M.; Murphy, C. J. Chem. Mater. 2014, 26, 34-43.
Luty-Blocho, M.; Paclawski, K.; Wojnicki, M.; Fitzner, K. Inorg. Chim. Acta. 2013, 395, 189; b) Personick, M.; Mirking, C. A. J. Am. Chem. Soc. 2013, 135, 18238.
Macfarlane, R. J.; Langille, M. R.; Mirkin, C. A. Chem. Rev. 2011, 111, 3736-3827.
Mahmoud, M. A.; El-Sayed, M.A. Langmuir 2012, 28, 4051.
Mahmoud, M. A.; Tabor, C. E.; El-Sayed, M. A.; Ding, Y.; Wang, Z. L. J. Am. Chem. Soc. 2008, 130, 4590.
Mallin, M. P.; Murphy, C. J. Nano. Lett. 2002, 2, 1235-1237.
Marks, L. D.; Smith, D. J., High resolution studies of small particles of gold and silver. Journal of Crystal Growth 1981, 54 (3), 425-432.
McEachran, M.; Keogh, D.; Pietrobon, B.; Cathcart, N.; Gourevich, I.; Coombs, N.; Kitaev, V. J. Am. Chem. Soc. 2011, 133, 8066.
McLellan, J. M.; Li, Z.-Y.; Siekkinen, A. R.; Xia, Y. Nano Lett. 2007, 7, 1013.
McLellan, J. M.; Xiong, Y.; Hu, M.; Xia, Y. Chem. Phys. Lett. 2006, 417, 230.
Milazzo, G.; Caroli, S.; Braun, R. D. J. Electrochem. Soc. 1978, 125, 261C-261C.
Miller, M. S.; O'Kane, J. C.; Niec, A.; Carmichael, R. S.; Carmichael, T. B., Silver nanowire/optical adhesive coatings as transparent electrodes for flexible electronics. ACS applied materials & interfaces 2013, 5 (20), 10165-72.
Millstone, J. E.; Hurst, S. J.; Métraux, G. S.; Cutler, J. I.; Mirkin, C. A. Small 2009, 5, 646.
Morton, S. M.; Jensen, L. J. Am. Chem. Soc. 2009, 131, 4090.
Murphy, C. J.; Sau, T. K.; Gole, A.; Orendorff, C. J. MRS Bulletin 2005, 30, 349-355.
Murshid, N.; Gourevich, I.; Coombs, N.; Kitaev, V. Chem. Commun. 2013, 49, 11355-11357.
Nam, S.; Song, M.; Kim, D. H.; Cho, B.; Lee, H. M.; Kwon, J. D.; Park, S. G.; Nam, K. S.; Jeong, Y.; Kwon, S. H.; Park, Y. C.; Jin, S. H.; Kang, J. W.; Jo, S.; Kim, C. S., Ultrasmooth, extremely deformable and shape recoverable Ag nanowire embedded transparent electrode. Scientific reports 2014, 4, 4788.
Nicewarner-Pena, S. R.; Freeman, R. G.; Reiss, B. D.; He, L.; Pena, D. J.; Walton, I. D.; Cromer, R.; Keating, C. D.; Natan, M. J. Science 2001, 294, 137.
Nie, S.; Emory, S. R. Science 1997, 275, 1102.
Nikoobakht, B.; El-Sayed, M. A. Chem. Mater. 2003, 15, 1957-1962.
Niu, W.; Zhang, L; Xu, G. Nanoscale 2013, 5, 3172-3181.
Peng, H. C.; Xie, S.; Park, J.; Xia, X.; Xia, Y., Quantitative analysis of the coverage density of Br- ions on Pd{100} facets and its role in controlling the shape of Pd nanocrystals. Journal of the American Chemical Society 2013, 135 (10), 3780-3.
Peng, Z.; Yang, H. J. Am. Chem. Soc. 2009, 131, 7542-7543.
Personick, M. L.; Langille, M. R.; Wu, J.; Mirkin, C. A. J. Am. Chem. Soc. 2013, 135, 3800.
Pietrobon, B.; McEachran, M.; Kitaev, V. ACS Nano 2009, 3, 21.
Pradhan, N.; Pal, A.; Pal, T. Langmuir, 2001, 17, 1800-1802.
Qian, X. M. X.; Peng, H.; Ansari, D. O.; Yin-Goen, Q.; Chen, G. Z.; Shin, D. M.; Yang, L.; Young, A. N.; Wang M. D.; Nie, S. M. Nat. Biotech. 2008, 26, 83-90.
Ran, Y.; He, W.; Wang, K.; Ji, S.; Ye, C., A one-step route to Ag nanowires with a diameter below 40 nm and an aspect ratio above 1000. Chem Commun 2014, 50 (94), 14877-80.
Ringe, E.; Van Duyne, R. P.; Marks, L. D., Kinetic and Thermodynamic Modified Wulff Constructions for Twinned Nanoparticles. The Journal of Physical Chemistry C 2013, 117 (31), 15859-15870.
Rogers, J. A.; Someya, T.; Huang, Y. Science 2010, 327, 1603.
Rosi, N. L.; Mirkin, C. A. Chem. Rev. 2005, 105, 1547-1562.
Ruditskiy, A.; Choi, S.; Peng, H.-C.; Xia, Y. MRS Bulletin 2014, 39, 727.
Rycenga, M.; Cobley, C. M.; Zeng, J.; Li, W.; Moran, C. H.; Zhang, Q.; Qin, D.; Xia, Y. Chem. Rev. 2011, 111, 3669-3712.
Rycenga, M.; Hou, K. K.; Cobley, C. M.; Schwartz, A. G.; Camargo, P. H. C.; Xia, Y. Phys. Chem. Chem. Phys. 2009, 11, 5903.
Rycenga, M.; Xia, X.; Moran, C. H.; Zhou, F.; Qin, D.; Li, Z.-Y.; Xia, Y. Angew. Chem. Int. Ed. 2011, 50, 5473.
Sarnal, A. K.; Polavarapu, L.; Rodal-Cedeira, S.; Liz-Marzán, L.M.; Pérez-Juste, J.; Pastoriza-Santos, I. Langmuir, 2013, 29, 15076-15082.
Sanedrin, R. G.; Georganopoulou, D. G.; Park, S.; Mirkin, C. A. Adv. Mater. 2005, 17, 1027.
Sau, T. K.; Murphy, C. J. J. Am. Chem. Soc. 2004, 126, 8648.
Scardaci, V.; Caull, R.; Lyons, P. E.; Rickard, D.; Coleman, J. N., Spray deposition of highly transparent, low-resistance networks of silver nanowires over large areas. Small 2011, 7 (18), 2621-8.
Schatz, G. C. Acc. Chem. Res. 1984, 17, 370.
Seo, D.; Song, H. J. Am. Chem. Soc. 2009, 131, 18210.
Alvarez-Puebla, R. A. J. Phys. Chem. Lett. 2012, 3, 857.
Bergin, S. M.; Chen, Y. H.; Rathmell, A. R.; Charbonneau, P.; Li, Z. Y.; Wiley, B. J., The effect of nanowire length and diameter on the properties of transparent, conducting nanowire films. Nanoscale 2012, 4 (6), 1996-2004.
Burda C.; Chen, X.; Narayanan, R.; El-Sayed, M. A., Chemistry and properties of nanocrystals of different shapes. Chemical reviews 2005, 105 (4), 1025-102.
Cai, W.; Tang, X.; Sun, B.; Yang, L. Nanoscale 2014, 6, 7954.
Chen, J.; Wiley, B.; McLellan, J.; Xiong, Y.; Li, Z.-Y. Xia, Y. Nano Lett. 2005, 5, 2058-2062.
Chen, Y.-S.; Hung, H. -H.; Huang, M. H. J. Am. Chem. Soc. 2009, 131, 9114.
Cho, S. H.; Han, H. S.; Jang, D. J.; Kim, K.; Kim, M. S. J. Phys. Chem. 1995, 99, 10594.
Cobley, C. M.; Chen, J.; Cho, E. C.; Wang, L. V.; Xia, Y. Chem. Soc. Rev. 2011, 40, 44.
Coronado, E. A.; Schatz, G. C. J. Chem. Phys. 2003, 119, 3926.
Crane, C.C.; Tao, J.; Wang, F.; Zhu, Y.; Chen, J. J. Phys. Chem. C 2014, 118, 28134-28142.
Dasgupta, N. P.; Liu, C.; Andrews, S.; Prinz, F. B. Yang, P. J. Am. Chem. Soc. 2013, 135, 12932.
De, S.; Higgins, T. M.; Lyons, P. E.; Doherty, E. M.; Nirmalraj, P. N.; Blau, W. J.; Boland, J. J.; Coleman, J. N., Silver Nanowire Networks as Flexible, Transparent, Conducting Films: Extremely High DC to Optical Conductivity Ratios. ACS nano 2009, 3 (7), 1767-74.
DeSantis, C. J.; Peverly, A. A.; Peters, D. G.; Skrabalak, S. E. Nano Lett. 2011, 11, 2164.
DeSantis, C. J.; Weiner, R.; Radmilovic, A.; Bower, M. M. ;Skrabalak, S. E. J. Phy. Chem. Left., 2013, 4, 3072-3082.
Dick, L. A.; McFarland, A. D.; Haynes, C. L.; Van Duyne, R. P. J. Phys. Chem. B 2002, 106, 853.
Eisele, D. M.; Berlepsch, H. V.; Bottcher, C.; Stevenson, K. J.; Vanden Bout, D. A.; Kirstein, S.; Rabe, J. P., Photoinitiated growth of sub-7 nm silver nanowires within a chemically active organic nanotubular template. Journal of the American Chemical Society 2010, 132 (7), 2104-5.
Gao, C.; Goebl, J.; Yin Y. J. Mater. Chem. C, 2013, 1, 3898-3909.
Gao, C.; Lu, Z.; Liu Y.; Zhang, Q.; Chi M.; Cheng, Q.; Yin, Y. Angew. Chem. Int. Ed. 2012, 51, 5629.
Gao, Y.; Jiang, P.; Liu, D. F.; Yuan, H. J.; Yan, X. Q.; Zhou, Z. P.; Wang, J. X.; Song, L.; Liu, L. F.; Zhou, W. Y.; Wang, G.; Wang, C. Y.; Xie, S. S.; Zhang, J. M.; Shen, D. Y., Evidence for the Monolayer Assembly of Poly(vinylpyrrolidone) on the Surfaces of Silver Nanowires. The Journal of Physical Chemistry B 2004, 108 (34), 12877-12881.
García de Abajo, F. J. Rev. Mod. Phys. 2007, 79, 1267.
Guerrero-Martínez, A.; Barbosa, S.; Pastoriza-Santos, I.; Liz-Marzán, L.M. Cum Op. Colloid Interface Sci. 2011, 16, 118-127.
Habas, S.; Lee, H.; Radmilovic, V.; Somorjai, G. A.; Yang, P. Nature Mater. 2007, 6, 692.
Haes, A. J.; Haynes, C. L.; McFarland, A. D.; Schatz, G. C.; Van Duyne, R. P.; Zou, S. MRS Bulletin 2005, 30, 368-375.
Halas, N. J.; Lai, S.; Chang, W. S.; Link, S.; Nordlander, P. Chem. Rev. 2011, 111, 3913-3961.

(56) References Cited

OTHER PUBLICATIONS

Ramberg, I.; Granqvist, C. G., Evaporated Sn-doped In2O3 films: Basic optical properties and applications to energy-efficient windows. Journal of Applied Physics 1986, 60 (11), R123.

Hecht D. S.; Hu, L.; Irvin, G., Emerging transparent electrodes based on thin films of carbon nanotubes, graphene, and metallic nanostructures. Advanced materials 2011, 23 (13), 1482-513.

Heck, K. N.; Janesko, B. G.; Scuseria, G. E.; Halas, N. J.; Wong, M. S. J. Am. Chem. Soc. 2008, 130, 16592.

Herrero, E.; Buller, L. J.; Abruna, H. D. Chem. Rev. 2001, 101, 1897-1930.

Hong, J. W.; Kang, S. W.; Choi, B.-S.; Kim, D.; Lee, S. B. Han S. W. ACS Nano 2012, 3, 2410-2419.

Hu, J.-W.; Zhang, Y.; Li, J.-F.; Liu, Z.; Ren, B.; Sun, S.-G.; Tian, Z.-Q.; Lian, T. Chem. Phys. Lett. 2005, 408, 354.

Hu, L.; Kim, H. S.; Lee, J. Y.; Peumans, P.; Cui, Y., Scalable coating and properties of transparent, flexible, silver nanowire electrodes. ACS nano 2010, 4 (5), 2955-63.

Hu Y, Liu Y, Sun Y. Mesoporous Colloidal Superparticles of Platinum-Group Nanocrystals with Surfactant-Free Surfaces and Enhanced Heterogeneous Catalysis. Adv. Funct. Mater. 2015, 25, 1638-1647.

Huang, J.; Zhu, Y.; Lin, M.; Wang, Q.; Zhao, L.; Yang, Y.; Yao, K. X.; Han, Y. J. Am. Chem. Soc. 2013, 135, 8552.

Jakab et al. Highly Sensitive Plasmonic Silver Nanorods, ACS Nano. 2011, vol. 5, No. 9, 6880-6885.

Jana, N. R.; Gearheart, L.; Murphy, C. J. J. Phys. Chem. B 2001, 105, 4065-4067.

Jing, H.; Wang, H. Chem. Mater. 2015, DOI: 10.1021/acs.chemmater.5b00199.

Jing, H.; Zhang, Q.; Large, N.; Yu, C.; Blom, D. A.; Nordlander, R; Wang, H. Nano Lett. 2014, 14, 3674-3682.

Johnson, C. J.; Dujardin, E.; Davis, S. A.; Murphy, C. J.; Mann, S., Growth and form of gold nanorods prepared by seed-mediated, surfactant-directed synthesis. Journal of Materials Chemistry 2002, 12 (6), 1765-1770.

Johnson, P.; Christy, R. Phys. Rev. B: Solid State, 1972, 6, 4370-4379.

Jones, R. M.; Osberg, K. D.; Macfarlane, R. J.; Langille, M. R.; Mirkin, C. A. Chem. Rev. 2011, 111, 3736.

Joo, S. H.; Park, J. Y.; Tsung, C. K.; Yamada, Y.; Yang, P.; Somorjai, G. A. Nat. Mater. 2009, 8, 126-131.

Kang, M. G.; Xu, T.; Park, H. J.; Luo, X.; Guo, L. J., Efficiency enhancement of organic solar cells using transparent plasmonic Ag nanowire electrodes. Adv Mater 2010, 22 (39), 4378-83.

Kelly, K. L.; Coronado, E.; Zhao, L. L.; Schatz, G. C., The Optical Properties of Metal Nanoparticles: The Influence of Size, Shape, and Dielectric Environment. The Journal of Physical Chemistry B 2003, 107 (3), 668-677.

Kim, H.; Kosuda, K. M.; Van Duyne, R. P.; Stair, P. C. Chem. Soc. Rev. 2010, 39, 4820.

Kneipp, K.; Kneipp, H.; Itzkan, I.; Dasari, R. R.; Feld, M. S. Chem. Rev. 1999, 99, 2957.

Knight, M. W.; Sobhani, H.; Nordlander, P.; Halas, N. J. Science, 2011, 332, 702-704.

Korte, K. E.; Skrabalak, S. E.; Xia, Y., Rapid synthesis of silver nanowires through a CuCl- or CuCl2-mediated polyol process. Journal of Materials Chemistry 2008, 18 (4), 437.

Kumar, A.; Zhou, C., The race to replace tin-doped indium oxide: which material will win? ACS Nano 2010, 4 (1), 11-4.

Lal, S.; Clare, S. E.; Halas, N. J. Am Chem. Res. 2008, 41, 1842-1851.

Langile, M. R.; Personick, M. L.; Zhang, J.; Mirkin, C. A. Am. Chem. Soc. 2013, 134, 14542-14554.

\* cited by examiner

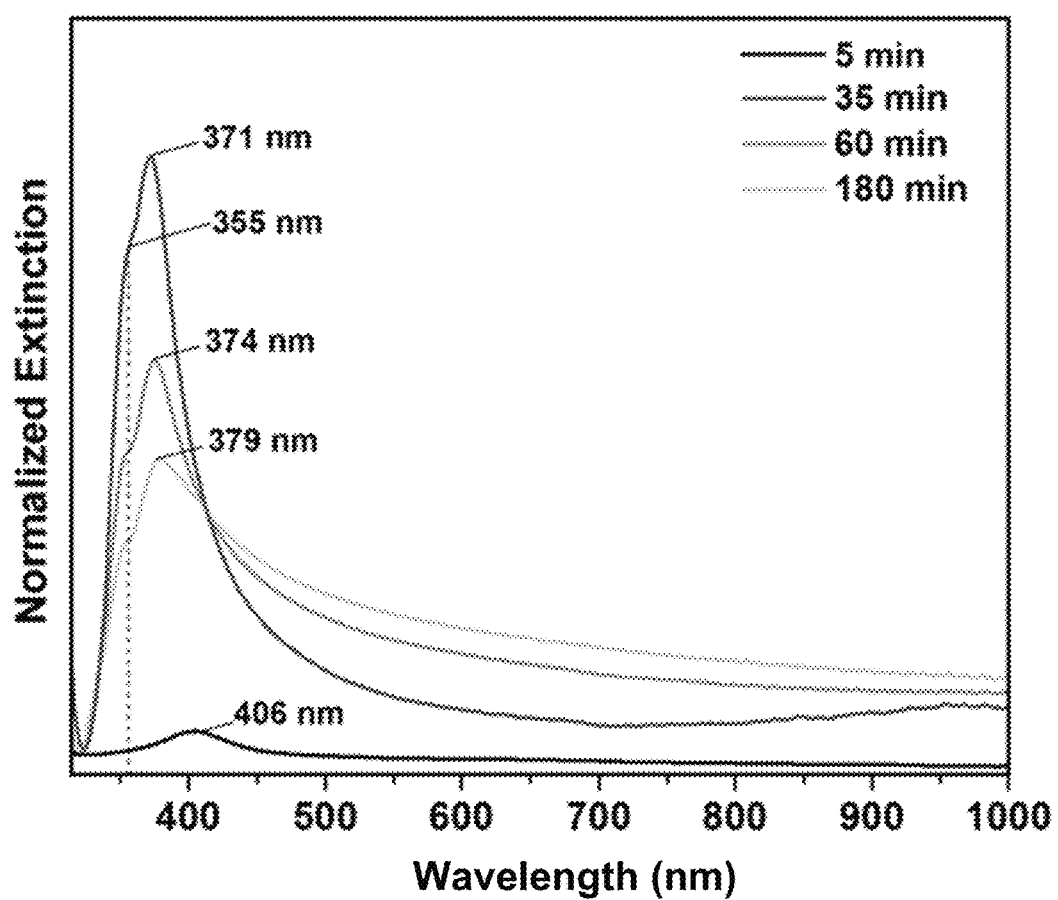
Fig. 1.1

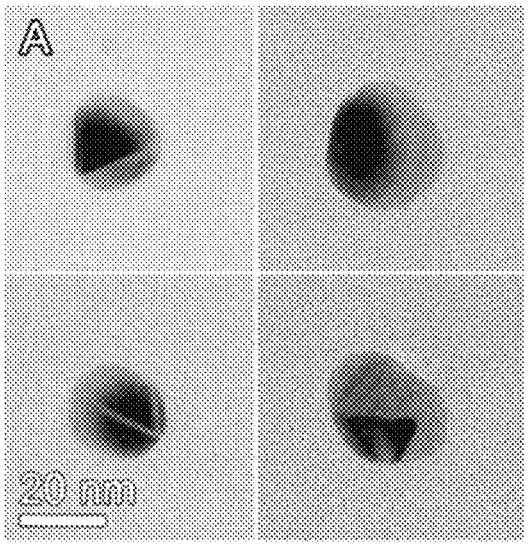
Fig. 1.2A
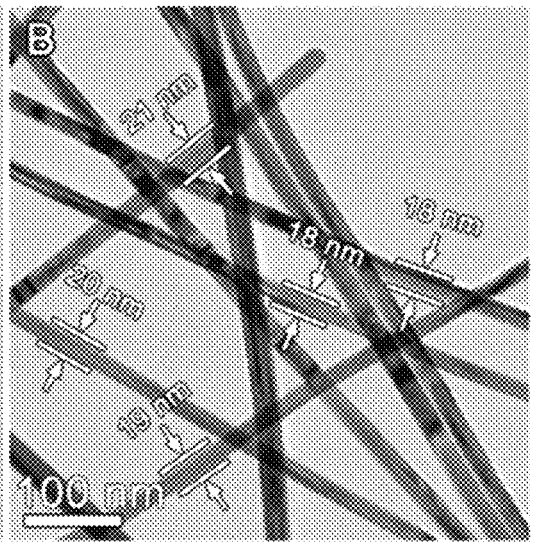
Fig. 1.2B
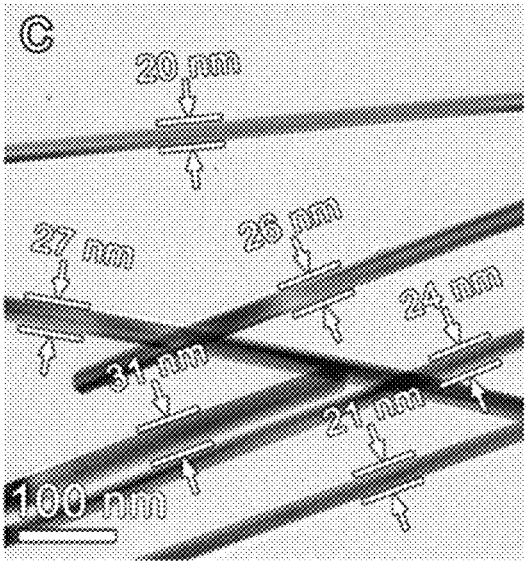
Fig. 1.2C
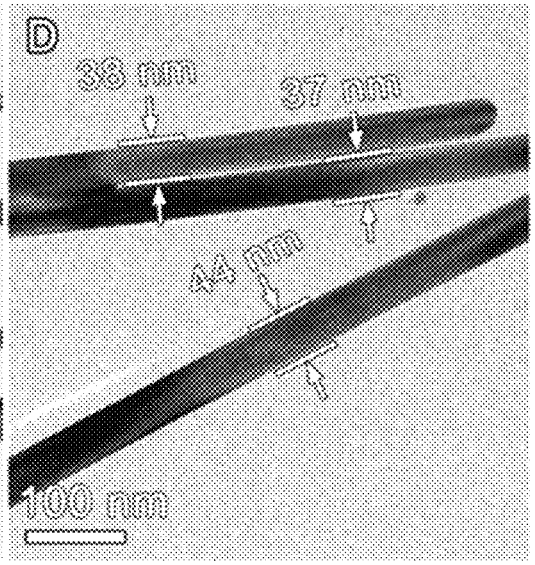
Fig. 1.2D

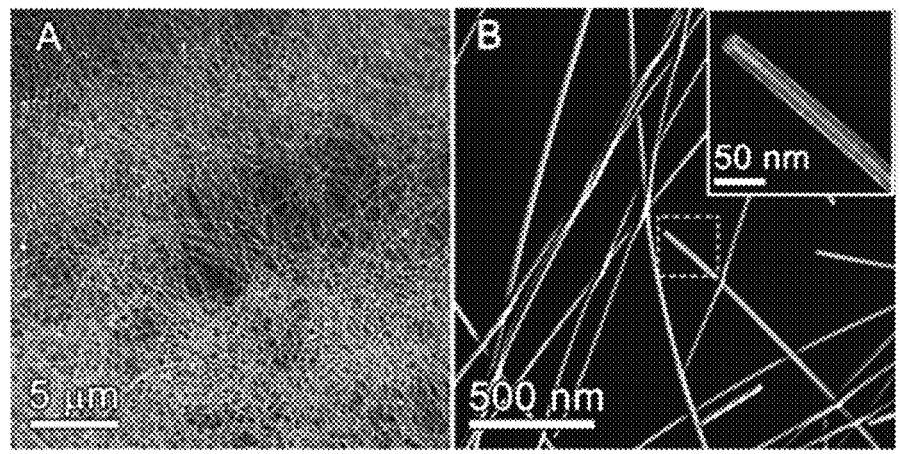
Fig. 1.3A          Fig. 1.3B
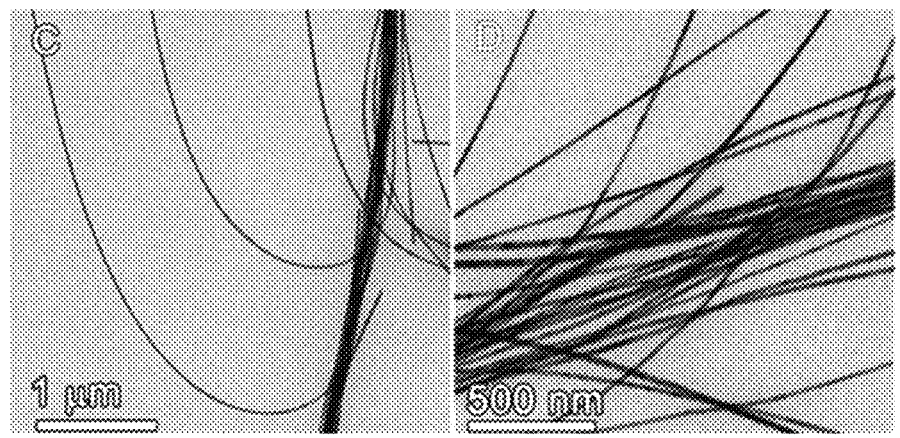
Fig. 1.3C          Fig. 1.3D
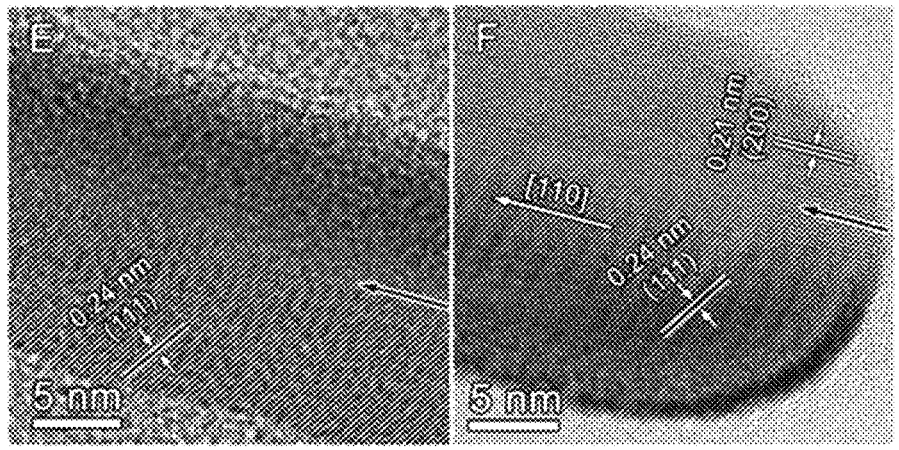
Fig. 1.3E          Fig. 1.3F

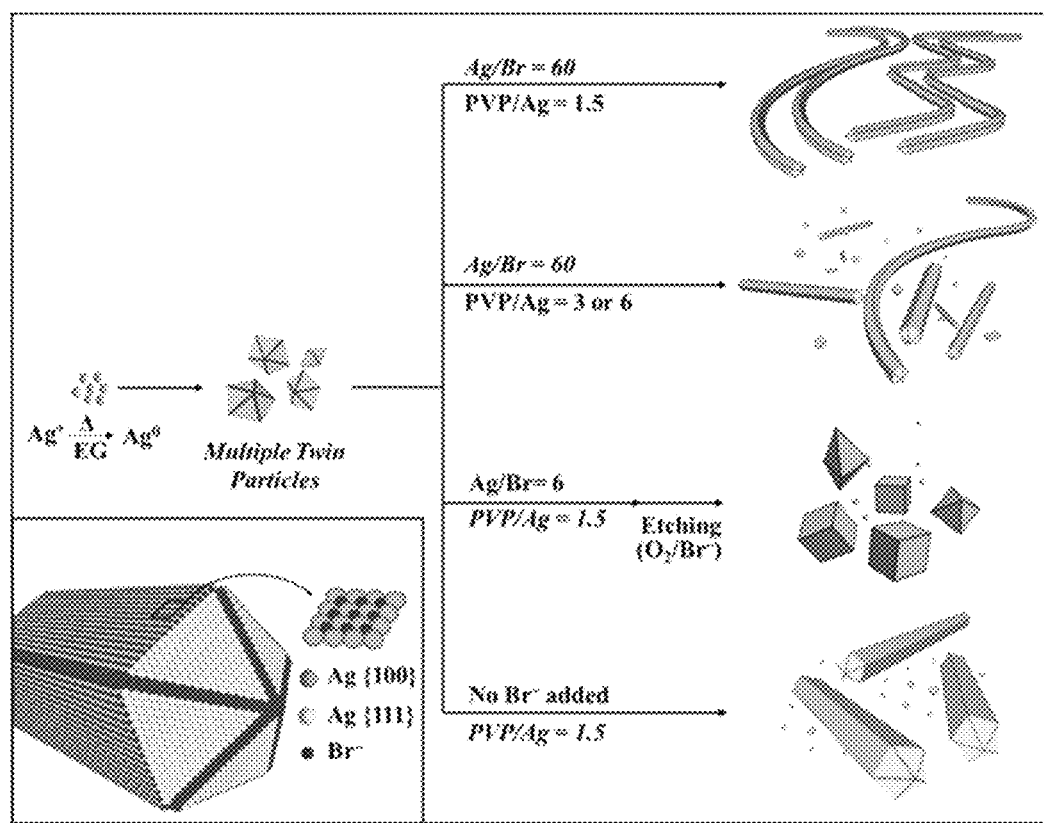
Fig. 1.4

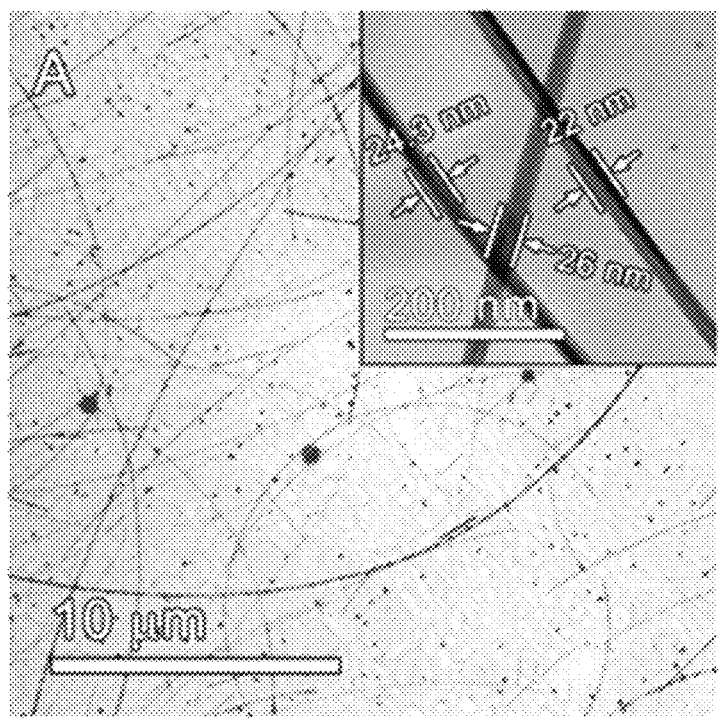
Fig. 1.5A
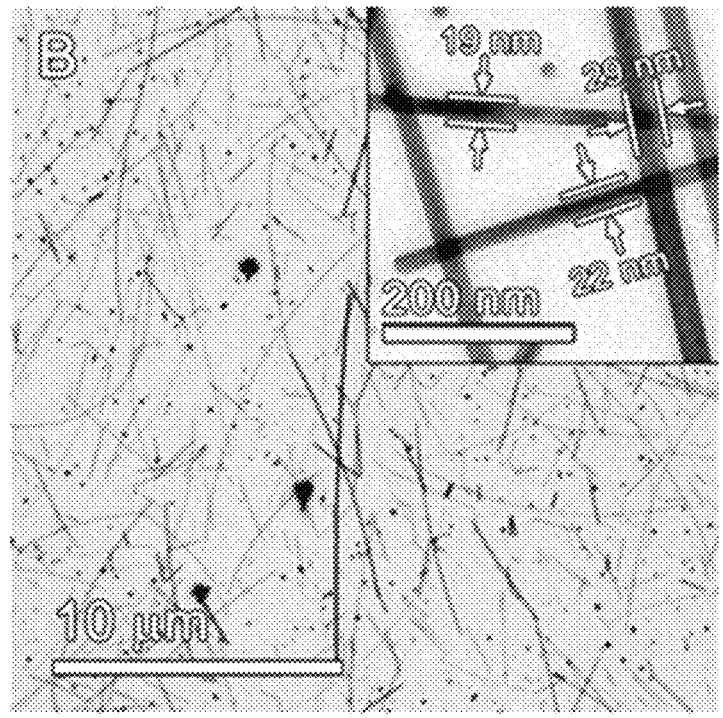
Fig. 1.5B

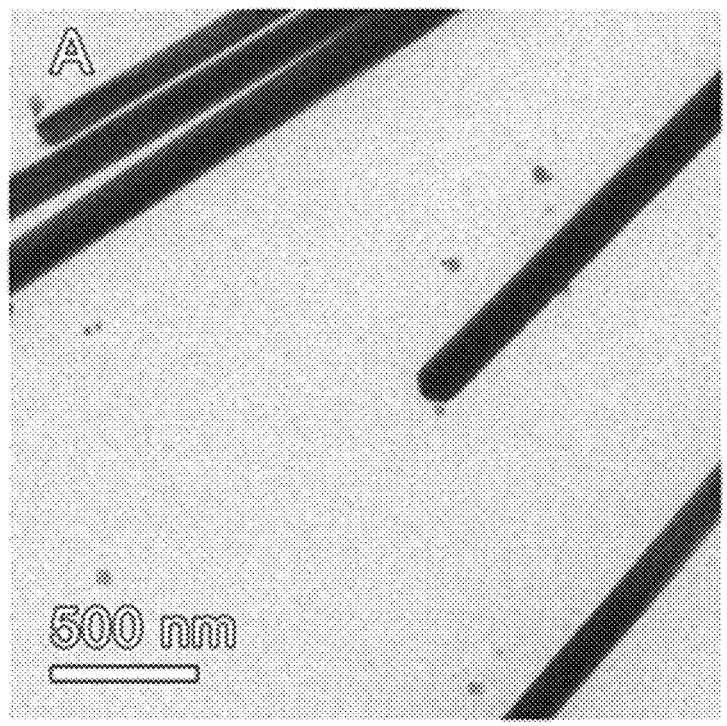
Fig. 1.6A
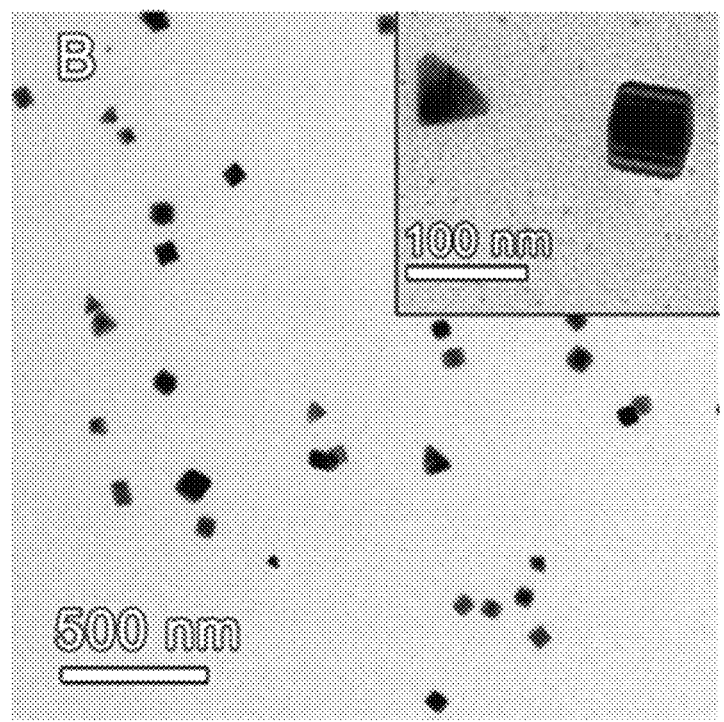
Fig. 1.6B

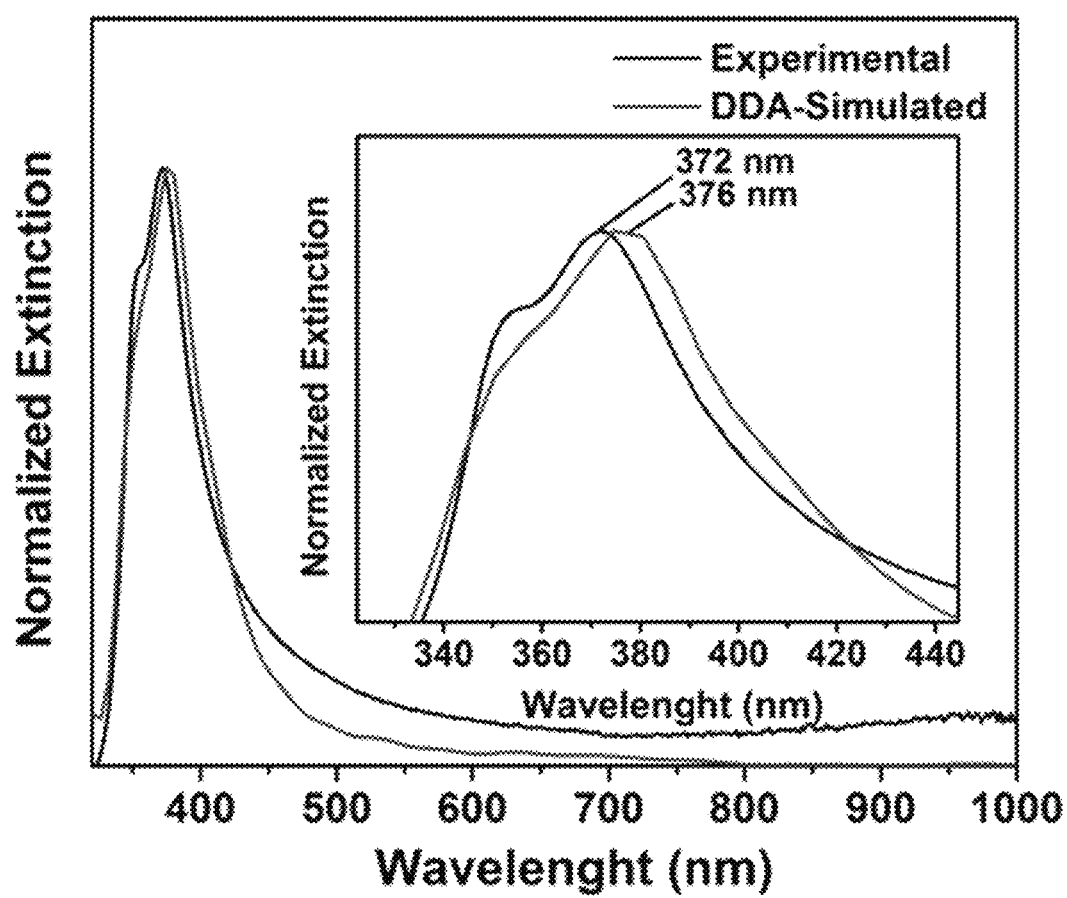
Fig. 1.7

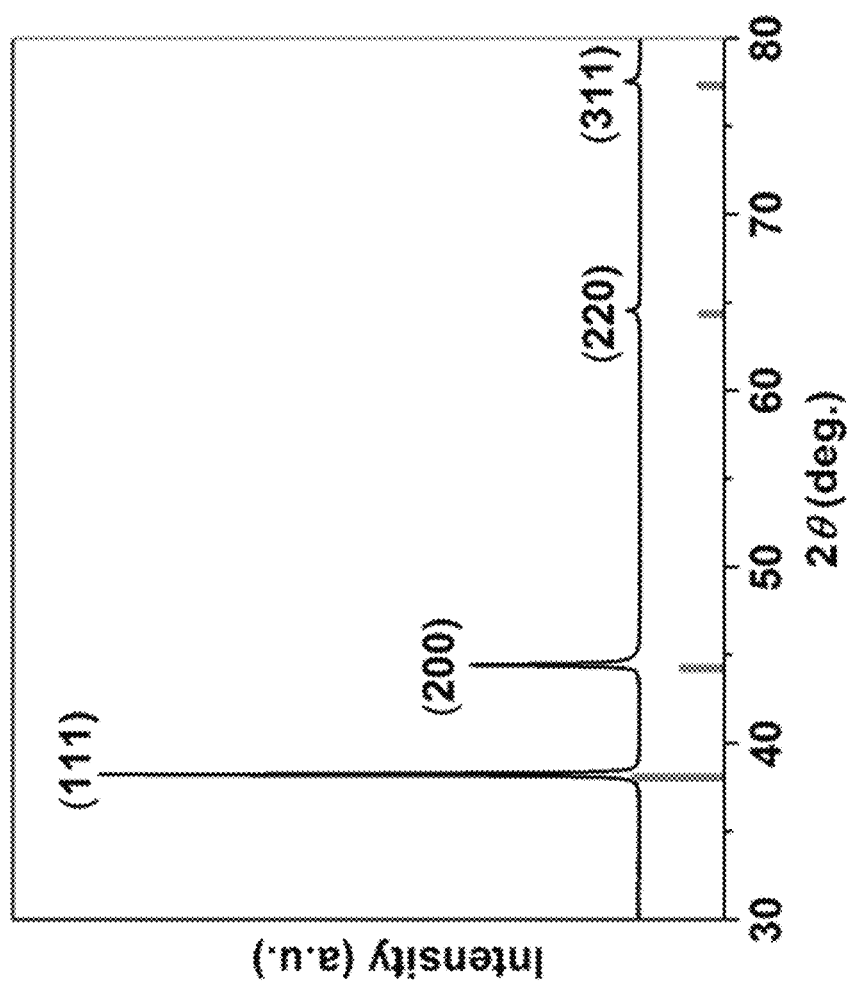
Fig. 1.8

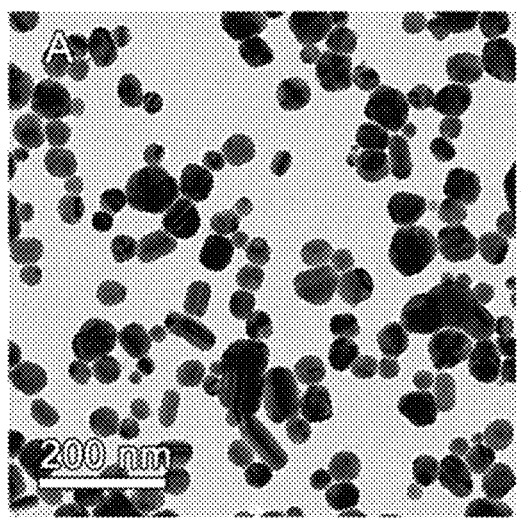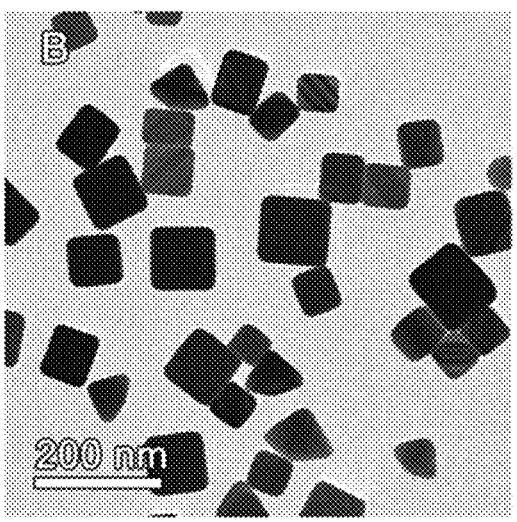
Fig. 1.9A  Fig. 1.9B
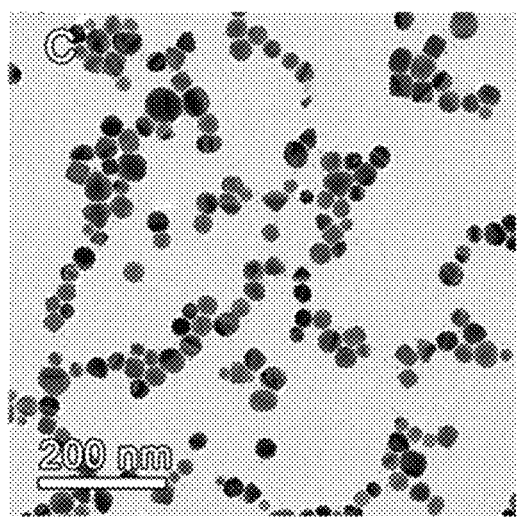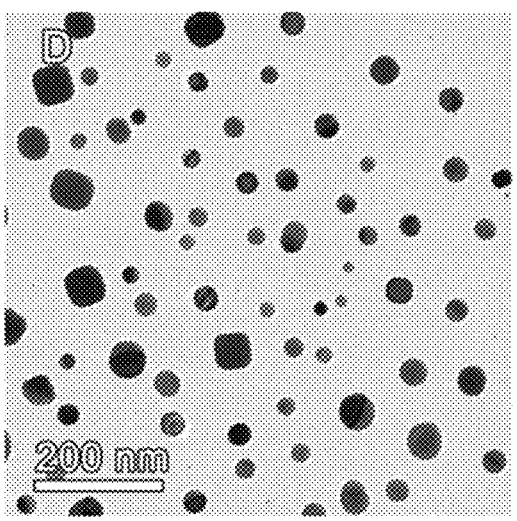
Fig. 1.9C  Fig. 1.9D

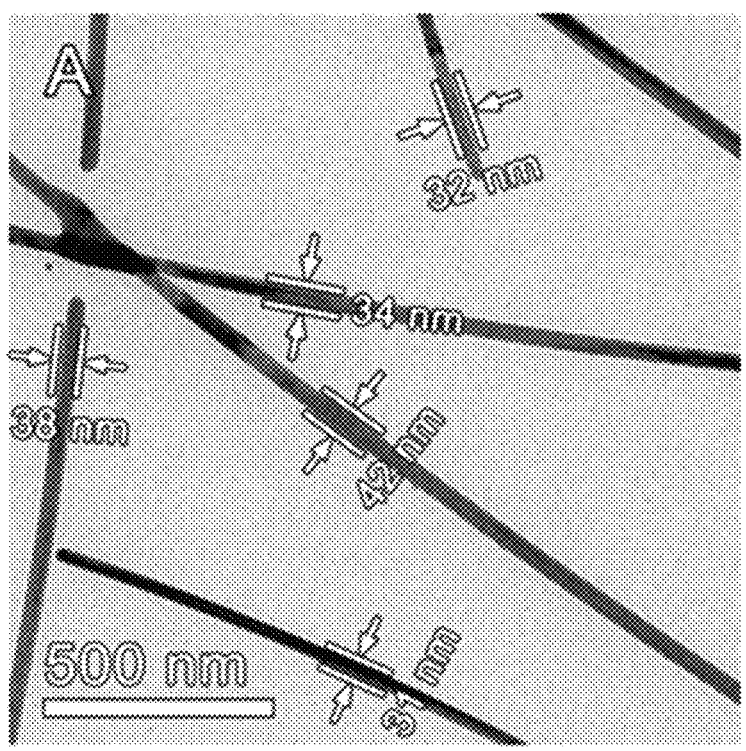
Fig. 1.10A
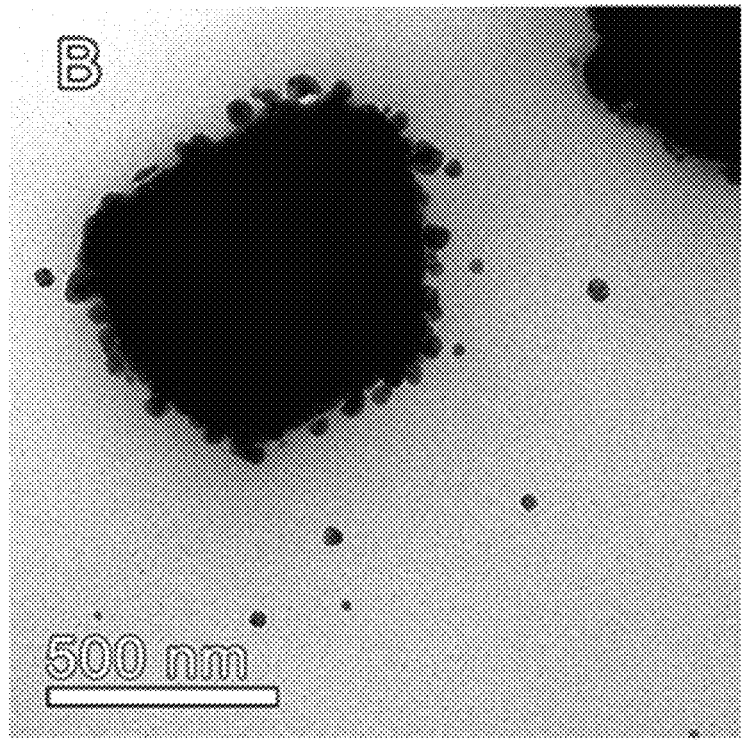
Fig. 1.10B

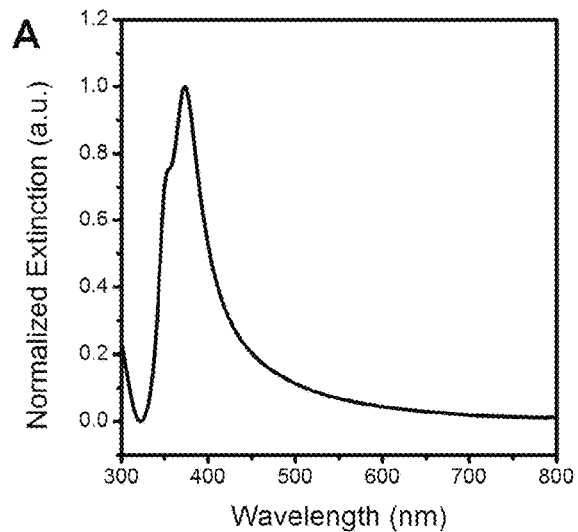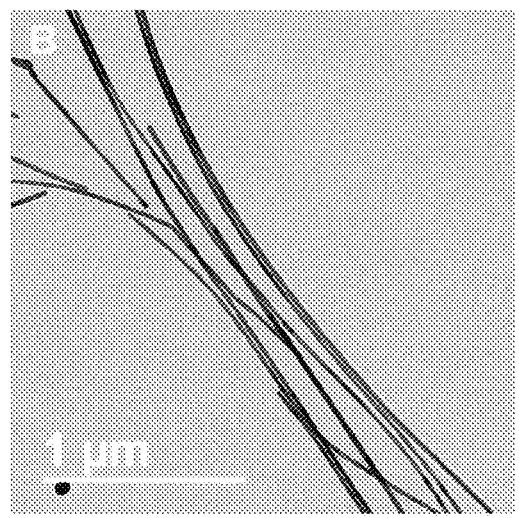
Fig. 2.1A        Fig. 2.1B
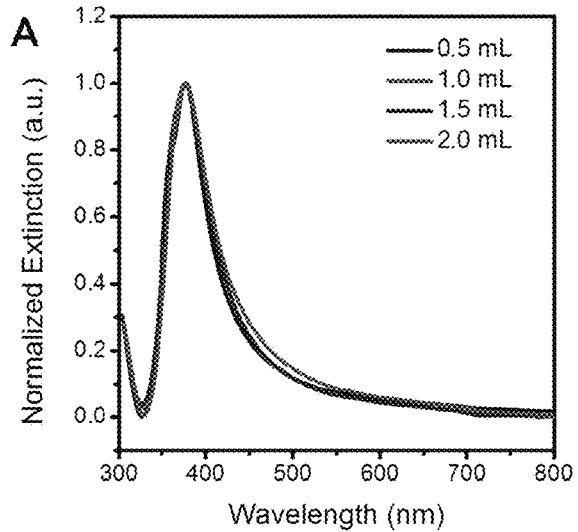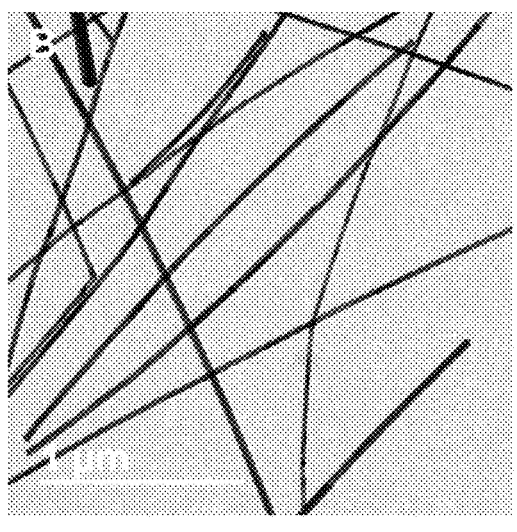
Fig. 2.2A        Fig. 2.2B

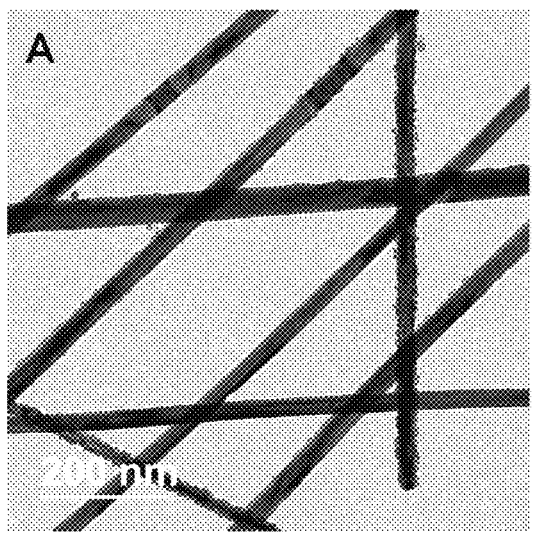
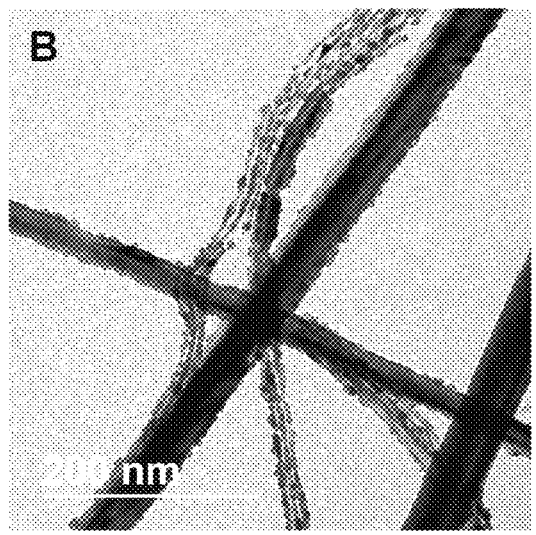
Fig. 2.3A  Fig. 2.3B
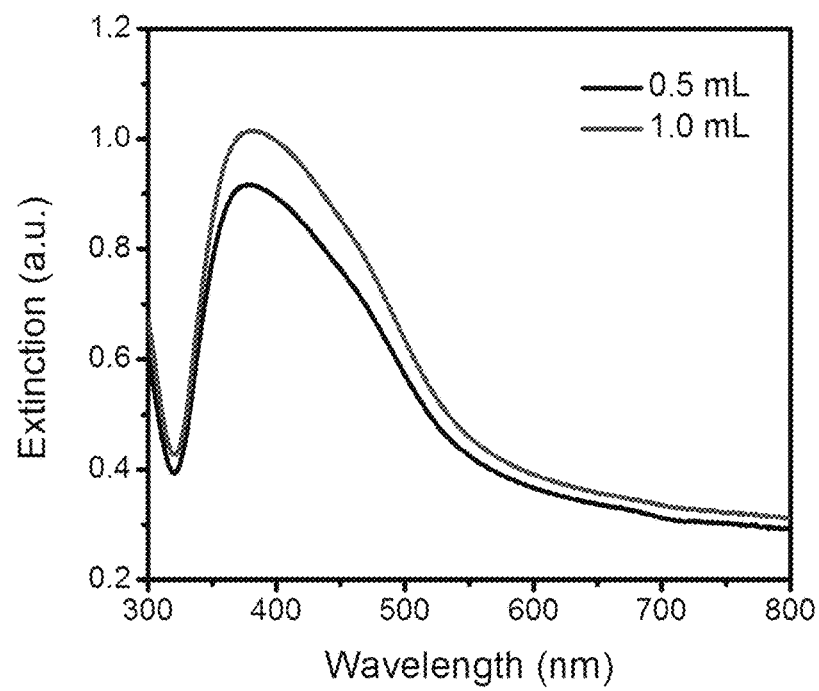
Fig. 2.4

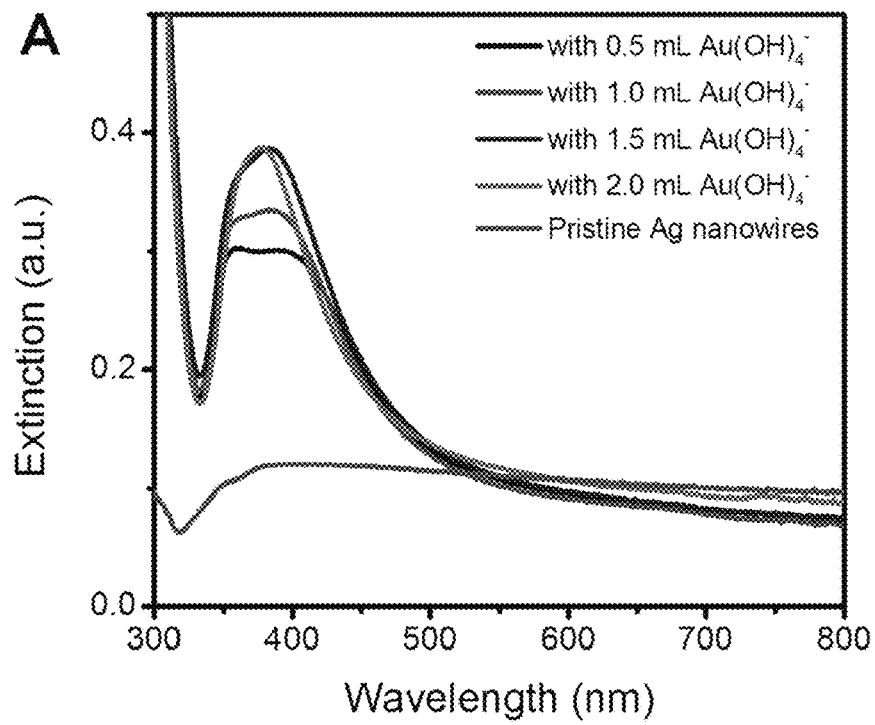
Fig. 2.5A
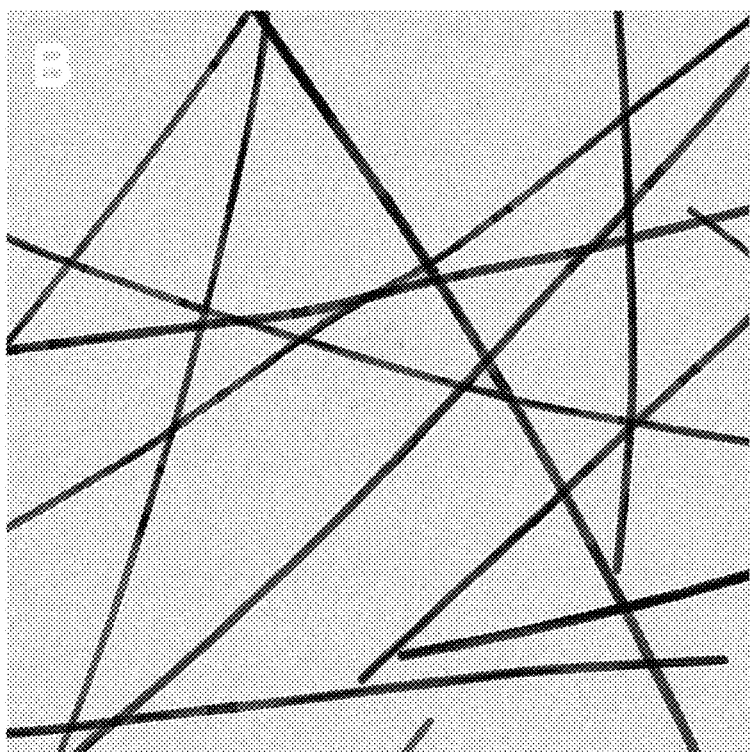
Fig. 2.5B

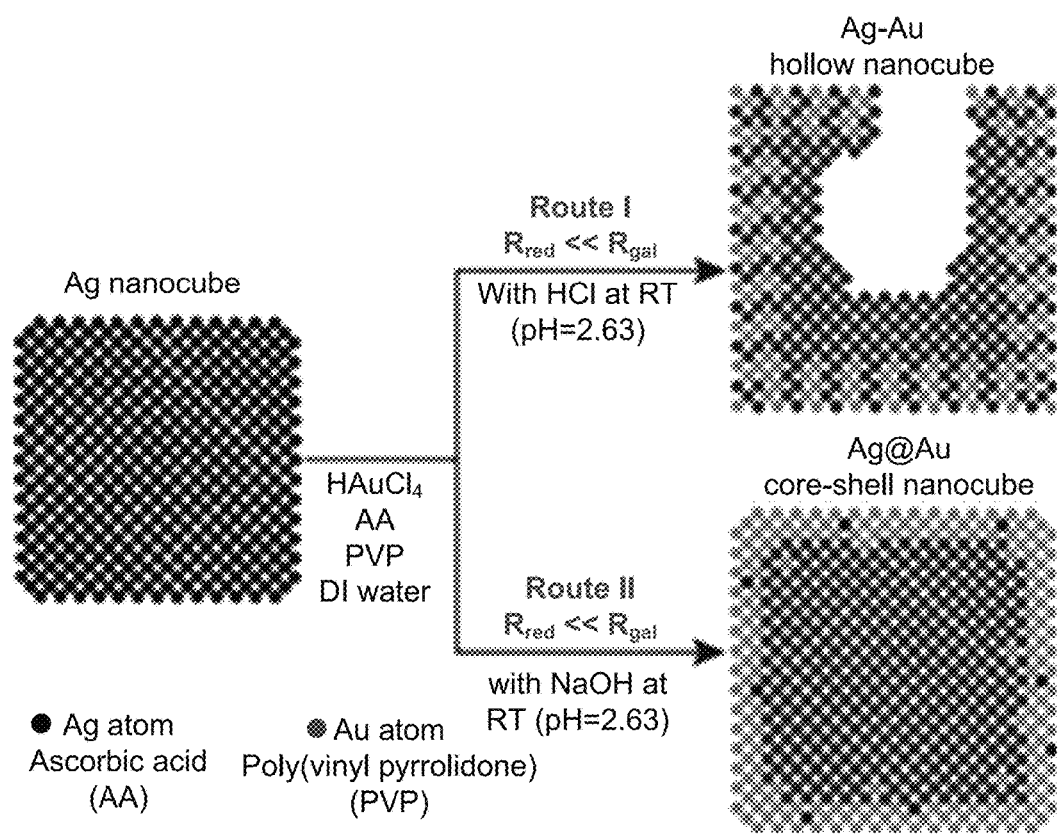
Fig. 3.1

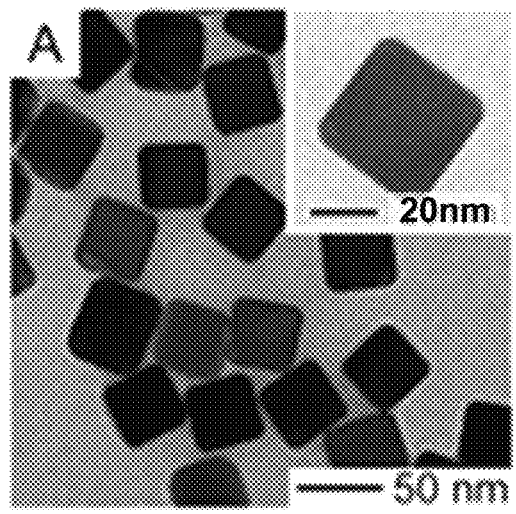
Fig. 3.2A
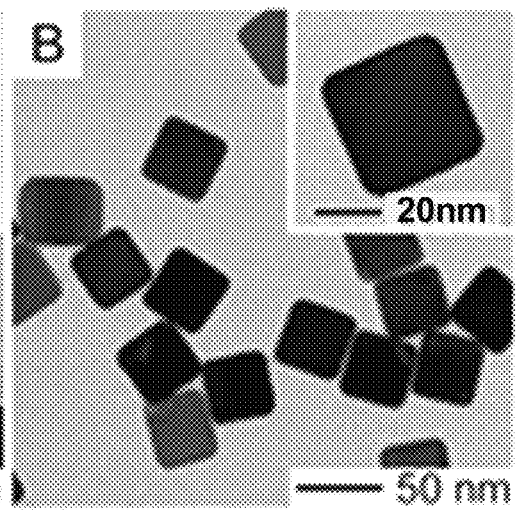
Fig. 3.2B
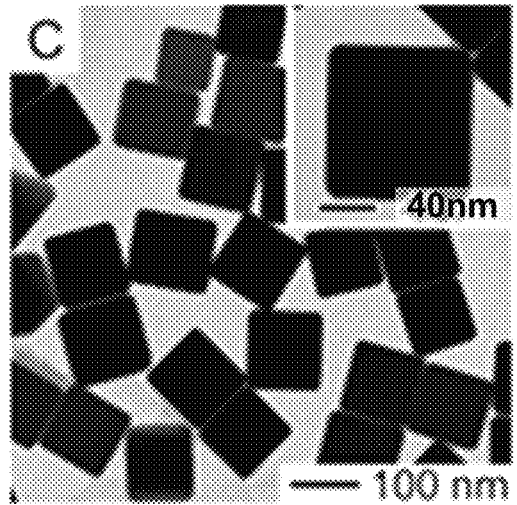
Fig. 3.2C
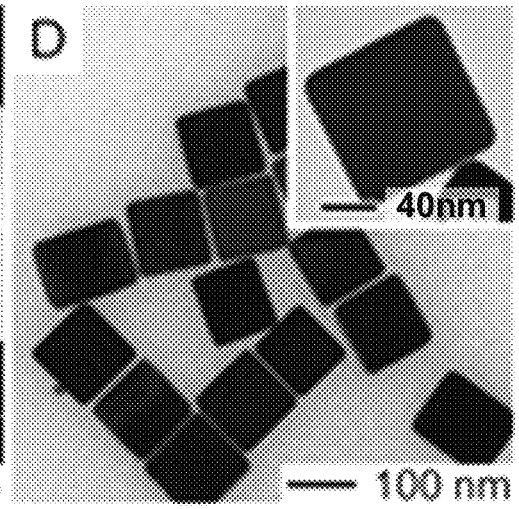
Fig. 3.2D

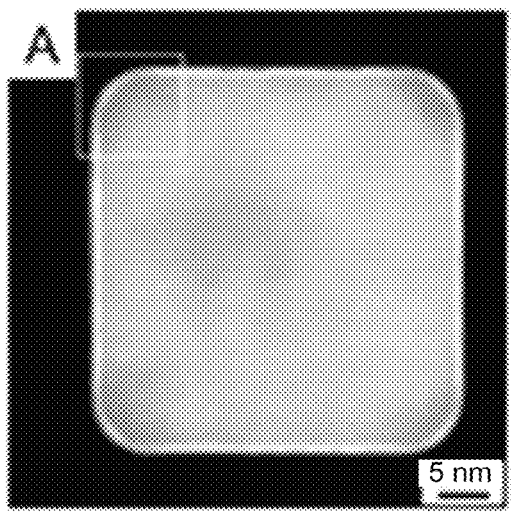
Fig. 3.3A
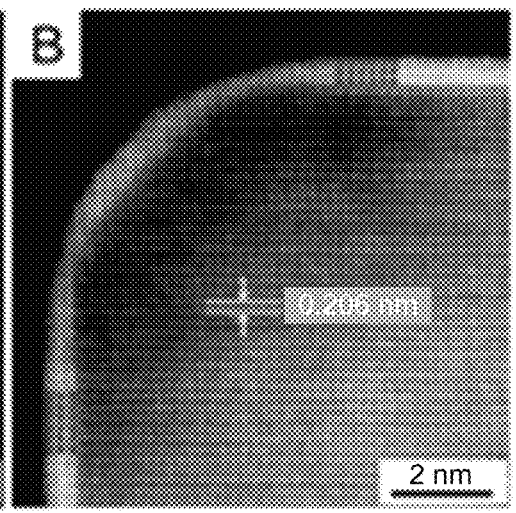
Fig. 3.3B
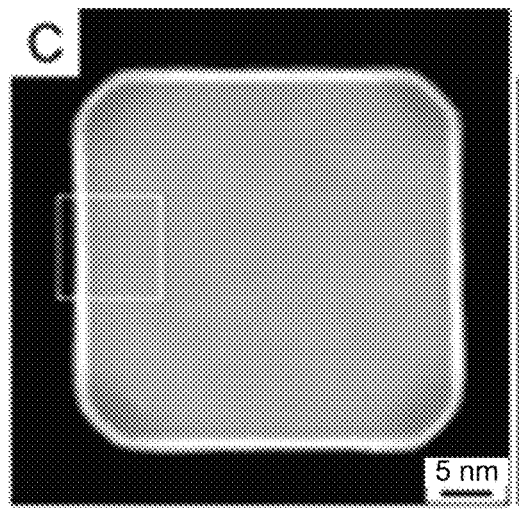
Fig. 3.3C
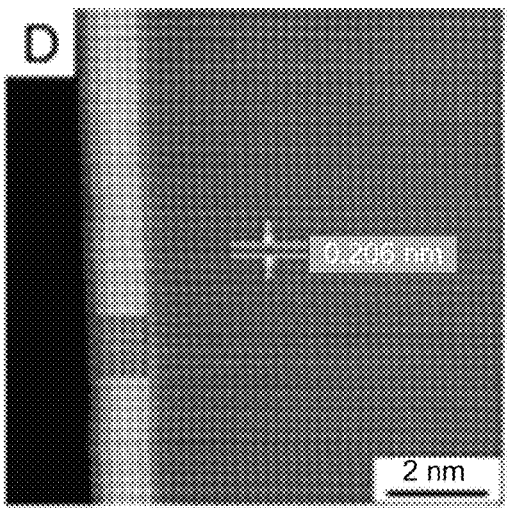
Fig. 3.3D

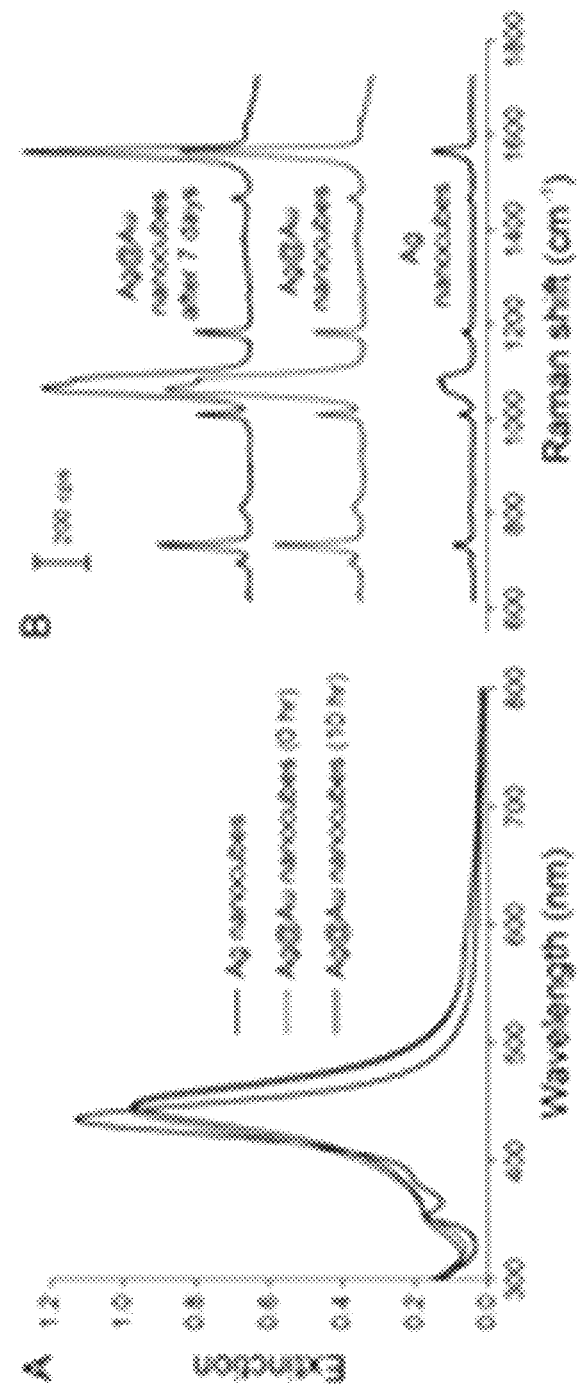
Fig. 3.4A Fig. 3.4B

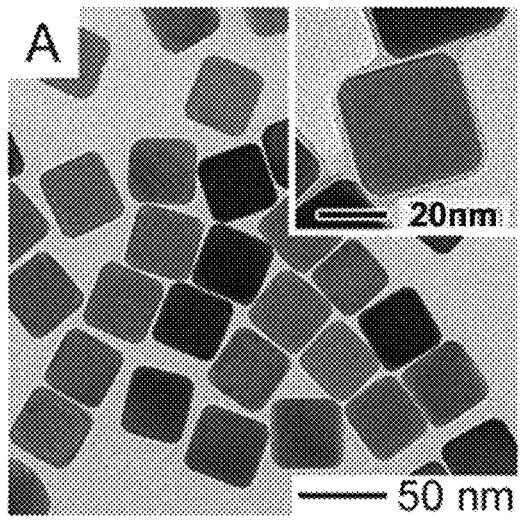
Fig. 3.5A
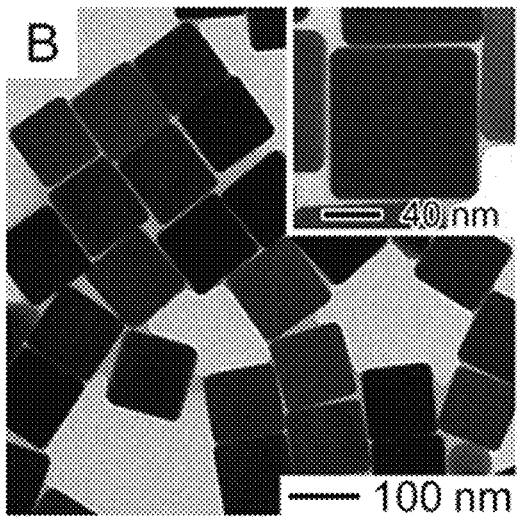
Fig. 3.5B
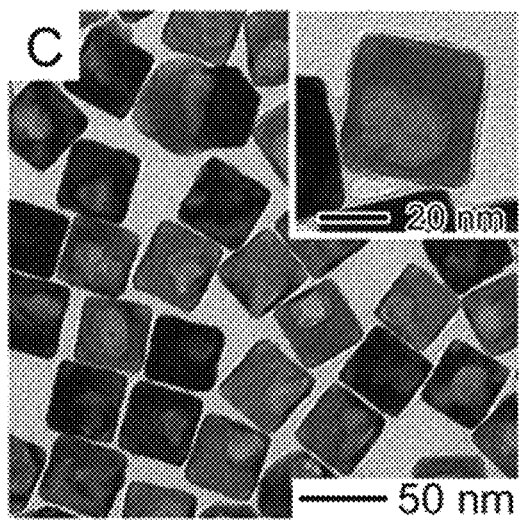
Fig. 3.5C
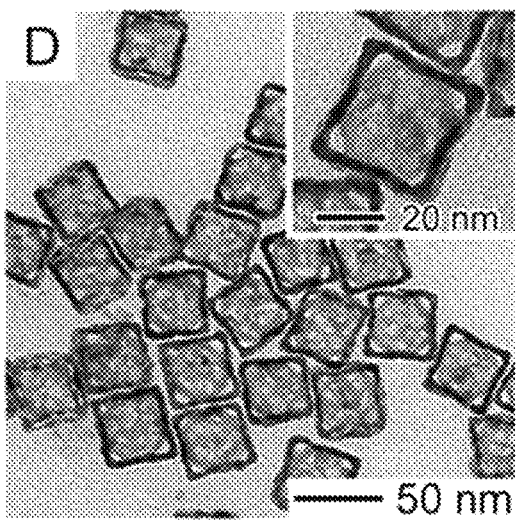
Fig. 3.5D

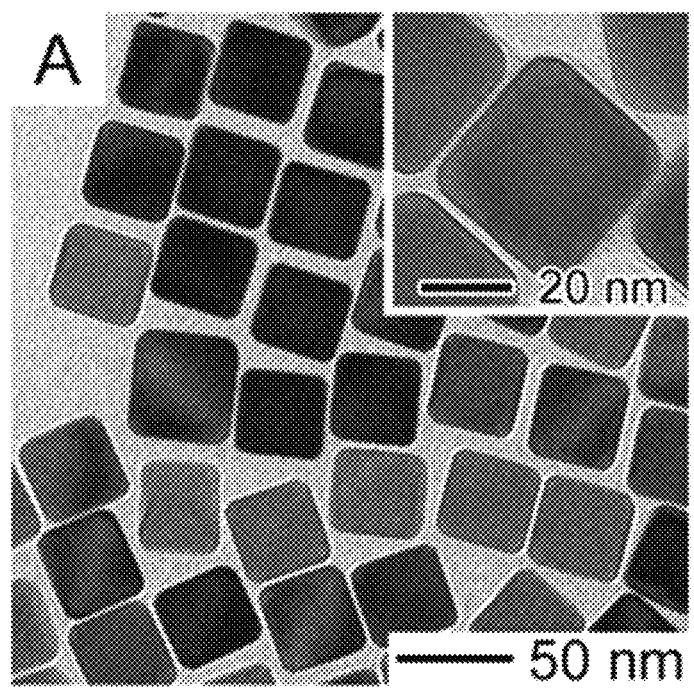
Fig. 3.6A
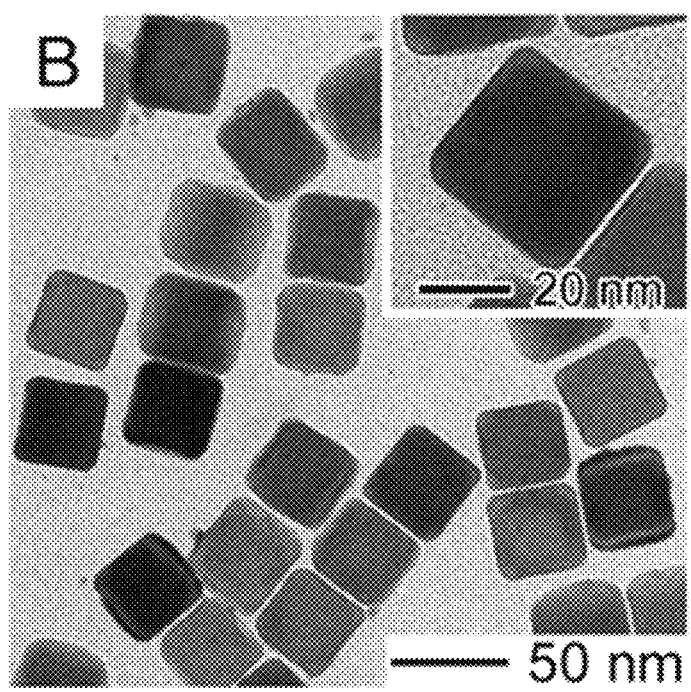
Fig. 3.6B

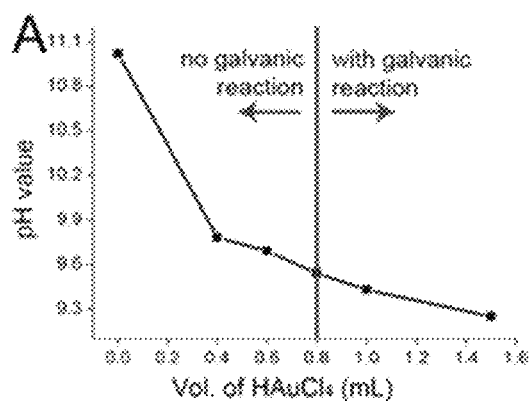
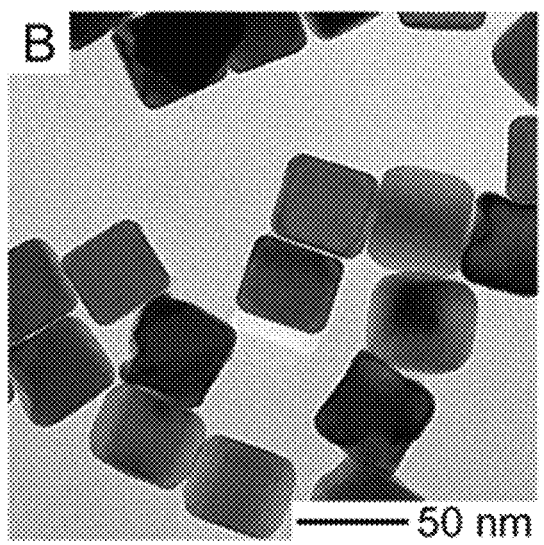 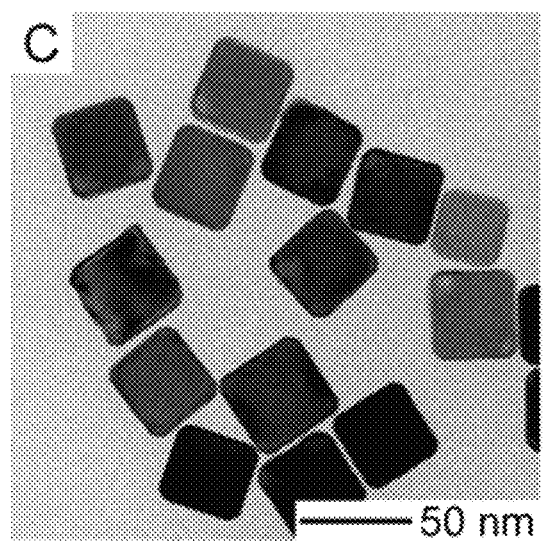
Fig. 3.7A
Fig. 3.7B  Fig. 3.7C

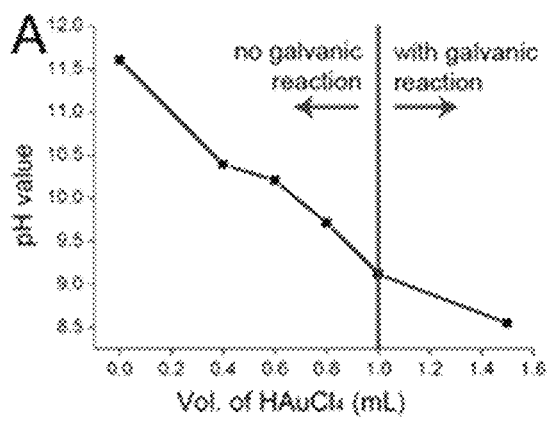
Fig. 3.8A
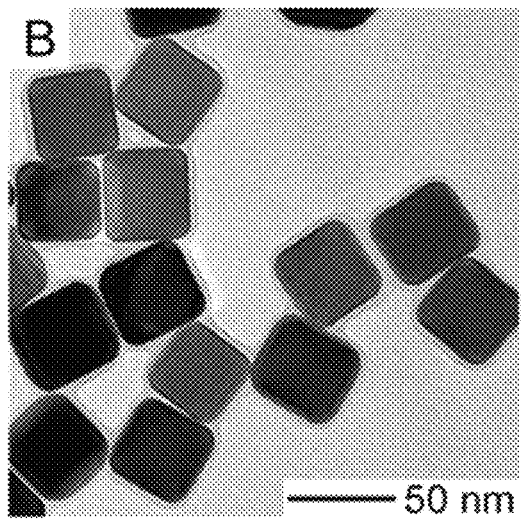
Fig. 3.8B
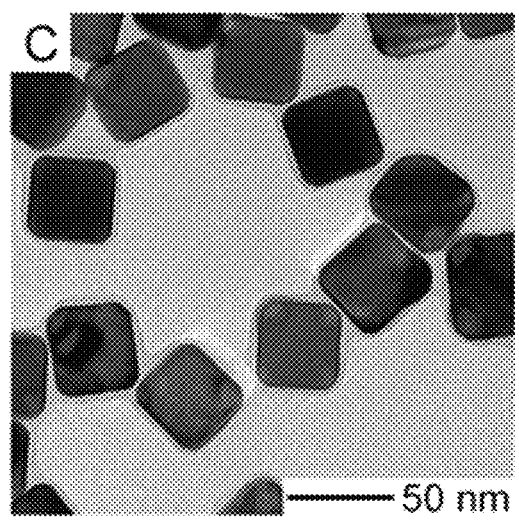
Fig. 3.8C

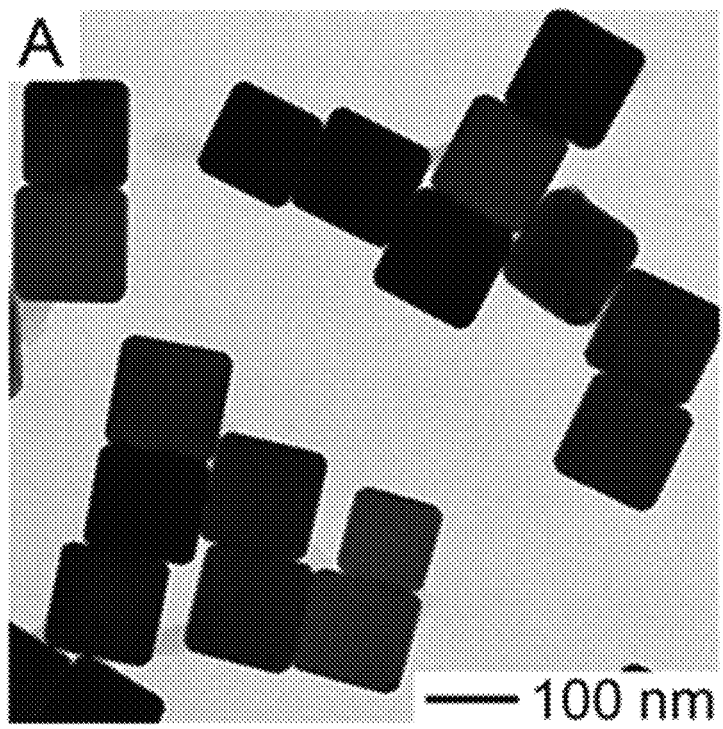
Fig. 3.9A
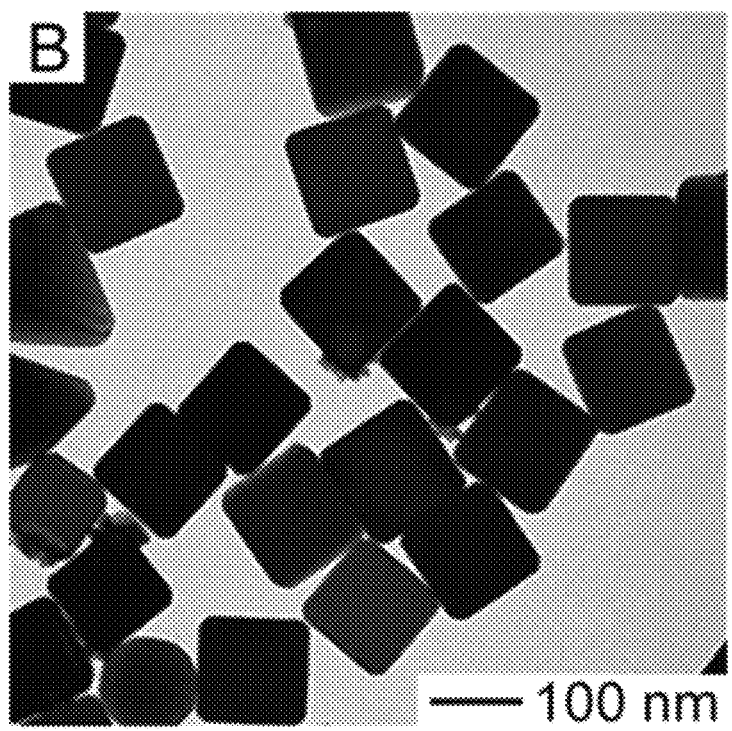
Fig. 3.9B

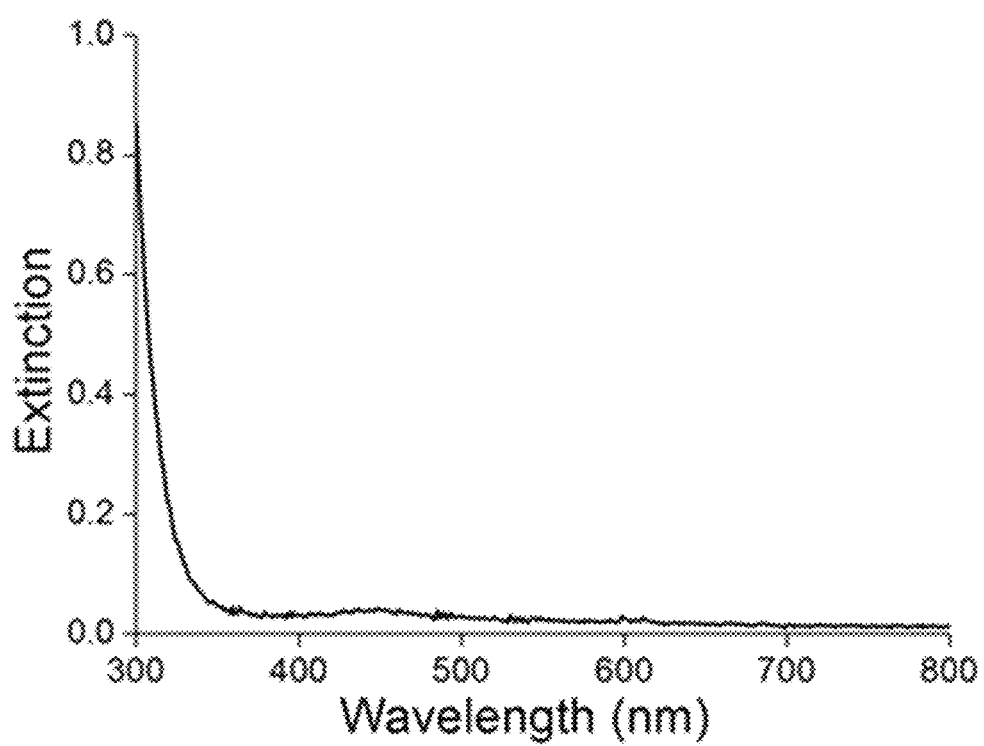
Fig. 3.10

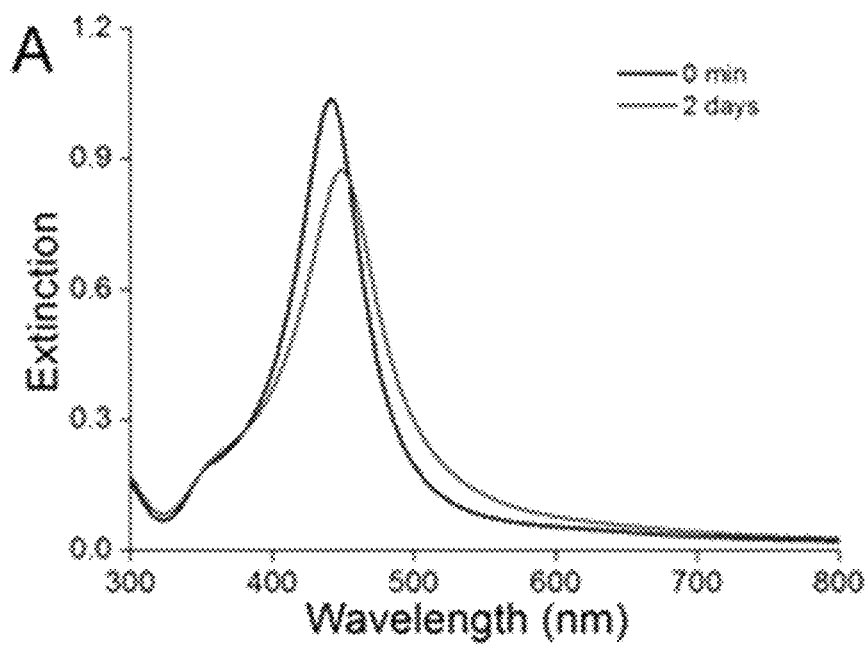
Fig. 3.11A
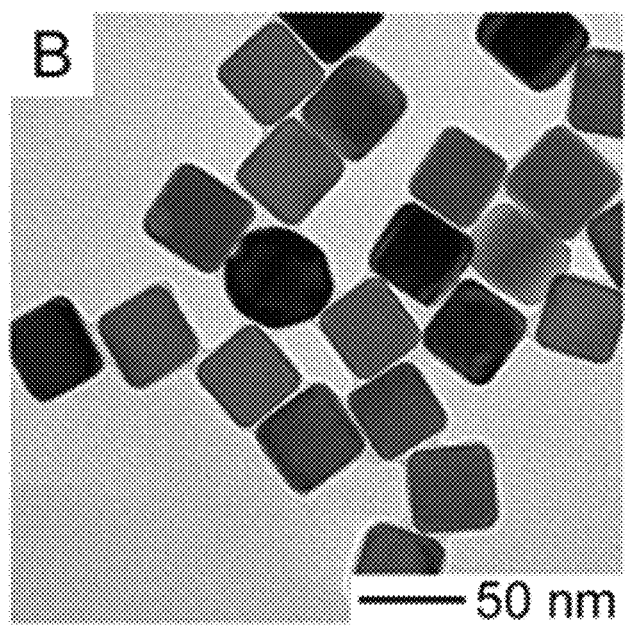
Fig. 3.11B

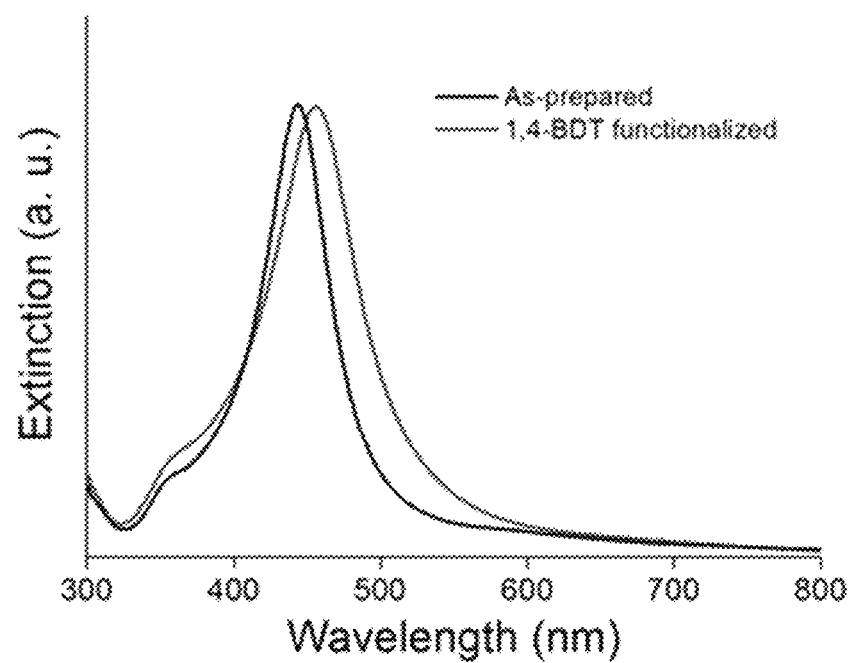
Fig. 3.12

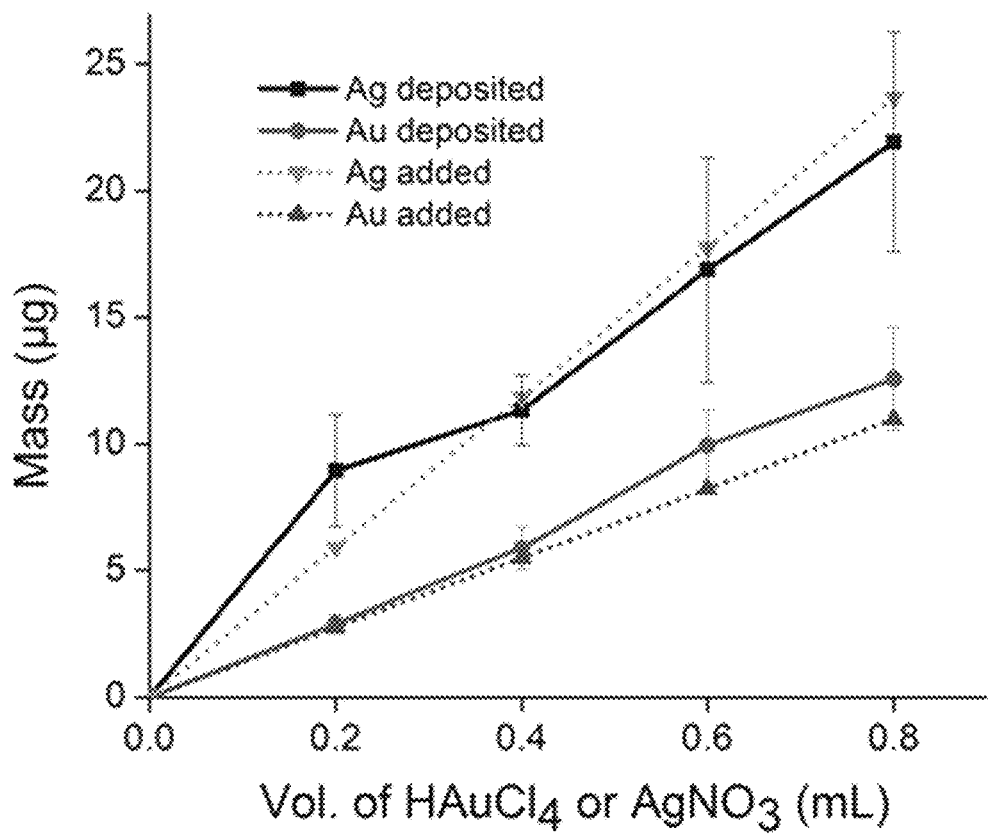
Fig. 4.1

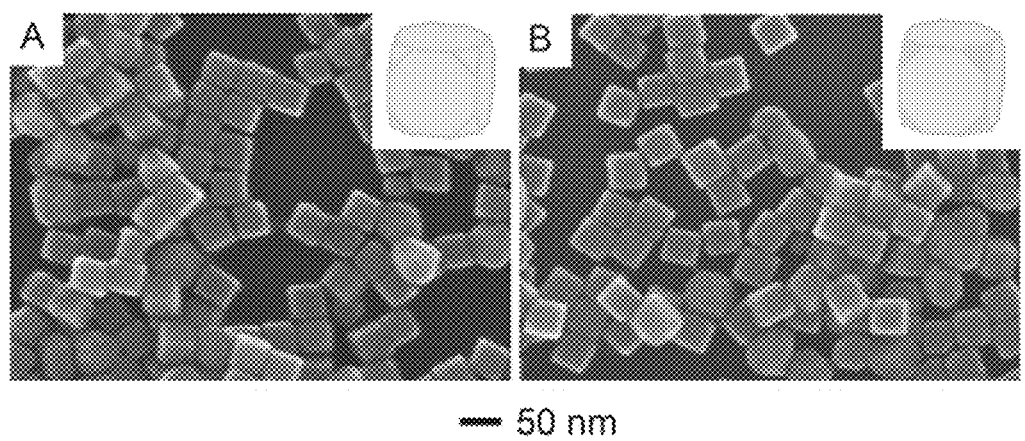
Fig. 4.2A    Fig. 4.2B
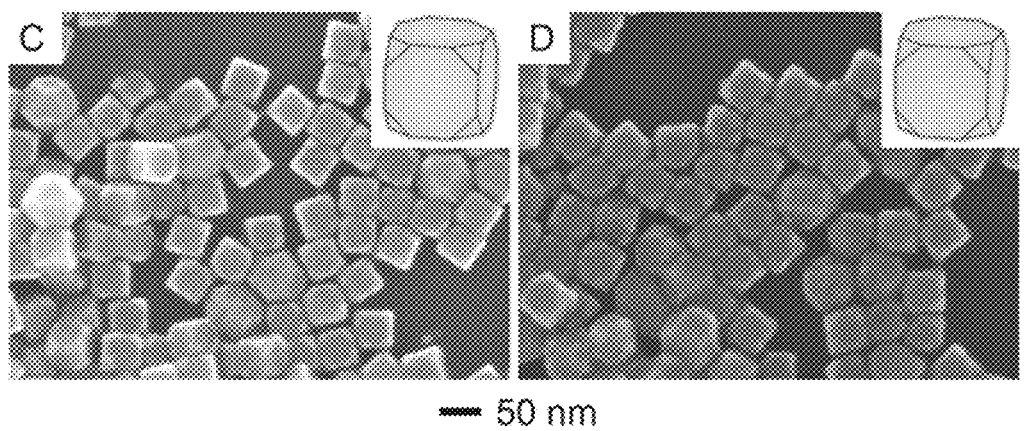
Fig. 4.2C    Fig. 4.2D

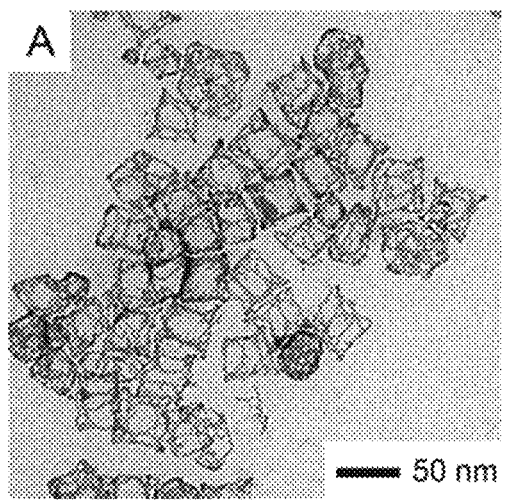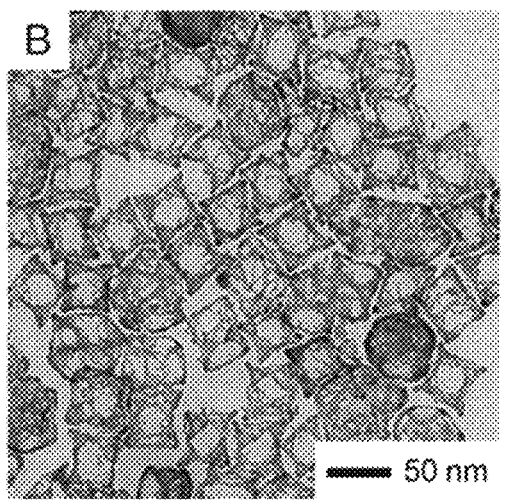
Fig. 4.3A　　　　　　　　　Fig. 4.3B
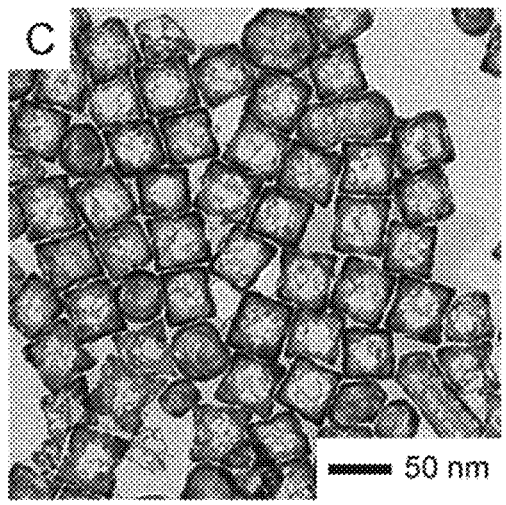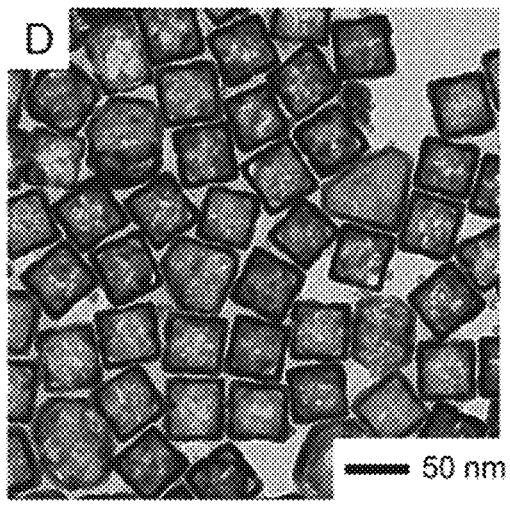
Fig. 4.3C　　　　　　　　　Fig. 4.3D

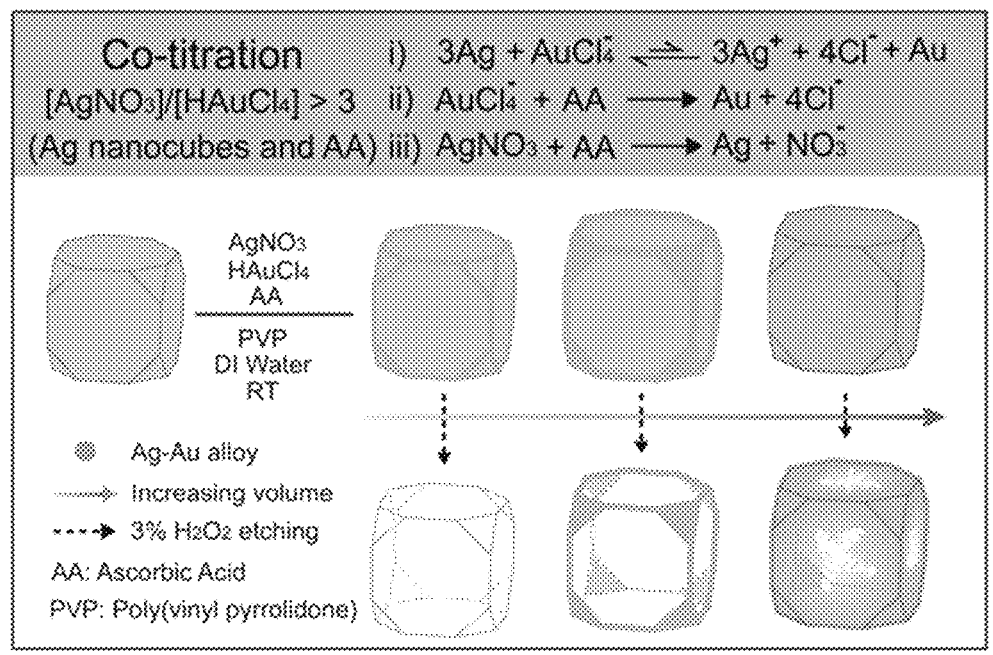
Fig. 4.4

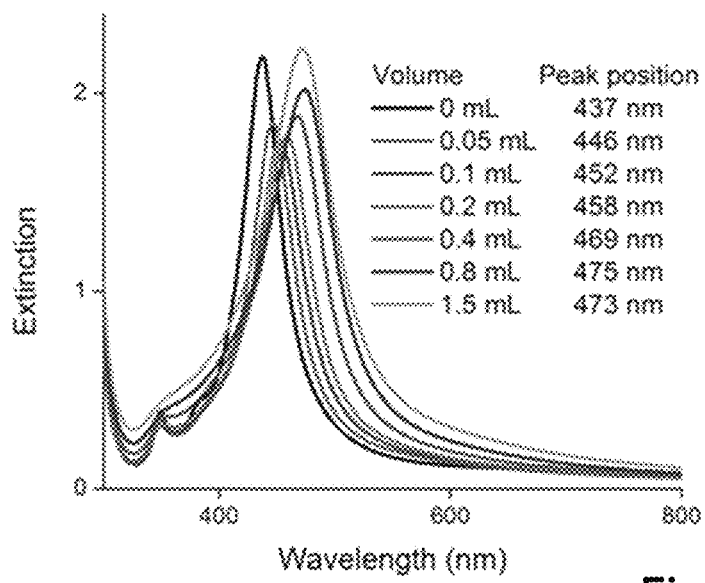
Fig. 4.5A
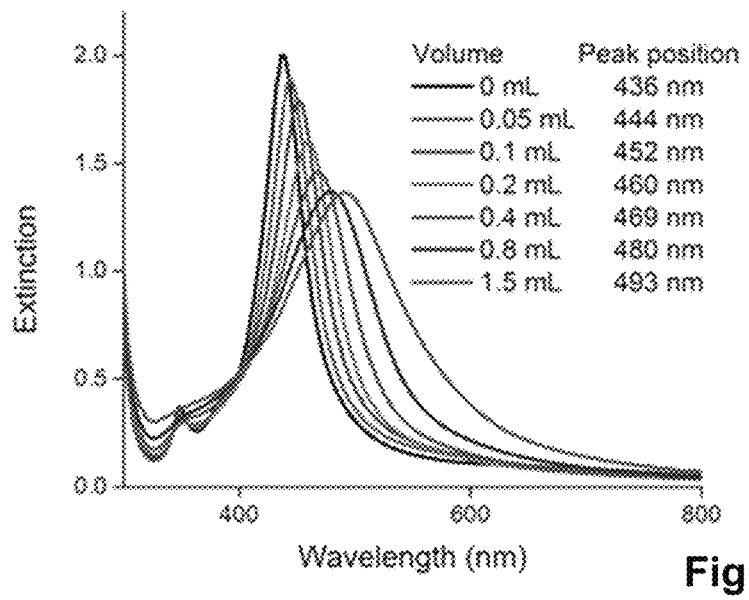
Fig. 4.5B

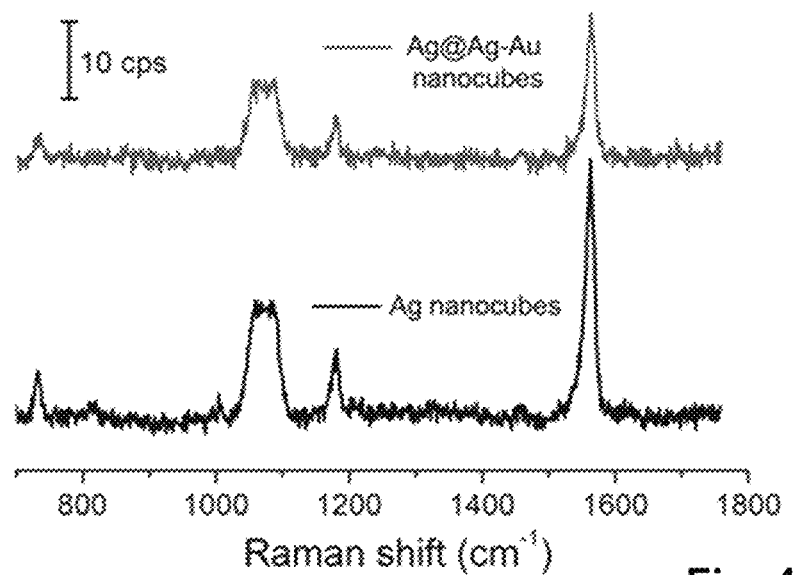
Fig. 4.6A
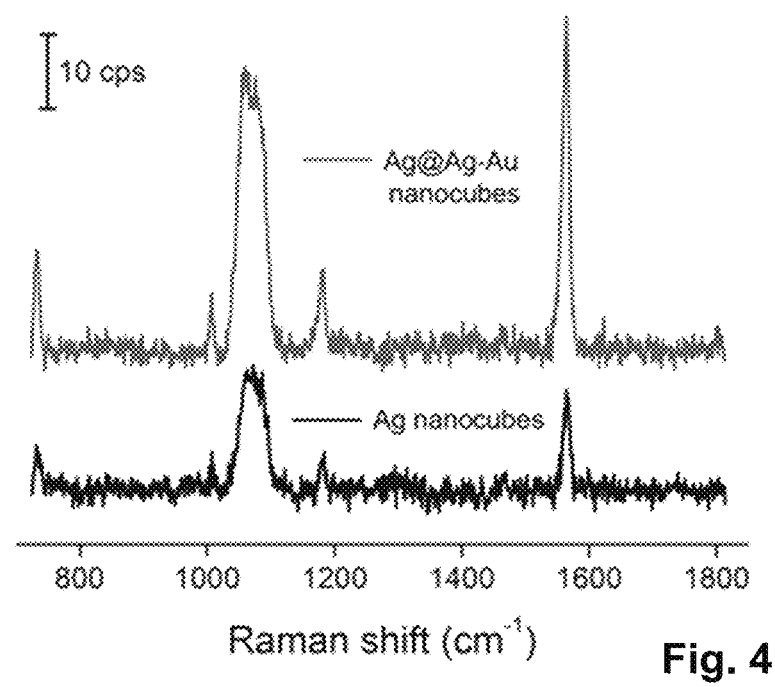
Fig. 4.6B

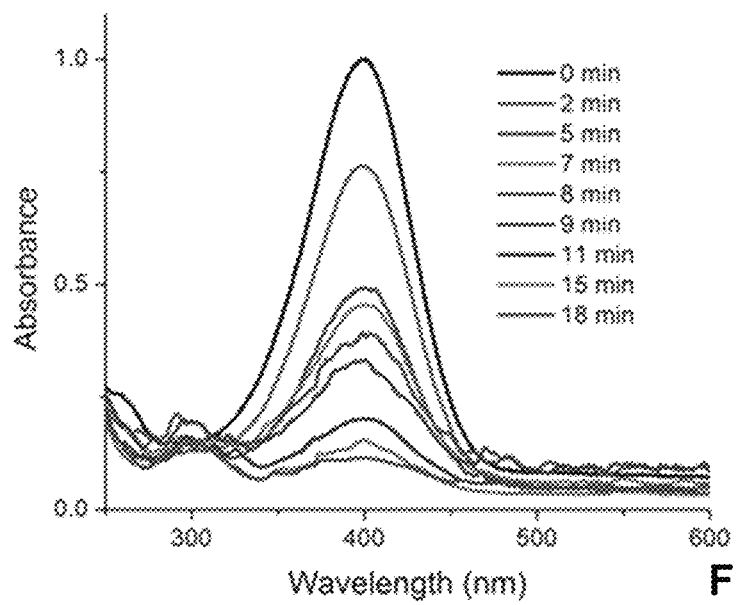
Fig. 4.7A
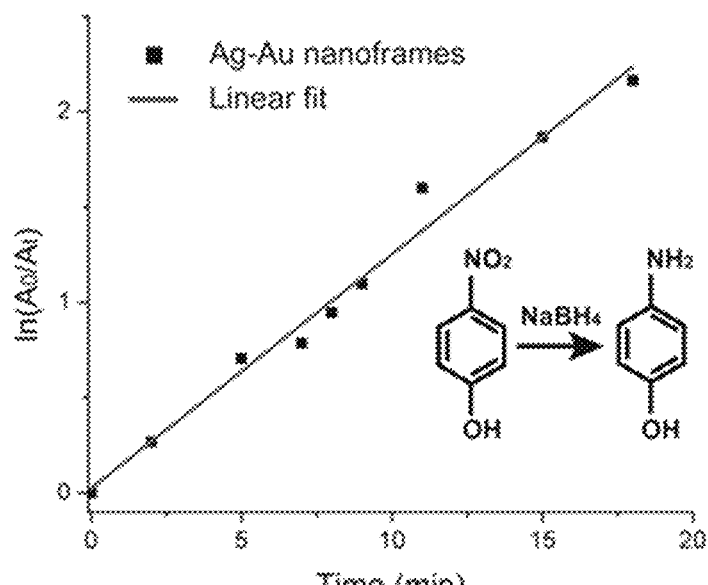
Fig. 4.7B

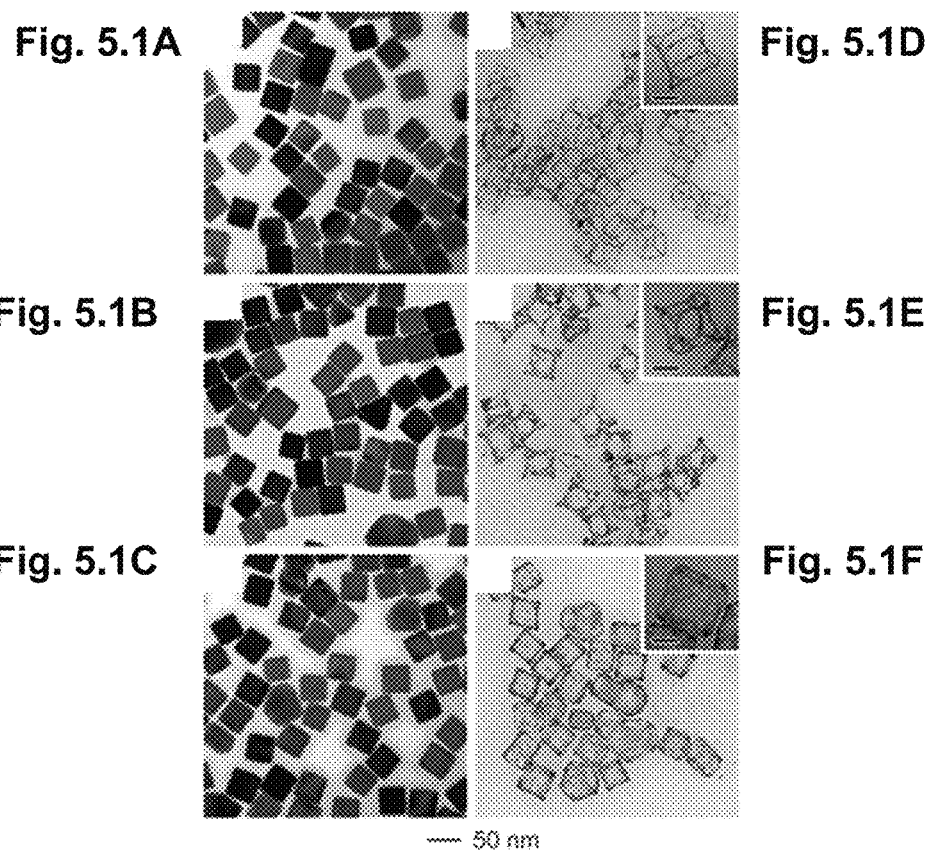
Fig. 5.1A Fig. 5.1B Fig. 5.1C Fig. 5.1D Fig. 5.1E Fig. 5.1F
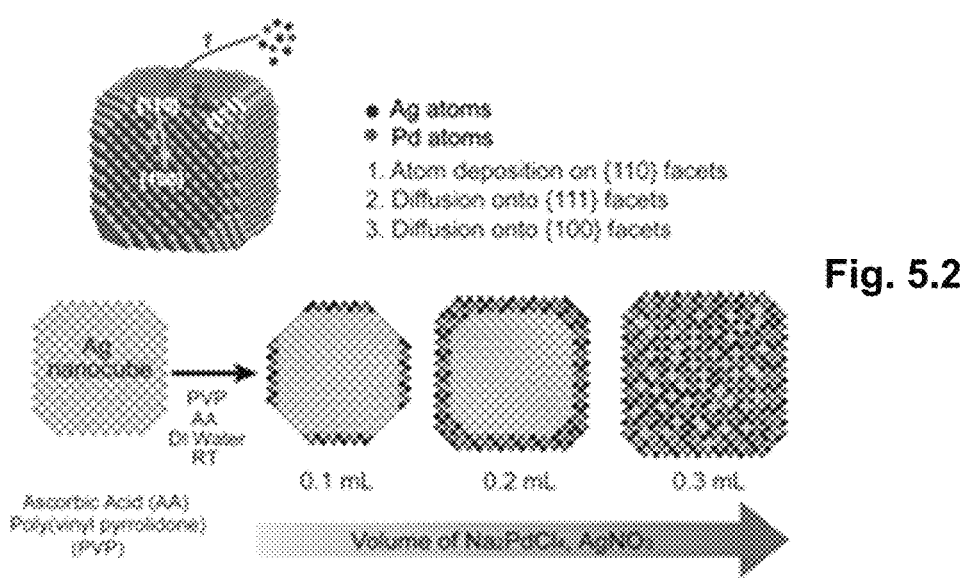
Fig. 5.2

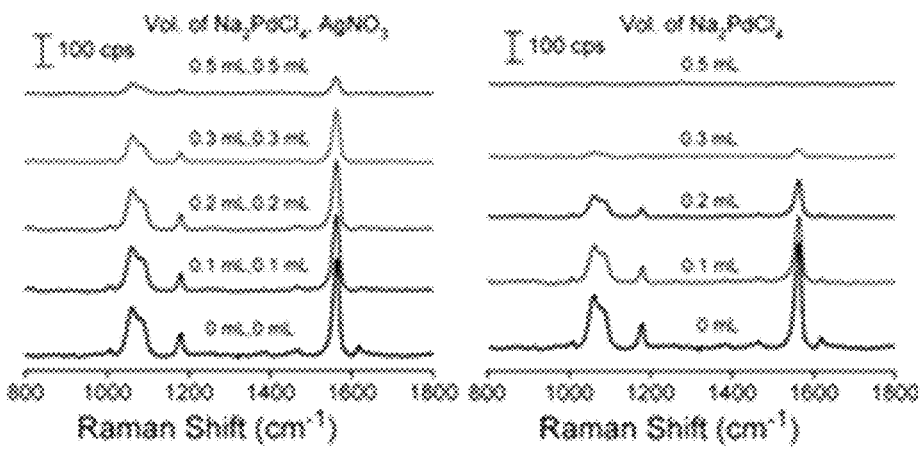
Fig. 5.3A
Fig. 5.3B
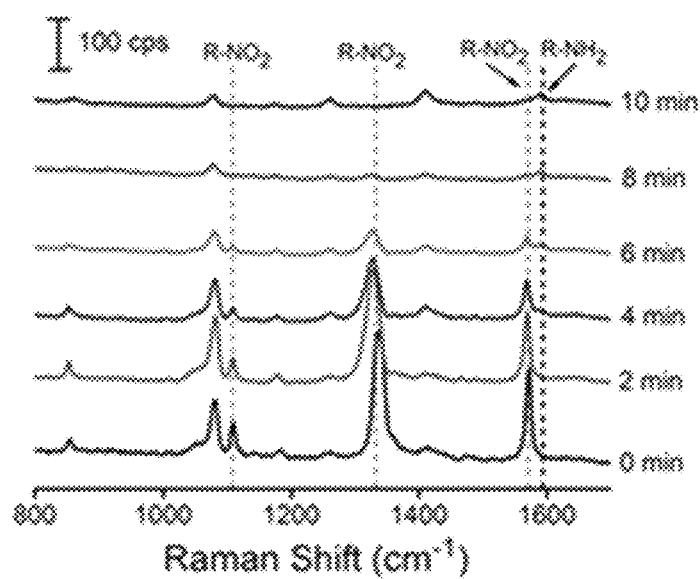
Fig. 5.4A
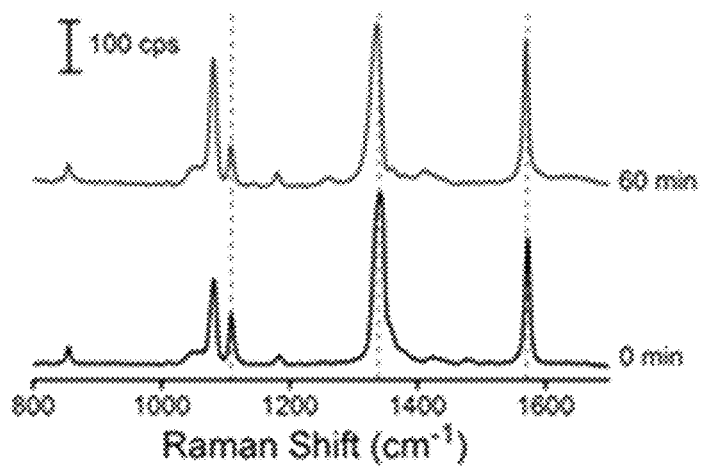
Fig. 5.4B

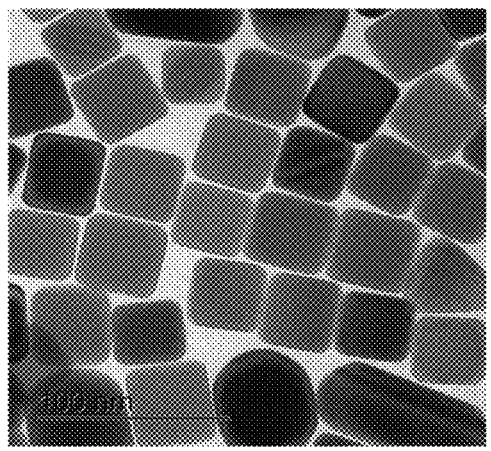
Fig. 5.5
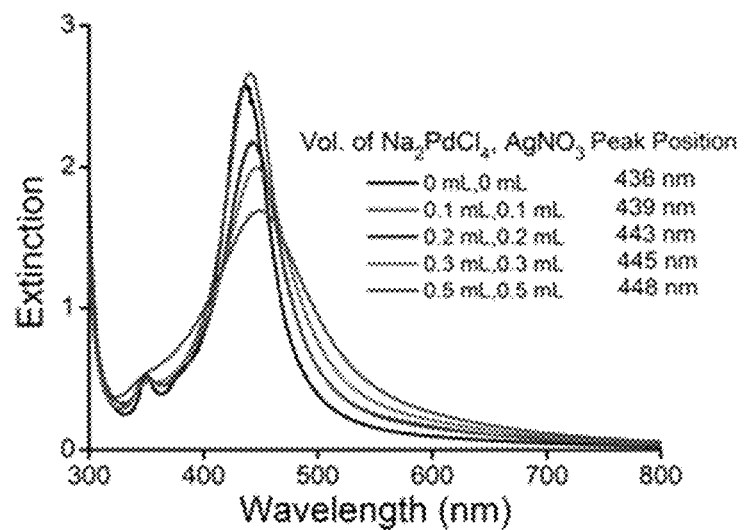
Fig. 5.6A
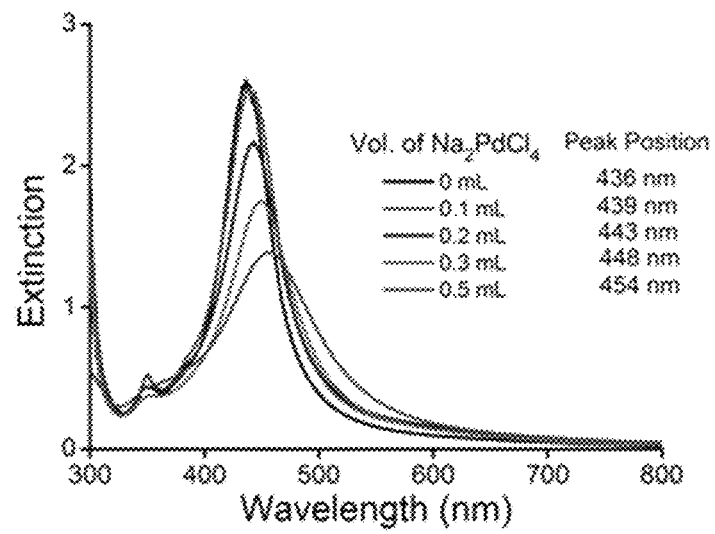
Fig. 5.6B

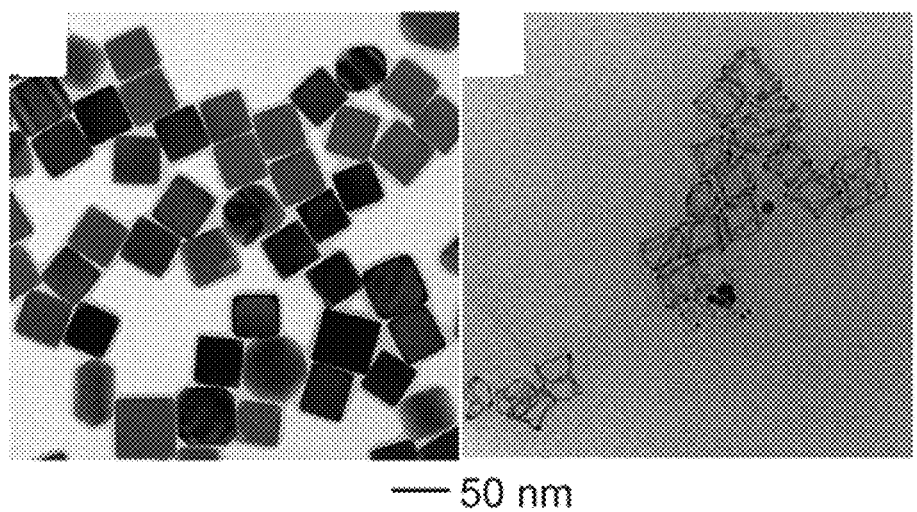
Fig. 5.7A   Fig. 5.7B
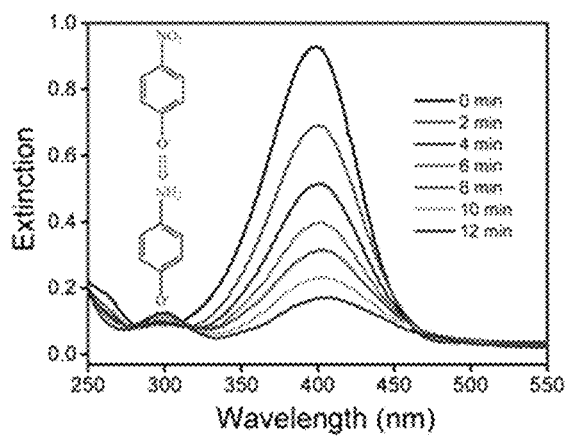
Fig. 5.8A
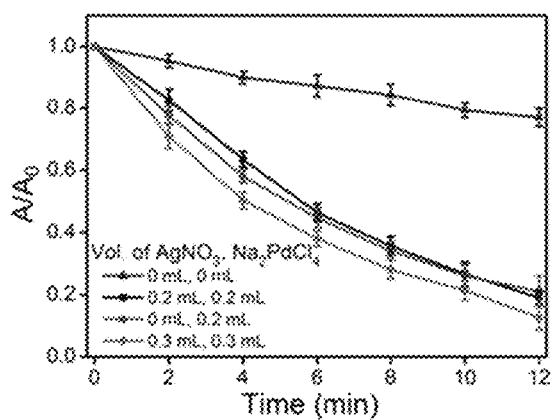
Fig. 5.8B

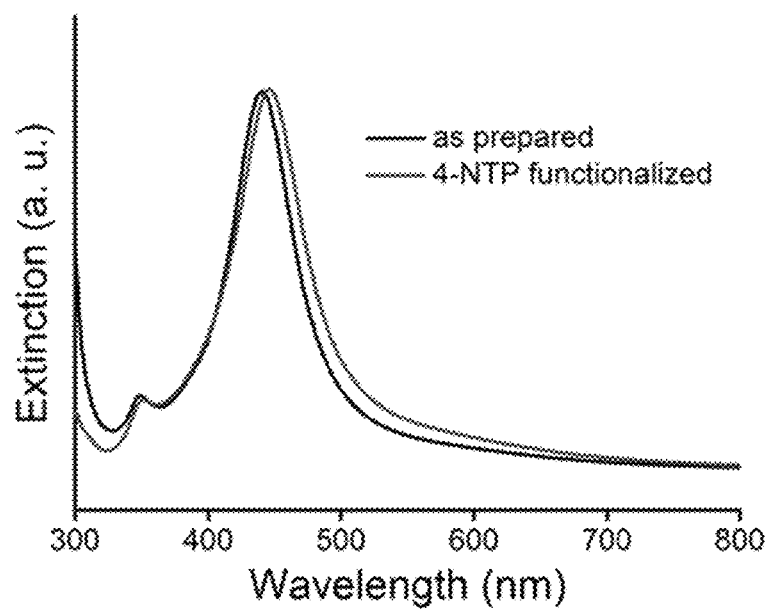
Fig. 5.9
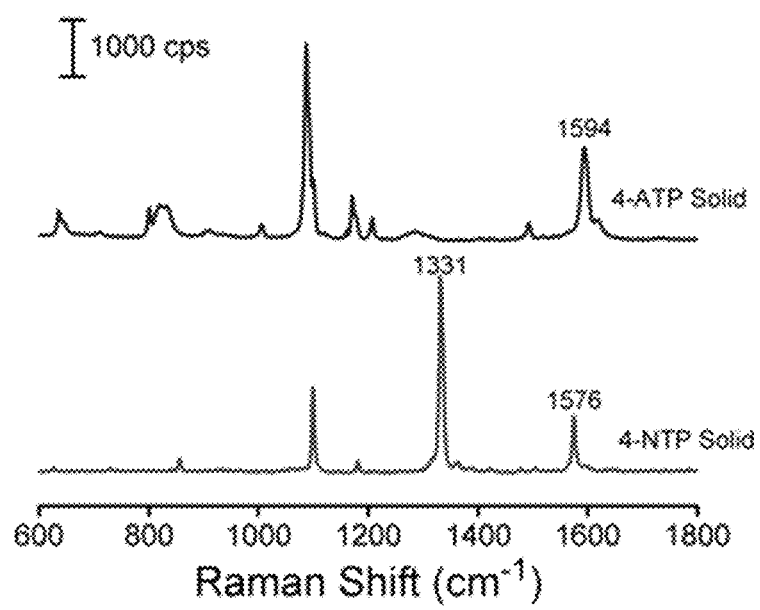
Fig. 5.10

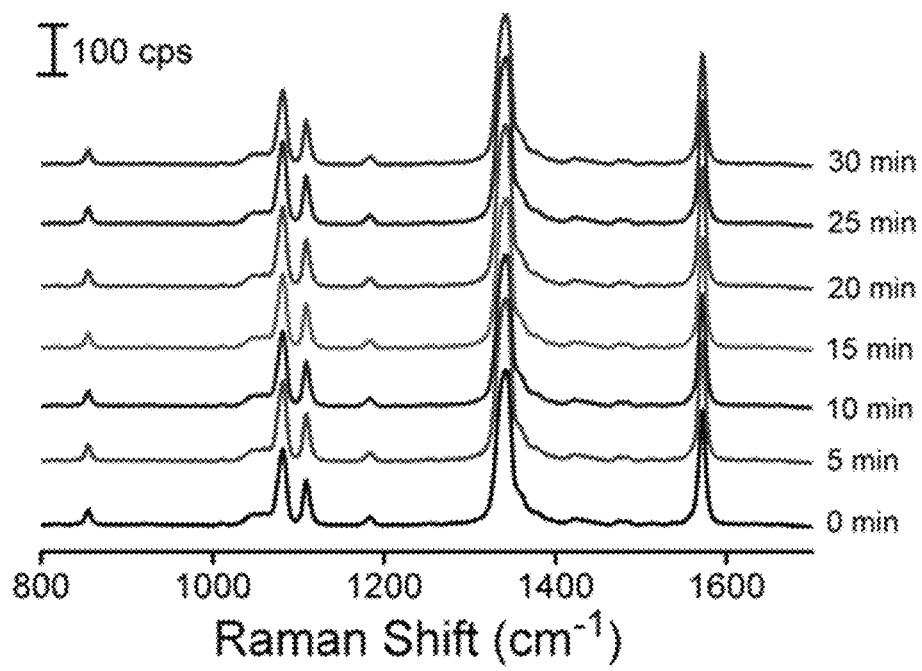
Fig. 5.11
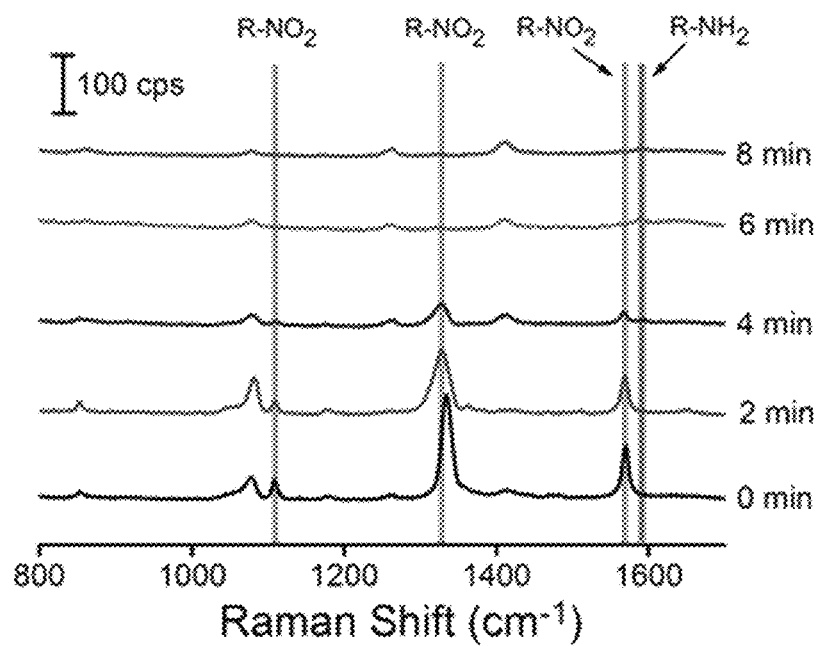
Fig. 5.12

| Ag template | Reaction solution | Product | HR-STEM | TEM image | Ref. |
|---|---|---|---|---|---|
| Nanoplate | AA KI PVP Diethylamin DI water | Ag nanoplate core with Au shell | Yes | ![200 nm] * Voids are visible. | 13a |
| Nanoprism | AA NaOH CTAB DI water | truncated Ag nanoprism core with corrugated Au shell | No | ![50 nm] ** "The decrease in size of the resulting silver core results from the oxidation of silver by Au³⁺" | 13b |
| Nanoprism | HyA NaOH DI water | Ag-Au nanoprism core with Au shell | Yes | ![100 nm] * Voids are visible. | 13c |
| Decahedra | DI water | Ag decahedra core with Au shell | No | ![100 nm] | 13d |

* remark; ** statement by the original authors

Fig. 6

ABSTRACT# SILVER NANOWIRES, METHODS OF MAKING SILVER NANOWIRES, CORE-SHELL NANOSTRUCTURES, METHODS OF MAKING CORE-SHELL NANOSTRUCTURES, CORE-FRAME NANOSTRUCTURES, METHODS OF MAKING CORE-FRAME NANOSTRUCTURES

CROSS-REFERENCE TO RELATED APPLICATIONS

This application is a Continuation of co-pending U.S. application entitled "SILVER NANOWIRES, METHODS OF MAKING SILVER NANOWIRES, CORE-SHELL NANOSTRUCTURES, METHODS OF MAKING CORE-SHELL NANOSTRUCTURES, CORE-FRAME NANOSTRUCTURES, METHODS OF MAKING CORE-FRAME NANOSTRUCTURES" having Ser. No. 14/858,283 filed on Sep. 18, 2015, which application claims priority to U.S. provisional application entitled "Au Coated Ag nanocubes/wires/rods/octahedrons with enhanced chemical stability and optical performance" having Ser. No. 62/052,677, filed on Sep. 19, 2014, both of which are entirely incorporated herein by reference.

STATEMENT REGARDING FEDERALLY SPONSORED RESEARCH OR DEVELOPMENT

This invention was made with government support under Award No. CHE-1412006 awarded by the National Science Foundation. The government has certain rights in the invention.

BACKGROUND

Metal nanowires have received increasing interest as promising materials for transparent electrodes components (TEC) conventionally used in solar cells, touch screen panels, flat and flexible displays. However, many metal nanowires have problematic characteristics, and thus there is a need to find alternatives.

Silver nanocrystals have fascinating optical properties known as localized surface plasmon resonance (LSPR), which is essential to applications for surface-enhanced Raman scattering (SERS), optical sensing, and bio-imaging. Silver nanocubes, in particular, have strong electromagnetic field enhancements at their sharp corners, which can drastically increase the Raman scattering cross sections of molecules at these sites for SERS detection and imaging. However, the susceptibility of elemental Ag to oxidation often leads to corner truncation and thus deterioration of SERS activity. The toxicity of the released $Ag^+$ ions also limits the SERS application of Ag nanocubes in a biological system. Thus, there is a need to find alternatives.

SUMMARY

In accordance with the purpose(s) of the present disclosure, as embodied and broadly described herein, embodiments of the present disclosure provide for silver nanowires, methods of making silver nanowires, core-shell nanostructures, methods of making core-shell nanostructures, core-frame nanostructures, methods of making core-frame nanostructures, and the like.

In an embodiment, the structure, among others, includes: a silver nanowire having a diameter of about 5 to 25 nm and an aspect ratio of about 500 to 5000. In an embodiment, the silver nanowire has a penta-twinned structure. In an embodiment, the silver nanowire has a transverse localized surface plasmon resonance peak below 400 nm.

In an embodiment, the method of making silver nanowires, among others, includes: mixing a bromide ion solution with a solution including poly(vinyl pyrrolidone) and ethylene glycol to form a first mixture; mixing a silver precursor solution with the first mixture to form a second mixture; and heating the second mixture to about 150 to 170° C. to form the silver nanowires, wherein the silver nanowire has a diameter of about 5 to 25 nm and an aspect ratio of about 500 to 5000. In an embodiment, the bromide ion solution can include: a LiBr solution, NaBr solution, KBr solution, RbBr solution, or CsBr solution.

In an embodiment, the structure, among others, includes: a core-shell nanostructure, wherein the core is a silver nanostructure, and wherein the shell is M that is selected from the group consisting of Au, Pd, Pt, a silver alloy, and a bimetallic or multi-metallic combination of these metals. In an embodiment, the silver nanostructure is selected from the group consisting of: a nanorod, a nanowire, a nano-sized polyhedron (e.g., cube, octahedron, bipyramid, decahedron, icosahedron, and cuboctahedron), and a nano-sized prism or thin plate. In an embodiment, the shell can have a thickness of about one to ten atomic layers. In an embodiment, the silver alloy is M-Ag, wherein M is selected from: Au, Pd, Pt, or Cu.

In an embodiment, the method of making a core-shell nanostructure, among others, includes: providing a silver nanostructure solution containing silver nanostructures and a reducing agent and poly(vinyl pyrrolidone); and mixing a metal precursor solution with the silver nanostructure solution to produce the core-shell nanostructure. In an embodiment, the reducing agent is selected from the group consisting of: ascorbic acid, citric acid, formic acid, sodium borohydride, hydrogen gas, aldehydes, alcohols, polyols, carbohydrates, and hydrazine.

In an embodiment, the structure, among others, includes: a core-frame nanostructure including a frame around a hollow area within the frame, wherein the frame is a M-Ag alloy, wherein M is selected from the group consisting of Au, Pd, Pt, and Cu. In an embodiment, the core-frame nanostructure is selected from the group consisting of: a nanorod, a nanowire, a nano-sized polyhedron (e.g., cube, octahedron, bipyramid, decahedron, icosahedron, and cuboctahedron), and a nano-sized prism or thin plate.

In an embodiment, the method of making a core-frame nanostructure, among others, includes: providing a silver nanostructure solution containing silver nanostructures, a reducing agent, and poly(vinyl pyrrolidone); mixing a first metal precursor solution and a second metal precursor solution with the silver nanostructure solution to produce a core-shell nanostructure; and mixing an etchant with the core-shell nanostructure to remove the silver nanostructure to form the core-frame nanostructure, wherein the core-frame nanostructure includes a frame around a hollow area within the frame, wherein the frame is a M-Ag alloy, wherein M is selected from the group consisting of Au, Pd, Pt, and Cu. In an embodiment, the reducing agent is selected from the group consisting of: ascorbic acid, citric acid, formic acid, sodium borohydride, hydrogen gas, aldehydes, alcohols, polyols, carbohydrates, and hydrazine. In an embodiment, the etchant is selected from the group consisting of: $H_2O_2$, $O_2$, $FeCl_3$, $Fe(NO_3)_3$, $K_3Fe(CN)_6$, and ammonia.

Other structures, methods, features, and advantages will be, or become, apparent to one with skill in the art upon examination of the following drawings and detailed description. It is intended that all such additional structures, systems, methods, features, and advantages be included within this description, be within the scope of the present disclosure, and be protected by the accompanying claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1.1 shows extinction spectra recorded from aqueous suspensions containing Ag nanowires prepared at different time intervals during a typical synthesis.

FIGS. 1.2A-D are TEM images of the products collected at different time intervals during the polyol synthesis of Ag nanowires: FIG. 1.2A 5 min, FIG. 1.2B 35 min, FIG. 1.2C 60 min, and FIG. 1.2D 180 min.

FIGS. 1.3A-F are SEM (FIGS. 1.3A-B) and TEM (FIGS. 1.3C-D) images of Ag nanowires obtained in an optimal synthesis (35 min). The inset in FIG. 1.3B highlights the contrast across the twin boundaries of a single nanowire along the entire longitudinal direction. The TEM images in FIG. 1.3C suggest that thin Ag nanowires could be bent in acute angles without being broken. FIGS. 1.3E-F show the high-resolution TEM images of the middle and tip sections of Ag nanowires, respectively. The periodic fringes confirm the f.c.c. silver structure. The black arrows in FIGS. 1.3E-F indicate the twin plane on both sections of the nanowire.

FIG. 1.4 is a schematic illustration of the synthetic pathways to the products achieved under different PVP/Ag and Ag/Br molar ratios. A high concentration of PVP or Br– induce the formation of isotropic particles. Due to its small size comparing to PVP capping agent (inset), it is suggested that Br– might contribute to kinetically decrease the lateral growth rate of Ag nanowires by efficiently cover the {100} facets of the nanocrystal. Shades of gray denote the {100} and {111} facets of Ag nanowires. Twin planes are outlined with lines.

FIGS. 1.5A-B are TEM images of Ag nanowires collected at 35 min in a typical synthesis, except for the difference in the PVP/Ag molar ratio: (FIG. 1.5A) 3 and (FIG. 1.5B) 6. The increase of concentration of PVP in the reaction mixture led to a reduction of aspect ratio of Ag nanowires whereas the yield was significantly decreased.

FIG. 1.6A is a TEM images of Ag nanowires prepared in a typical synthesis for 180 min, except that Br⁻ was not added in the reaction mixture. FIG. 1.6B is a TEM image of Ag nanocubes and Ag right bipyramids nanostructures obtained from the reaction mixture at 180 min as a result of the oxidative etching.

FIG. 1.7 shows experimental (black) and calculated extinction spectra (gray) using the discrete dipole approximation (DDA) method for the transverse LSPR mode of Ag nanowires with a diameter of 20 nm.

FIG. 1.8 demonstrates the XRD pattern of Ag nanowires prepared using the optimal procedure isolated at 35 min. Because the enhancement of (111) planes in the Ag nanowires, the ratio of intensity between Ag(111) and Ag(200) peaks is higher comparing to the XRD pattern of fcc structure for bulk metallic silver. Gray bar: JCPDS #04-0783.

FIGS. 1.9A-D are TEM images of products obtained in a typical synthesis of Ag nanowires when the long-chain PVP (MW 1,300,000 g/mol) was replaced with PVP of shorter chain lengths: (FIG. 1.9A) 10,000 g/mol (FIG. 1.9B) 29,000 g/mol, (FIG. 1.9C) 40,000 g/mol, and (FIG. 1.9D) 55,000 g/mol. induced when the Ag/Br molar ratio was increased by 10 folds (i.e. Ag/Br=6).

FIGS. 1.10A-B are TEM images of Ag nanostructures obtained in a typical synthesis for 35 min when NaBr was replaced with (FIG. 1.10A) NaCl and (FIG. 1.10B) NaI. Ag nanowires displayed larger diameters in the presence of Cl⁻. On the other hand, irregular Ag particles were obtained when I⁻ was introduced on the reaction mixture.

FIGS. 2.1A-B show UV-vis spectrum (FIG. 2.1A) and TEM image (FIG. 2.1B) of the Ag nanowires obtained using the polyol synthesis.

FIG. 2.2A shows a UV-vis spectra of Ag@Au core-sheath nanowires prepared by adding different volumes of the Au(OH)$_4^-$ solution (0.5, 1.0, 1.5 and 2.0 mL) and FIG. 2.2B is a TEM image of the Ag@Au core-sheath nanowires prepared after adding 2 mL of the Au(OH)$_4^-$ solution.

FIGS. 2.3A-B are TEM images of Ag@Au core-sheath nanowires synthesized at room temperature before (FIG. 2.3A) and after (FIG. 2.3B) H$_2$O$_2$ etching.

FIG. 2.4 is a UV-vis spectra of Ag@Au core-sheath nanowires synthesized at 80° C. with the addition of 0.5 mL and 1.0 mL 0.1 mM Au(OH)$_4^-$ solution.

FIG. 2.5A shows a UV-vis spectra of the pristine Ag nanowires and Ag@Au core-sheath nanowires after etching with 3% H$_2$O$_2$. The core-sheath nanowires were prepared by adding different volumes of Au(OH)$_2^-$. FIG. 2.5B is a TEM image of the Ag@Au core-sheath nanowires prepared with the use of 2.0 mL Au(OH)$_4^-$ solution, after etching with 3% H$_2$O$_2$ solution.

FIG. 3.1 is a schematic illustration of the two possible routes and products for syntheses that involve Ag nanocubes and HAuCl$_4$ in the presence of a weak (Route I) and strong (Route II) reducing agent based on AA at different pH values. The structure of the product is determined by the AA reduction rate ($R_{red}$) relative to the galvanic reaction rate ($R_{gal}$).

FIGS. 3.2A-D are TEM images of Ag@Au nanocubes before (FIGS. 3.2A and 3.2C) and after (3.2B and 3.2D) incubation with an excess amount of 2.3% aqueous H$_2$O$_2$. The samples were prepared from (FIGS. 3.2A-B) 38-nm Ag cubes and (FIGS. 3.2C-D) 106-nm Ag cubes.

FIGS. 3.3A-D are HAADF-STEM images taken from two samples of Ag@Au nanocubes where the Au shells were (FIGS. 3.3A-B) three and (3.3C-D) six atomic layers, respectively, in thickness.

FIG. 3.4A is UV-vis spectra taken from the Ag nanocubes, and the Ag@Au nanocubes before and after mixing with 2.3% aqueous H$_2$O$_2$ for 10 h. FIG. 3.4B is a SERS spectra recorded from aqueous suspensions of the 1,4-BDT-functionalized Ag nanocubes and Ag@Au nanocubes, respectively.

FIGS. 3.5A-D are TEM images of (FIG. 3.5A) the 38-nm Ag nanocubes; (FIG. 3.5B) the 106-nm Ag nanocubes; (FIG. 3.5C) Ag—Au hollow nanocubes prepared from the 38-nm Ag nanocubes when a mixture of AA and HCl was used as the reducing agent; and (FIG. 3.5D) the same batch of sample as in FIG. 3.5C after etching with an excess amount of 2.3% aqueous H$_2$O$_2$.

FIGS. 3.6A-B are TEM images of the Ag@Au core-shell nanocubes (FIG. 3.6A) before and (FIG. 3.6B) after etching with an excess amount of 2.3% aqueous $H_2O_2$. The sample was prepared from the 38-nm Ag nanocubes with the use of $NaBH_4$ as a reducing agent.

FIG. 3.7A illustrates dependence of pH value on the volume of aqueous HAuCl4 added into a reaction solution that contained 0.5 mL of 10 mM AA and 0.1 mL of 200 mM NaOH. TEM images of the 38-nm Ag nanocubes after reacting with (FIG. 3.7B) 0.6 and (FIG. 3.7C) 0.8 mL of 0.1 mM aqueous HAuCl4, respectively.

FIG. 3.8A shows dependence of pH value on the volume of aqueous HAuCl4 added into a reaction solution that 0.5 mL of 100 mM AA and 0.5 mL of 200 mM NaOH. TEM images of the 38-nm Ag nanocubes after reacting with (FIG. 3.8B) 0.8 and (FIG. 3.8C) 1.0 mL of 0.1 mM aqueous HAuCl4, respectively.

FIGS. 3.9A-B are TEM images of the Ag@Au core-shell nanocubes before and after etching with an excess amount of 2.3% aqueous $H_2O_2$. The sample was prepared from the 106-nm Ag nanocubes by adding 1.5 mL of aqueous $HAuCl_4$ into a reaction solution that contained 0.5 mL of 10 mM AA and 0.1 mL of 200 mM NaOH.

FIG. 3.10 is a UV-vis spectrum of an aqueous suspension of the 38-nm Ag nanocubes after incubation with 2.3% aqueous $H_2O_2$ for 3 min.

FIG. 3.11A is UV-vis spectra of the Ag@Au nanocubes (see FIG. 3.2A) before and after incubation with 1 μM NaHS aqueous solution for 2 days; and FIG. 3.11B is a TEM image of the Ag@Au nanocubes after incubation with 1 μM NaSH aqueous solution for 2 days.

FIG. 3.12 shows UV-Vis spectra of the Ag@Au core-shell nanocubes (see FIG. 3.2A) before and after they had been functionalized with 1,4-BDT probe molecules.

FIG. 4.1 illustrates the contents of Ag and Au in the Ag@Ag—Au nanocubes obtained by co-titrating different volumes of aqueous $AgNO_3$ (0.3 mM) and $HAuCl_4$ (0.1 mM) into an aqueous suspension of Ag nanocubes in presence of AA. The data points marked as "deposited" are the amounts of Ag and Au in the Ag@Ag—Au nanocubes determined using ICP-MS analysis. The data points marked as "added" represent the amounts of Ag and Au derived from the titrated $AgNO_3$ and $HAuCl_4$ by assuming their complete co-reduction and then co-deposition onto the Ag nanocubes.

FIGS. 4.2A-D show SEM images of Ag@Ag—Au nanocubes that were prepared by co-titrating different volumes of aqueous $AgNO_3$ (0.3 mM) and $HAuCl_4$ (0.1 mM): (FIG. 4.2A) 0.2, (FIG. 4.2B) 0.4, (FIG. 4.2C) 0.8, and (FIG. 4.2D) 1.5 mL for each precursor.

FIGS. 4.3A-D are TEM images of the Ag@Ag—Au nanocubes after etching with 3% aqueous $H_2O_2$. The samples were prepared by co-titrating different volumes of aqueous $AgNO_3$ (0.3 mM) and HAuCl4 (0.1 mM): (FIG. 4.3A) 0.2, (FIG. 4.3B) 0.4, (FIG. 4.3C) 0.8, and (FIG. 4.3D) 1.5 mL for each precursor.

FIG. 4.4 (top) illustrates a list of three competing reactions involved in the co-titration process. On the bottom is an illustration of the transformation of a Ag nanocube into three types of Ag@Ag—Au nanocubes by increasing the volumes of the two co-titrated precursors, followed by removal of Ag templates to generate Ag—Au nanoframes or nanocages.

FIGS. 4.5A-B illustrate a UV-vis spectra taken from an aqueous suspension of Ag nanocubes before and after they were reacted with different volumes (indicated on the curves) of (4.5A) 0.3 mM $AgNO_3$ and 0.1 mM $HAuCl_4$ and (4.5B) 0.1 mM $AgNO_3$ and 0.1 mM $HAuCl_4$.

FIGS. 4.6A-B illustrate a SERS spectra taken from 1,4-BDT adsorbed on the Ag and Ag@Ag—Au nanocubes, respectively, at excitation wavelength of (4.6A) 532 nm and (4.6B) 785 nm, respectively. The Ag@Ag—Au nanocubes were prepared by co-titrating 0.4 mL of $AgNO_3$ (0.3 mM) and 0.4 mL of $HAuCl_4$ (0.1 mM) into the Ag nanocubes in the presence of AA.

FIGS. 4.7A-B illustrate a time-dependent UV-vis adsorption spectra recorded at different time points for the reduction of 4-NP by $NaBH_4$ at room temperature in the presence of the Ag—Au alloyed nanoframes as a catalyst. FIG. 4.7B illustrate a plot of $\ln[A_0/A_t]$ versus time for the peak at 400 nm. The sample was prepared by co-titrating 0.2 mL of $AgNO_3$ (0.3 mM) and 0.2 mL of $HAuCl_4$ (0.1 mM) into the Ag nanocubes in the presence of AA, followed by etching in 3% aqueous $H_2O_2$ for 1 h.

FIGS. 5.1A-F illustrate TEM images of Ag@Pd—Ag nanocubes before (left panel) and after (right panel) incubation with 2.3% aqueous $H_2O_2$. The samples were prepared by co-titrating different volumes of aqueous $Na_2PdCl_4$ and $AgNO_3$: (FIGS. 5.1A, 5.1D) 0.1, (FIGS. 5.1B, 5.1E) 0.2, and (FIGS. 5.1C, 5.1F) 0.3 mL for each precursor. The scale bars in the insets are 20 nm.

FIG. 5.2 (top) is a schematic illustration of proposed pathways for the selective deposition of Pd and Ag atoms onto different facets of a Ag nanocube whose {100} facets are capped by PVP. The bottom is an illustration (a cross-section along the front surface) of the transformation of a Ag nanocube into three different types of Ag@Pd—Ag nanocubes by increasing the volume of precursors co-titrated into the system.

FIGS. 5.3A-B illustrate SERS spectra recorded from aqueous suspensions of nanocubes functionalized with 1,4-BDT molecules: FIG. 5.3A illustrates Ag@Pd—Ag nanocubes prepared with the co-titration of different volumes of $Na_2PdCl_4$ and $AgNO_3$, respectively, and FIG. 5.3B illustrates Ag@Pd nanocubes prepared by adding different volumes of $Na_2PdCl_4$ only.

FIGS. 5.4A-B illustrate SERS spectra recorded during the reduction of 4-NTP to 4-ATP catalyzed by (FIG. 5.4A) the Ag@Pd—Ag nanocubes and (FIG. 5.4B) the Ag nanocubes, respectively, in the presence of $NaBH_4$. The R—$NO_2$ and R—$NH_2$ represent the 4-NTP and 4-ATP, respectively.

FIG. 5.5 illustrates TEM image of the Ag nanocubes with an edge length of 39.2±1.6 nm.

FIG. 5.6 illustrates a UV-vis spectra of Ag nanocubes before and after they had reacted with different volumes of (FIG. 5.6A) $Na_2PdCl_4$ (0.2 mM) and $AgNO_3$ (0.1 mM), and (FIG. 5.6B) $Na_2PdCl_4$ (0.2 mM), respectively.

FIGS. 5.7A-B illustrate TEM images of Ag@Pd nanocubes prepared with the titration of 0.2 mL of aqueous $Na_2PdCl_4$ solution (0.2 mM) before (FIG. 5.7A) and after (FIG. 5.7B) etching with an excess amount of 2.3% aqueous $H_2O_2$.

FIG. 5.8A illustrates UV-vis spectra of aqueous 4-NP at different time intervals since the catalytic reaction started in the presence of Ag@Pd—Ag nanocubes prepared with the co-titration of 0.2 mL of $Na_2PdCl_4$ and $AgNO_3$. FIG. 5.8B illustrates absorption (normalized against the initial point) at 400 nm as a function of reaction time in the presence of Ag nanocubes, the Ag@Pd—Ag nanocubes prepared with the co-titration of 0.2 mL and 0.3 mL of $Na_2PdCl_4$ and $AgNO_3$, and the Ag@Pd nanocubes prepared with the titration of 0.2 mL of $Na_2PdCl_4$. The error bars in panel B represent the standard deviations obtained from three experimental runs.

FIG. 5.9 illustrates UV-vis spectra of the Ag@Pd—Ag nanocubes (see FIG. 5.1B), prepared with the co-titration of 0.2 mL of Na$_2$PdCl$_4$ and AgNO$_3$, before and after they had been functionalized with 4-NTP molecules.

FIG. 5.10 illustrates the normal Raman spectra of 4-NTP and 4-ATP powder.

FIG. 5.11 illustrates SERS spectra collected from 4-NTP adsorbed on the surfaces of Ag@Pd—Ag nanocubes, prepared with co-titration of 0.2 mL of Na$_2$PdCl$_4$ and AgNO$_3$, at various time points under 532 nm laser illumination in the absence of NaBH$_4$.

FIG. 5.12 illustrates SERS spectra recorded during the reduction of 4-NTP to 4-ATP catalyzed by the Ag@Pd nanocubes, prepared with the titration of 0.2 mL of Na$_2$PdCl$_4$ (0.2 mM), in the presence of NaBH$_4$. The R—NO$_2$ and R—NH$_2$ represent 4-NTP and 4-ATP, respectively.

FIG. 6 shows a table that shows examples of Ag—Au nanostructures that have been reported in the literature.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of materials science, chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for silver nanowires, methods of making silver nanowires, core-shell nanostructures, methods of making core shell nanostructures, core-frame nanostructures, methods of making core-frame nanostructures, and the like.

In general, a metal shell can be disposed on a nanostructure (e.g., nanowire, nano-sized polyhedron, and the like), where the amount of the metal shell can be controlled, which can result in enhanced properties. In an embodiment, the nanostructure can have SERS and catalytic properties and be chemically stable (e.g., under oxidative conditions). In particular, the core-shell nanostructure can have a very similar SERS activity as the core without the shell, while the shell provides chemical stability (e.g., in the presence of an oxidant such as H$_2$O$_2$ or O$_2$). Other embodiments of the present disclosure can have excellent catalytic properties. Embodiments can be used as conductive components in touch screens, liquid crystal displays, optoelectronics, LEDs, and solar cells, as well interconnects, conductive inks, infrared radiation shielding, and transparent heaters, while other embodiments can be used generally in applications that relate to fuel cells, catalytic converters, optical lighting, SERS, surface enhanced fluorescence enhancement, nanoantennas, chemical and biological sensing, and the like. Additional details are provided in the Examples.

An embodiment of the present disclosure includes a silver nanowire that can have a diameter of less than 30 nm, about 5 to 25 nm, about 5 to 20 nm or about 10 to 20 and an aspect ratio of about 500 to 5000 or about 500 to 2500 (See figures in the Examples such as FIG. 1.4). In an embodiment, the silver nanowire has a penta-twinned structure. In addition, embodiments of the present disclosure can have a transverse localized surface plasmon resonance peak in the ultraviolet region. In particular, embodiments of the present disclosure can have a transverse localized surface plasmon resonance peak of below 400 nm, about 370 to 380 nm, or about 374 nm or 376 nm. Furthermore, the silver nanowires are very flexible can be bent at acute angles with a curvature less than 1 µm without being broken.

In an embodiment, the silver nanowires can be made using the following method. A bromide ion solution can be mixed with a solution including poly(vinyl pyrrolidone) and ethylene glycol to form a first mixture. The bromide ion solution can be a LiBr solution, NaBr solution, KBr solution, RbBr solution, or CsBr solution. The poly(vinyl pyrrolidone) can have a molecular weight of about 1×10$^6$ g/mol to 1.5×10$^6$ g/mol, about 1.3×10$^6$ g/mol, or about 1×10 g/mol to 1×10$^5$ g/mol. The range of the concentration of the any of the bromide ion solutions can be about 0.5 to 5.0 times the values described in the examples for the specific bromide ion solutions provided in this disclosure. The amount of poly(vinyl pyrrolidone) can be about 0.5 to 5.0 times the values described in the examples provided in this disclosure.

Subsequently, the first mixture is mixed with the silver precursor solution to form a second mixture. In an embodiment, the silver precursor solution can be added to the second mixture using a device such as a syringe pump at a desired injection rate (e.g., about 0.15 mL/min). The silver precursor solution can include $AgNO_3$, $CF_3COOAg$, $CH_3COOAg$, or AgCl. The concentration of any of the silver precursor solutions in the second mixture can be about 0.5 to 5.0 times the concentration as described in the examples below.

The second mixture can be heated to about 150° to 170° C. or about 180° C. for about 25 to 45 minutes to form the silver nanowires. The mixture can then be cooled and processed to form a suspension of silver nanowires. In an embodiment, the method can take about 35 minutes or less and can produce a high yield (e.g., about 80 to 90% of the obtained product). Additional details are provided in the Examples.

Now turning to embodiments of the core-shell nanostructure, embodiments of the core-shell nanostructure can include a core that is a silver nanostructure (See figures in the Examples such as FIGS. 4.3A-D, 4.4, 5.2). The silver nanostructure can be a nanocube, a nanowire, a nanorod, a nano-sized polyhedron (e.g., a hexahedron, an octahedron, bipyramid, decahedron, icosahedron, cuboctahedron, and prism or thin plate), prism, or thin plate. The largest dimension of the silver nanocube or the nano-sized silver polyhedron can be 15 to 300 nm. In an embodiment the length, width, and height of the nanocube can be about 15 to 250 nm. In an embodiment the diameter of the nanowire can be about 5 to 25 nm or 5 to 20 nm and the aspect ratio can be about 500 to 10,000. In an embodiment the diameter of the nanowire can be about 20 to 500 nm and the aspect ratio can be about 100 to 10,000.

In an embodiment, the shell can be a metal (M) such as Au, Pd, Pt, Cu, or a bimetallic or multi-metallic combination of these metals. In an embodiment, the shell can be a silver alloy (M-Ag) such as Au, Pd, Pt, Cu, or a bimetallic or multi-metallic combination of these metals. In an embodiment, the shell covers all or substantially all (e.g., about 80 to 99.9%) of the outer surface of the silver nanostructure. In an embodiment, the shell covers only a portion of the outer surface of the silver nanostructure, for example, the shell covers the edges of the silver nanostructure (e.g., forming a frame along the edges and corners of the polyhedron, where a portion (e.g., about 5 to 95%) of each face is not covered). In an embodiment, the shell can have a thickness of about 1 to 10 atomic layer or about 3 to 6 atomic layers. In an embodiment, the shell can have a thickness of about 0.2 to 4 nm or about 0.6 to 1.2 nm.

In an embodiment, the silver nanostructure is a nanowire, so the core-shell nanostructure is a silver nanostructure having a shell or sheath covering the silver nanowire. The coated silver nanostructure has improved chemical stability, for example, chemical stability towards oxidative conditions such as $H_2O_2$ etching. In addition, the coated silver nanostructure has an electrical conductivity that is the same or substantially the same as the silver nanowire without the shell. The electrical conductivity can be maintained by matching the electrical conductivity of the silver nanowire with the metal of the shell (e.g., Au).

Embodiments of the present disclosure include methods of making the core-shell nanostructure. A silver nanostructure solution including silver nanostructures and a reducing agent and poly(vinyl pyrrolidone) is prepared. The silver nanostructure can include those described herein. The poly(vinyl pyrrolidone) has a molecular weight of about $1\times10^6$ g/mol to $1.5\times10^6$ g/mol, about $1.3\times10^6$ g/mol, or about $1\times10^4$ g/mol to $1\times10^5$ g/mol. The reducing agent can include ascorbic acid, citric acid, formic acid, sodium borohydride, hydrogen gas, aldehydes, alcohols, polyols, carbohydrates, and hydrazine. The typical concentration of Ag nanostructures can be from about $10\times10^9$ to about $10\times10^{10}$ particles per mL, while the concentration of metal precursor and reducing agent can be estimated by one of ordinary skill in the art depending on the amount metal to be deposited and the stoichiometry between the precursor and the reducing agent.

A metal precursor solution can be mixed with the silver nanostructure solution to produce the core-shell nanostructures. The pH of the mixture can be adjusted from 3.0 to 12.0 using a strong base such as NaOH or KOH solution. In an embodiment, the metal precursor solution can be added to the silver nanostructure solution using a device such as a syringe pump at a desired injection rate (e.g., about 0.02 to 1 mL/min). The metal of the metal precursor solution can be Au, Pd, Pt, Ag, Cu, or a bimetallic or multi-metallic combination of these metals. The metal precursor solution can include $HAuX_4$, $HAuX_2$, $HAuX_4$, $HAuX_2$, $Na_2PdX_4$, $K_2PdX_4$, $Na_2PtX_4$, $K_2PtX_4$, $Na_2PtX_6$, $K_2PtX_6$, $H_2PtX_6$ ($X=Cl^-$, $Br^-$, $I^-$, or a mixture of these halide ions), $CuCl_2$, $AgNO_3$, or $CF_3COOAg$. The concentration of the metal precursor solution can be about 0.5 to 5.0 times the concentration of any of the metal precursors described in the examples below.

The metal precursor solution and the silver nanostructure solution can be heated to about 0° to 100° C. for about 45 to 75 minutes to form the core-shell nanostructures. The mixture can then be cooled and processed to form a suspension of core-shell nanostructures. Additional details are provided in the Examples.

In an embodiment where a silver alloy (M-Ag) shell is formed, a metal precursor solution and a silver precursor solution can be mixed with the silver nanostructure solution to produce the core-shell (M-Ag) nanostructures. In an embodiment, the metal precursor solution and the silver precursor solution can be separately added to the silver nanostructure solution using a device such as a syringe pump at a desired injection rate (e.g., about 0.02 mL/min). As in the other embodiment, the metal of the metal precursor solution can be Au, Pd, Pt, Cu, or a bimetallic or multi-metallic combination of these metals. The metal precursor solution can include $HAuX_4$, $HAuX_2$, $HAuX_4$, $HAuX_2$, $Na_2PdX_4$, $K_2PdX_4$, $Na_2PtX_4$, $K_2PtX_4$, $Na_2PtX_6$, $K_2PtX_6$, $H_2PtX_6$ ($X=Cl^-$, $Br^-$, $I^-$, or a mixture of these halide ions), $CuCl_2$, $AgNO_3$, or $CF_3COOAg$. Specific metal precursor solutions include $HAuCl_4$, $Na_2PdCl_4$, or $K_2PtCl_4$. The silver precursor solution can include $AgNO_3$, $CF_3COOAg$, $CH_3COOAg$, or AgCl. The concentration of the metal precursor solution can be about 0.5 to 5.0 times the concentration of any of the metal precursors described in the examples below. The concentration of the silver precursor solution can be about 0.5 to 5.0 times the concentration of any of the silver precursor solutions described in the examples below.

The metal precursor solution/silver precursor solution and the silver nanostructure solution can be reacted for about 45 to 75 minutes to form the core-shell (M-Ag) nanostructures, at an appropriate temperature such as room temperature. The mixture can then be cooled and processed to form a suspension of core-shell nanostructures. Additional details are provided in the Examples.

An embodiment of the structure can include a core-frame nanostructure that is the "shell" of the core-shell nanostructure having the core removed. The core-frame nanostructure can include a frame around a hollow area within the frame (e.g., previously where the core was located). In an embodiment, the frame corresponds to the outside, edges, and/or corners of the nanostructure. In other words, the frame covered only a portion of the outer surface of the silver nanostructure, for example, the frame covered the edges of the silver nanostructure (e.g., forming a frame along the edges of the polyhedron, where a portion (e.g., about 5 to 95%) of the face are not covered). In this regard, the frame is grown from the edges and corners of the silver nanostructure to form the frame, and then the silver nanostructure is removed to from the frame. In another embodiment, the frame can be more extensive and can not only have covered the edges and corners of the silver nanostructure (prior to removal) but also a portion of the faces of the silver nanostructure (prior to removal) as long as the silver nanostructure could have been removed to form the frame (details regarding the fabrication of the frame are described below and in the Examples). In an embodiment, the frame can have a thickness of about 1 to 10 atomic layer or about 3 to 6 atomic layers. In an embodiment, the frame can have a thickness of about 0.6 to 4 nm or about 0.6 to 1.2 nm.

In an embodiment, the frame can be made of a metal (M) or a metal silver alloy (M-Ag alloy). In an embodiment, M can be Au, Pd, Pt, Cu, or a bimetallic or multi-metallic combination of these metals. The core-frame nanostructure can be a nanocube frame, a nanowire frame, a nanopolyhedron frame (e.g., a hexahedron frame, an octahedron frame, bipyramid, decahedron, icosahedron, cuboctahedron, and prism or thin plate), prism, or thin plate. The largest dimension of the nanocube frame or the nanopolyhedron frame can be 10 to 300 nm. In an embodiment the length, width, and height of the nanocube frame can be about 15 to 250 nm. In an embodiment the diameter of the nanowire frame can be about 5 to 25 nm or about 5 to 20 nm and the aspect ratio can be about 500 to 10,000. In an embodiment the diameter of the nanorod frame can be about 25 to 500 nm and the aspect ratio can be about 100 to 10,000.

As briefly discussed above, the method of forming the core-frame nanostructure can include providing core-shell nanostructures such as those described herein. The core-shell nanostructure can be mixed with an etchant to remove the silver nanostructure to form the core-frame structure. In an embodiment, the etchant can include $H_2O_2$, $O_2$, $FeCl_3$, $Fe(NO_3)_3$, $K_3Fe(CN)_6$, and ammonia, each at a concentration to remove the core of the core-shell nanostructure.

EXAMPLES

Example 1

Currently, most of the reported Ag nanowires are usually limited to sizes larger than 30 nm in diameter. Here we describe a facile approach to the synthesis of Ag nanowires with diameters thinner than 20 nm and aspect ratios beyond 1,000 using a one-pot method. The Ag nanowires had a penta-twinned structure, and could be obtained rapidly (<35 min) and in highly yield (~86% of the as-obtained solid product) under ambient pressure. The key strategy was to introduce bromide ions and poly(vinyl pyrrolidone) (PVP) with a high molecular weight of 1,300,000 g/mol as the capping agents. Optimizing the ratio of capping agents to Ag precursor allowed us to manipulate the reduction kinetics and limit the lateral growth of Ag nanowires during the synthesis. Additionally, the nanowires showed to be highly flexible; they could be bent in acute angles without being broken. Because of the small diameters of the Ag nanowires, the transverse localized surface plasmon resonance peak is located below 400 nm, into the ultraviolet region.

Introduction

Metal nanowires have received increasing interest as promising material for transparent electrodes components (TEC) conventionally used in solar cells,[1, 2] touch screen panels,[3] flat and flexible displays.[4] Essentially, TEC materials have to exhibit high transmittance (T>90% at 550 nm) and low sheet resistance (R<10 Ohm/sq). The most commercially important TEC material is indium tin oxide (ITO), a semiconductor-based film composed of ~90% of $I_2O_3$ and 10% $SnO_2$.[5] However, the limited supply of indium and the brittleness nature of ITO films hinder their market penetration in flexible devices. As a serious alternative, films of Ag nanowires (Ag NWs) have shown exceptional optical-conductive performance under high bend strains as equivalent as or better than ITO film in flat surfaces.[6, 7]

Despite the high intrinsic thermal and electric conductivity compared to other metals, many efforts have been paid to further improve the transparency of Ag nanowires in the visible region seeking the TCE market. In general, most attention have been devoted to minimize the fraction of the area covered by Ag NWs on a film without compromise the electric conductivity.[8] The transparency is a function of the 'open area' generated with the assembly of the nanowires in a film where the light pass through. The increase of the aspect ratio of the Ag NW (ratio between the length and diameter) could provide an interesting strategy to improve the overall film transparency. For example, long Ag NW displaying smaller diameters results in films with wider open areas (i.e. higher transmittance) than ones fashioned with nanowires attaining larger diameters.[9]

Additionally, long Ag NWs with diameters in the range of 30-200 nm show noticeable localized surface plasmon resonance (LSPR) in the ultraviolet-blue region,[10, 11] which is wavelength-tunable to the diameter of the nanowire. It is predicted that the transmittance of Ag NWs in the visible region could be greatly enhanced when the diameter is smaller than 25 nm; thus, the LSPR could be push down toward shorter wavelengths.[4, 8, 12] However, Ag NWs with diameters smaller than 30 nm seems to be very hard to achieve. To date, few reports have been succeeded on the reduction of the Ag NWs diameter whose synthesis usually requires high pressure conditions[13] or chemically active templates such as supramolecular dye nanotubes.[14]

By fine-tuning the experiment parameters, the polyol synthesis have been shown so far the most powerful solution-phase route to kinetically drive the formation of Ag NWs. Our group have paved the way to high-throughput synthesis of uniform Ag NWs through the polyol method in 2002.[15, 16] Typically, the synthesis of Ag NWs is based on the cold injection of silver precursor (e.g. $AgNO_3$) and polymeric capping agent (e.g. poly(vinylpyrrolidone), PVP) solutions on hot ethylene glycol (EG). During the synthesis, Ag decahedral seeds with five-fold twin planes are continuously generated by a self-seeding process and further evolve into nanowires with a pentagonal cross-section. We and others groups have demonstrated the potential of this polyol process to produce Ag NWs with diameter in the range of 30-50 nm, and lengths of up to ~50 μm.[17, 15].

The constraints of the synthesis of thinner and long Ag nanowires are mainly addressed to two issues: a) the generation of small twinned decahedral seeds and b) control of the lateral growth of the nanowire on the course of the reaction. The remaining challenge relies to find an effective capping agent capable to restrain the Ag decahedral seeds into small size and, simultaneously, to control the kinetic, hindering the lateral growth of the Ag nanowires. From previous studies, we gained insights into how ionic species such as halide ions could induce a preferential growth and reduce the overall size of Ag nanostructures compared with polymer capping agents (e.g. polyvinypyrrolidone, PVP).[18, 19] For example, Br$^-$ ions have been shown to induce a symmetry breaking on the development of Ag nanobars instead nanocubes.[18] Cui and co-workers reported that the introduction of Br$^-$ ions significantly decreased the diameter average of pentagonal Ag NWs from 100 nm to 50 nm prepared through polyol method.[11] Kim and coworkers[13] have shown the synthesis of thin Ag NWs through a high-pressure polyol method under inert atmosphere by combining a mixture of KBr and NaCl The authors reported to achieve pentagonal Ag nanowires with diameter below 20 nm as function of the applied pressure (>13 atm) at 170° C. followed by post-treatment under inert atmosphere.

Herein, we have developed a facile method for the preparation of long and thin Ag NWs with diameter smaller than 20 nm and aspect ratio (ratio between length and diameter) beyond 1,000. The manipulation of reduction kinetics was feasible thanks to the use of bromide ions and long-chain PVP molecules as selective capping agents through the one-pot polyol synthesis performed at ambient atmosphere.

Experimental Methods and Materials

Chemical and Materials

Ethylene glycol (EG, J. T. Barker, lot n. 0000034605), poly(vinyl pyrrolidone) (PVP, MW=10,000 g/mol, 29,000 g/mol, 40,000 g/mol, 55,000 g/mol and 1,300,000 g/mol, Aldrich), silver nitrate (AgNO$_3$, +99%, Aldrich), sodium bromide (NaBr, 99.0%, Aldrich), sodium chloride (NaCl, 99% Aldrich), and sodium iodide (NaI, 99.0%, Aldrich) were all used as received without further purification. Deionized (DI) water with a resistivity of 18.2 MΩ·cm was used throughout the experiments.

Synthesis of Ag Nanowires with a Diameter Below 20 nm with an Aspect Ratio Beyond 1000

In a typical synthesis, PVP (MW=1,300,000 g/mol, 25 mg) was dissolved in EG (4 mL) in a 20 mL vial and preheated in an oil bath (160° C.) for 60 min under magnetic stirring (320 rpm). A solution of AgNO$_3$ 100 mM and NaBr 50 mM in EG were prepared prior the pre-heating step. Then, the NaBr solution (60×10$^{-3}$ mL, 50 mM) was added into the vial. After 5 min, AgNO$_3$ (1.5 mL, 100 mM) solution was continuously added via a syringe pump (KDS-200, Stoelting, Wood Dale, Ill.) at an injection rate of 0.15 mL/min. The reaction mixture was kept at 160° C. for 180 min. In an optimal synthesis, the reaction mixture was quenched by immersing the vial in an ice-water bath after 35 min from the introduction of AgNO$_3$ solution. Afterwards, the dispersion of Ag nanowires was crushed with acetone (15 mL) and subsequently washed with DI water to remove EG and excess of PVP at 2000 rpm. Finally, the product was collected and suspended in DI water (5 mL) for further characterization.

Instrumentation

Transmission electron microscopy (TEM) images were taken using a HT7700 microscope operated at 120 kV (Hitachi, Tokyo, Japan). The high resolution TEM images were taken using a Cs-corrected FEI Titan 80-300 microscope STEM/TEM operated at 300 kV (FEI Co., Hillsboro, Oreg., USA). The samples were prepared by drop casting the nanowires dispersions on carbon-coated Cu grids (Electronic Microscopy Science, Redding, Calif., for TEM) and drying in the fume hood. UV-visible extinction spectra were taken at room temperature on a Cary 60 (Agilent Technologies, Santa Clara, Calif., USA) using a plastic cuvette with an optical path of 1 cm. XRD patterns were obtained with a PANalytical X'Pert PRO Alpha-1 diffractometer (PANalytical Inc., Westborough, Mass., USA) using 1.8 kW Ceramic Copper tube source.

Results and Discussion

In this Example, we developed a strategy based on the polyol method to produce Ag nanowires with diameter below 20 nm and aspect ratio>1,000 employing PVP as stabilizer, NaBr or KBr as capping agents, AgNO$_3$ as the Ag precursor, EG as the solvent and source of reducing agents (glycolaldehyde),[20] and 160° C. as the reaction temperature.

Once the precursor had been introduced into the hot solution of PVP/NaBr in EG, several color changes took place: the first droplets of Ag precursor produced a milky-white (within 2 min) color over the reaction mixture. The subsequent addition of AgNO$_3$ gradually changed the color from pink-white (within 6 min) to clear pale yellow after the complete addition of AgNO$_3$ solution (within 10 min). By about 35 min after the complete injection of Ag precursor, the solution color became greenish gray indicating the formation of Ag NWs.

We systematically evaluated the time-dependent optical and morphologic changes of the products after the complete injection of AgNO$_3$ by drawing samples from the reaction mixture and monitoring the position of major LSPR peak using an UV-vis spectrophotometer. FIG. 1.1 shows the normalized extinction spectra (absorption and scattering) recorded from an aqueous suspension of products sampled at different stages of a standard synthesis; FIGS. 1.2A-D show their corresponding TEM images. A broad and weak LSPR peak centered at 406 nm was observed within 5 min after the AgNO$_3$ solution had been completely introduced in the reaction mixture. At this time, the sample consisted of Ag nanoparticles 20 nm in size as shown by the set of TEM images of the FIG. 1.2A. Note that these Ag nanoparticles were quasi-spherical in shape and displayed facets. Those faceted particles depict the precursor decahedral seed that further evolve into pentagonal nanowires. Its structure is based on the assembly of five single-crystal f.c.c. subunits sharing five common (111) twin plane—a single atomic layer whose lattice structure exhibits a mirror symmetry across the boundary.[21, 22] It is worth to pointing up that small Ag decahedral seeds are thermodynamically favored as a result of the relatively lower surface energy of {111} facets. Note that the corners of the seeds were slightly truncated in order to reduce the surface free energies of these sites.[23] When the reaction was extended for 35 min, the LSPR peak corresponding to Ag decahedral nanoparticles completely disappeared and a new extinction peak was observed at 371 nm followed by a shoulder at 355 nm. Such profile is assigned to the transverse LSPR mode of Ag rod-shaped nanostructures.[24] At this time, Ag NWs with diameters below 20 nm and length<20 μm were achieved in the presence of long-chain PVP as shown in FIG. 1.2B. The position of the transverse LSPR peak of Ag NWs was in agreement with predicted one by discrete-dipole approximation (DDA) computing method for nanowires with pentagonal cross-section with 20 nm in size as shown in FIG. 1.7. The shoulder peak at 355 nm could be assigned to the similar plasmon peak observed for bulk silver films once the Ag NWs owned long lengths.[25] Because the high aspect ratio of the Ag NWs was not possible to observe the longitudinal LSPR peak in the visible region. As the reaction proceeded, the transverse LSPR peak of Ag NWs slightly red-shifted to 374 nm and 376 nm at 60 min and 180 min, respectively, followed by a decrease of the peak intensity and broadening. FIGS. 1.2C and 1.2D show the TEM images for 60 min and 180 min of growth time, respectively, indicating that the nanowires gradually increased their diameter by extending the time reaction. For example, after 180 min, the diameter of Ag NWs increased above 40 nm, twice compared those achieved at 35 min.

FIGS. 1.3A-B show the low magnification SEM images of Ag NWs obtained after 35 min. At this time, the nanowires had a mean diameter of 20±4 nm and aspect ratio>1,000 with an estimated yield of ~86%. The nanowires consist of a penta-twinned structure along the entire wire length with a pentagonal cross-section. The side surface of a nanowires is bound by five flat {100} facets sectioned with continuous {111} twin boundaries along to the longitudinal axis of each nanowire as highlighted in the inset of FIG. 1.3B. It is noteworthy from the TEM images (FIGS. 1.3C-D) that nanowires displayed uniform lateral dimensions and were flexible, i.e. they could be bent in acute angles without being broken.

The high-resolution TEM (HRTEM) image shown in FIGS. 1.3D-E were recorded from the middle portion and the tip of a single Ag NW, respectively. In both sections of the nanowire, the HRTEM images reveal a clear (111) twin plane oriented parallel to [110] growth direction highlighted with a black arrow in the FIGS. 1.3D-E. FIG. 1.3E shows the HRTEM of a nanowire tip along the [011] zone axis which exhibited a curved surface. The periodic fringes were spaced in 0.24 nm and 0.21 nm, which are in good agreement with the d value for (111) and (200) plans of the f.c.c. silver lattice.

The XRD pattern showed in FIG. 1.8 was recorded from a bulk quantity of Ag NWs collected of an optimal synthesis. The peaks were assigned to diffraction of the (111), (200), (220), (311) and (222) planes of f.c.c. silver lattice. The lattice constant calculated from this XRD pattern was 4.074 Å, which is in agreement with the standard value (a=4.086 Å, Joint Committee on Powder Diffraction Standards file no. 04-0783). Due to the high aspect ratios of the nanowires, the orientations of all the {110} facet cannot be equivalently distributed over the substrate. As a result, the relative intensities of the (200), (202), (022) reflections exhibit variations in comparison with the standard powder diffraction pattern.

The Growth Mechanism of Thin Ag Nanowires:

In order to produce penta-twinned Ag NWs with reduced lateral dimensions, it is indispensable achieve Ag decahedral seeds at small size during the nucleation step. However, once the supersaturation limit of Ag atoms is reached, Ag nuclei tend to quickly grow into large sizes until the precursor has been completely depleted. This growth is very difficult to be manipulate due to the autocatalytic reduction of Ag.[20] To this end, a gradual increase of the Ag precursor concentration is very critical because allow us to make the generation of Ag atoms become significantly slow on the reaction mixture. In this Example, this was possible due to two reasons: a) a relatively slow injection rate of $AgNO_3$ so the concentration of Ag atoms could be kept at a relatively low level b) a continuous release of $Ag^+$ ions on the course of the reaction. In the early stages of a typical synthesis, a high concentration of Ag nuclei/seeds is achieved due the nucleation burst provided by EG. However, due the relatively high concentration of $Br^-$ ions in the reaction mixture (0.54 mM), large and irregular AgBr particles were simultaneously generated with the Ag initial seeds, taking account their limited solubility in EG. The formation of poorly soluble AgBr particles significantly reduces the level of supersaturation of Ag atoms and continuously releases $Ag^+$ and $Br^-$ ions through their thermal decomposition into the reaction mixture. Thanks to a slow addition of atoms, Ag decahedral seeds can be kept at small size for a long period.

Because the imperfect space filling among the five single-crystal subunits that form an individual Ag decahedral seed, inherent internal strain is distributed over their twin boundaries. Therefore, the twin boundaries provide the highest energy sites upon which additional Ag atoms will be deposited and undergo subsequent growth. Afterward, PVP capping molecules present in the reaction mixture, bind more strongly to {100} facets of Ag decahedral seeds rather than {111} facets, decreasing its relative growth rate.[26] As a result, the Ag atoms are continuously deposited on the exposed ends of the nanowires toward (110) direction. The anisotropic growth of Ag decahedral seeds thus leads to Ag nanowires with a five-fold pentagonal cross-section.

The effects of the concentration of PVP and $Br^-$ ions in the synthesis of thin Ag NWs were investigated from the perspective of reaction kinetics and they are summarized in the schematic illustration of FIG. 1.4. It was found that both molar ratio (in terms of repeating unit) of PVP relative to $AgNO_3$ as well as its chain length played important roles in controlling the shape and dimensions of Ag nanostructures.

FIGS. 1.5A-B show the TEM images of Ag NWs prepared in an optimal synthesis except that the PVP/Ag molar ratio was increased while keeping other parameter fixed. The increase of PVP concentration led to a mixture of Ag NWs and quasi-spherical nanoparticles. For instance, when the PVP/Ag molar ratio was set to 3 and 6, the product was predominantly composed by nanowires with an average diameter of 22±5 nm and 24±6 nm and an estimated yield of 73% and 61%, respectively. Nevertheless, the increase of the PVP concentration resulted in nanowires with low aspect ratio (<850) but with the diameter slightly larger compared to those obtained in the standard synthesis. Due the high concentration of PVP, it would extensively protect others facets of the initial Ag seeds. In this case, the PVP capping layer could even restrict the deposition of Ag atoms onto {111} surface of Ag NWs on the course of the reaction. Because of similar growth rate of the facets in the initial seeds, quasi-spherical Ag particles were formed together with nanowires displaying low aspect ratio as the PVP/Ag molar ratio became higher. In the optimal condition, uniform nanowires were prepared in high yield when the PVP/Ag molar ratio was set to 1.5. The results indicate that the amount of PVP has a significant impact on the purity of thin Ag NWs.

Previously, it was investigated the role of molecular weight/chain length of PVP on the dimensions and yield of Ag nanowires.[16, 27, 28] Generally speaking, it is found that the introduction of PVP with high molecular weight could easily induce the formation of more uniform Ag NWs in high yield relative to PVP with lower molecular weight. For example, Ran and coworkers[29] reported that the aspect ratio of the nanowires could be controlled as function of the chain length of PVP introduced in a polyol method. The authors used a mixture of long- and short-chain PVP molecules in different ratios in order to tune the steric hindrance of PVP capping layer over the diffusion of Ag atoms in the initial Ag seeds (with 25-40 nm in size) during the growth of the nanowires.

To gain insights into the effects of different chain length/molecular weight of PVP on the synthesis of thin Ag NWs, a set of experiments were conducted with the substitution of long-chain PVP by shortest ones. FIGS. 1.9A-D shows the TEM images of Ag nanostructures synthesized when PVP of different molecular weight was introduced in an optimal synthesis under similar experimental conditions. FIG. 1.9A gives the TEM image of products obtained when PVP of 10,000 g/mol in molecular weight is introduced as capping agent. In this case, the shortest PVP chain length induced the formation of a number of isotropic Ag nanoparticles with irregular shapes and morphologies. Significantly, the introduction of PVP of 29,000 g/mol in molecular weight improved the shape control of Ag nanostructures and a mixture of nanoparticles sorted into nanocubes and right bipyramids were achieved as shown in FIG. 1.9B. FIGS. 1.9C-D show that the increase of molecular weight of PVP to 40,000 and 55,000 g/mol produced quasi-spherical Ag nanostructures together with truncated nanocubes and right bipyramids with sizes smaller than those obtained with short-chain PVP. These results suggest that the molecular weight of PVP has a significant impact on the growth of thin Ag nanowires. Nevertheless, previous studies suggest that the steric repulsion between long-chain PVP molecules could more easily induce the PVP-Ag coordination to assembly in a linear polymer strands.[29, 30, 31] Therefore, as the $Ag^+$ ions are converted into atoms under slow reduction rate, the linear arrange could offer a suitable environment to promote the growth of Ag NWs.[29, 31]

We also evaluated the role of bromide in the synthesis of thin Ag NWs. Bromide ions have been extensively studied as specific capping agent for the synthesis of different anisotropic noble-metals nanocrystals enclosed by (100) surfaces such as penta-twinned nanorods,[32, 33] and nanobars.[18, 34, 35] Once the side surface of Ag NWs is predominantly enclosed by {100} facets it is reasonable to rule out the effects of face-selective capping by $Br^-$ ions in the synthesis of thin Ag NWs. FIG. 1.6A shows the TEM images for an typical synthesis conducted in the absence of $Br^-$ ions while other experimental condition were kept the same. In this case, it was possible to obtain Ag NWs but the average diameter was larger than 100 nm. Additionally, small irregular particles were also obtained. On the other hand, when the concentration of $Br^-$ ions was increased 10 times (i.e. Ag/Br=6) relative the optimal synthesis, this resulted in Ag nanocubes and right bipyramid nanoparticles as displayed in FIG. 1.6B. As mentioned before, the early stages of the synthesis of Ag NWs, Ag decahedral seeds are the predominant structures. It is worth to pointing out that twin boundaries at small decahedral Ag seeds are highly susceptible toward oxidative etching by the oxygen present in atmospheric air and/or dissolved in the solvent.[36] This process is greatly enhanced when in the presence of $Cl^-$ or $Br^-$ ions in the reaction mixture.[37] Although the presence of $Br^-$ ions leads to a less oxidative environment comparing to $Cl^-$, a higher concentration could effectively induce the etching of initial twinned seeds to produce singly-twin[38] or single-crystals.[36] We suggest that the singly-twin and single-crystals were slowly evolved into Ag nanocubes and right-bipyramids as pictured in FIG. 1.6B, at expense of the oxidative etching process of the twinned nanoparticles. Once the yield of pentagonal Ag NWs is dependent of the concentration of initial decahedral seeds, oxidative etching process should be prevented so the addition of Ag atoms on the twin planes become the predominant process. In previous studies, our group developed an efficient strategy to control the oxidative etching by the introduction of oxygen scavengers based on traces of Fe(II)/Fe(II) and Cu(II)/Cu(I)-containing salts into the reaction mixture.[39, 17] However, in this work we could obtain thin Ag NWs in high yield without the use of any oxygen scavenger when the Ag/Br molar ratio to 60. The fine-tuning of the concentration of $Br^-$ ions in the reaction mixture was an effective way to make the growth of Ag decahedral seeds into nanowires the predominant process relative the oxidative etching. Due the small size comparing to PVP, addition of bromide at a sufficiently high concentration could efficiently block the self-catalytic addition of Ag atoms through the chemisorption of a capping layer onto the {100} facets.[18] Meanwhile, the unidirectional growth is driven by the deposition of Ag atoms over the twin boundaries on the both ends of the nanowire along the [110]. This mechanism allowed us to constrain the lateral growth of the Ag decahedral seeds under such slow rate and finally achieve long and thin nanowires.

We investigated in the synthesis of Ag nanowires in the presence of others sodium halides salts instead NaBr under optimal conditions. The substitution of NaBr by NaCl and NaI were unsuccessful in producing thin Ag NWs. As shown in FIG. 1.10A, the introduction of NaCl resulted in the formation of Ag NWs with low aspect ratio and diameters larger than 30 nm. This result suggests that $Cl^-$ ions could not prevent the deposition of Ag atoms on the (100) surface and even inhibit the lateral growth of the Ag nanowires. With the addition of NaI, large and irregular particles decorated with small spherical ones were obtained (FIG. 1.10B). It is suggested that poor solubility of AgI particles in EG comparing to others silver halides and the strong adsorption of the $I^-$ ions on the surface of initial Ag nuclei stickles the development of anisotropic nanostructures.

Conclusion

We have successfully synthesized Ag nanowires with diameter below 20 nm with relatively high yields through a facile experimental protocol conducted under atmospheric. The key to the success was to combine PVP with high molecular weight and bromide as polymeric and ionic specific-facet polymeric capping agent to reduce the Ag nanowires, respectively. The molecular weight/chain length of PVP and the PVP/Ag molar ration into the reaction mixture were critical to obtain thin nanowires in high yield. Our studies reveal that the use of PVP with a high molecular weight is indispensable to achieve Ag nanowires with small lateral dimensions while a sufficient concentration in the reaction mixture is an important knob to synthesize nanowires in high yield. We also demonstrated that the presence of bromide ions offers a kinetic control over the deposition rate of Ag atoms on the side surface of the nanowires due the effective capping of the {100} facets. Significantly, under proper amount of bromide (i.e. Ag/Br=60), the oxidative etching was not the predominant. The effects of the additives in the reaction mixture were slow the reaction rate and facilitate the growth of Ag nanowires by selectively capping the side surface of the nanowires, and constraining their lateral growth. Additionally, we could produce thin Ag nanowires without the assistance of any oxygen scavengers, exotic nuclei or air-assisted methods.

The introduction of other halides such as chloride and iodide was not effective to produce thin nanowires. Ag nanowires with lower aspect ratio and larger diameter were achieved when NaCl was replaced by NaBr. Large and irregular particles were obtained when NaI was introduced in the reaction mixture. In light of these conclusions, we believe that this approach provides a facile controlled synthesis but also advances on our understanding of shape controlled synthesis.

REFERENCES

1. Kang, M. G.; Xu, T.; Park, H. J.; Luo, X.; Guo, L. J., Efficiency enhancement of organic solar cells using transparent plasmonic Ag nanowire electrodes. *Adv Mater* 2010, 22 (39), 4378-83.

2. Yim, J. H.; Joe, S. Y.; Pang, C.; Lee, K. M.; Jeong, H.; Park, J. Y.; Ahn, Y. H.; de Mello, J. C.; Lee, S., Fully solution-processed semitransparent organic solar cells with a silver nanowire cathode and a conducting polymer anode. *ACS nano* 2014, 8 (3), 2857-63.
3. Miller, M. S.; O'Kane, J. C.; Niec, A.; Carmichael, R. S.; Carmichael, T. B., Silver nanowire/optical adhesive coatings as transparent electrodes for flexible electronics. *ACS applied materials & interfaces* 2013, 5 (20), 10165-72.
4. Hecht, D. S.; Hu, L.; Irvin, G, Emerging transparent electrodes based on thin films of carbon nanotubes, graphene, and metallic nanostructures. *Advanced materials* 2011, 23 (13), 1482-513.
5. Hamberg, I.; Granqvist, C. G., Evaporated Sn-doped In2O3 films: Basic optical properties and applications to energy-efficient windows. *Journal of Applied Physics* 1986, 60 (11), R123.
6. Kumar, A.; Zhou, C., The race to replace tin-doped indium oxide: which material will win? *ACS nano* 2010, 4 (1), 11-4.
7. Nam, S.; Song, M.; Kim, D. H.; Cho, B.; Lee, H. M.; Kwon, J. D.; Park, S. G; Nam, K. S.; Jeong, Y.; Kwon, S. H.; Park, Y. C.; Jin, S. H.; Kang, J. W.; Jo, S.; Kim, C. S., Ultrasmooth, extremely deformable and shape recoverable Ag nanowire embedded transparent electrode. *Scientific reports* 2014, 4, 4788.
8. Scardaci, V.; Coull, R.; Lyons, P. E.; Rickard, D.; Coleman, J. N., Spray deposition of highly transparent, low-resistance networks of silver nanowires over large areas. *Small* 2011, 7 (18), 2621-8.
9. Bergin, S. M.; Chen, Y. H.; Rathmell, A. R.; Charbonneau, P.; Li, Z. Y.; Wiley, B. J., The effect of nanowire length and diameter on the properties of transparent, conducting nanowire films. *Nanoscale* 2012, 4 (6), 1996-2004.
10. Burda, C.; Chen, X.; Narayanan, R.; El-Sayed, M. A., Chemistry and properties of nanocrystals of different shapes. *Chemical reviews* 2005, 105 (4), 1025-102.
11. Hu, L.; Kim, H. S.; Lee, J. Y.; Peumans, P.; Cui, Y., Scalable coating and properties of transparent, flexible, silver nanowire electrodes. *ACS nano* 2010, 4 (5), 2955-63.
12. De, S.; Higgins, T. M.; Lyons, P. E.; Doherty, E. M.; Nirmalraj, P. N.; Blau, W. J.; Boland, J. J.; Coleman, J. N., Silver Nanowire Networks as Flexible, Transparent, Conducting Films: Extremely High DC to Optical Conductivity Ratios. *ACS nano* 2009, 3 (7), 1767-74.
13. Lee, E.-J.; Chang, M.-H.; Kim, Y.-S.; Kim, J.-Y., High-pressure polyol synthesis of ultrathin silver nanowires: Electrical and optical properties. *APL Materials* 2013, 1 (4), 042118.
14. Eisele, D. M.; Berlepsch, H. V.; Bottcher, C.; Stevenson, K. J.; Vanden Bout, D. A.; Kirstein, S.; Rabe, J. P., Photoinitiated growth of sub-7 nm silver nanowires within a chemically active organic nanotubular template. *Journal of the American Chemical Society* 2010, 132 (7), 2104-5.
15. Sun, Y.; Gates, B.; Mayers, B.; Xia, Y., Crystalline Silver Nanowires by Soft Solution Processing. *Nano letters* 2002, 2 (2), 165-168.
16. Sun, Y.; Xia, Y., Large-Scale Synthesis of Uniform Silver Nanowires Through a Soft, Self-Seeding, Polyol Process. *Advanced Materials* 2002, 14 (11), 833.
17. Korte, K. E.; Skrabalak, S. E.; Xia, Y., Rapid synthesis of silver nanowires through a CuCl- or CuCl2-mediated polyol process. *Journal of Materials Chemistry* 2008, 18 (4), 437.
18. Zhang, Q.; Moran, C. H.; Xia, X.; Rycenga, M.; Li, N.; Xia, Y., Synthesis of Ag nanobars in the presence of single-crystal seeds and a bromide compound, and their surface-enhanced Raman scattering (SERS) properties. *Langmuir: the ACS journal of surfaces and colloids* 2012, 28 (24), 9047-54.
19. Xiong, Y.; Cai, H.; Wiley, B. J.; Wang, J.; Kim, M. J.; Xia, Y., Synthesis and mechanistic study of palladium nanobars and nanorods. *Journal of the American Chemical Society* 2007, 129 (12), 3665-75.
20. Skrabalak, S. E.; Wiley, B. J.; Kim, M.; Formo, E. V.; Xia, Y., On the polyol synthesis of silver nanostructures: glycolaldehyde as a reducing agent. *Nano letters* 2008, 8 (7), 2077-81.
21. Marks, L. D.; Smith, D. J., High resolution studies of small particles of gold and silver. *Journal of Crystal Growth* 1981, 54 (3), 425-432.
22. Marks, L. D., Surface structure and energetics of multiply twinned particles. *Philosophical Magazine A* 1984, 49 (1), 81-93.
23. Ringe, E.; Van Duyne, R. P.; Marks, L. D., Kinetic and Thermodynamic Modified Wulff Constructions for Twinned Nanoparticles. *The Journal of Physical Chemistry C* 2013, 117(31), 15859-15870.
24. Kelly, K. L.; Coronado, E.; Zhao, L. L.; Schatz, G C., The Optical Properties of Metal Nanoparticles: The Influence of Size, Shape, and Dielectric Environment. *The Journal of Physical Chemistry B* 2003, 107 (3), 668-677.
25. Sun, Y.; Yin, Y.; Mayers, B. T.; Herricks, T.; Xia, Y., Uniform Silver Nanowires Synthesis by Reducing $AgNO_3$ with Ethylene Glycol in the Presence of Seeds and Poly(Vinyl Pyrrolidone). *Chemistry of Materials* 2002, 14 (11), 4736-4745.
26. Sun, Y.; Mayers, B.; Herricks, T.; Xia, Y., Polyol Synthesis of Uniform Silver Nanowires: A Plausible Growth Mechanism and the Supporting Evidence. *Nano letters* 2003, 3 (7), 955-960.
27. Zeng, X.; Zhou, B.; Gao, Y.; Wang, C.; Li, S.; Yeung, C. Y.; Wen, W., Structural dependence of silver nanowires on polyvinyl pyrrolidone (PVP) chain length. *Nanotechnology* 2014, 25 (49), 495601.
28. Zhu, J.-J.; Kan, C.-X.; Wan, J.-G; Han, M.; Wang, G.-H., High-Yield Synthesis of Uniform Ag Nanowires with High Aspect Ratios by Introducing the Long-Chain PVP in an Improved Polyol Process. *Journal of Nanomaterials* 2011, 2011, 1-7.
29. Ran, Y.; He, W.; Wang, K.; Ji, S.; Ye, C., A one-step route to Ag nanowires with a diameter below 40 nm and an aspect ratio above 1000. *Chem Commun* 2014, 50 (94), 14877-80.
30. Gao, Y.; Jiang, P.; Liu, D. F.; Yuan, H. J.; Yan, X. Q.; Zhou, Z. P.; Wang, J. X.; Song, L.; Liu, L. F.; Zhou, W. Y.; Wang, G; Wang, C. Y.; Xie, S. S.; Zhang, J. M.; Shen, D. Y., Evidence for the Monolayer Assembly of Poly (vinylpyrrolidone) on the Surfaces of Silver Nanowires. *The Journal of Physical Chemistry B* 2004, 108 (34), 12877-12881.
31. Song, Y. J.; Wang, M.; Zhang, X. Y.; Wu, J. Y.; Zhang, T., Investigation on the role of the molecular weight of polyvinyl pyrrolidone in the shape control of high-yield silver nanospheres and nanowires. *Nanoscale research letters* 2014, 9 (1), 17.
32. Johnson, C. J.; Dujardin, E.; Davis, S. A.; Murphy, C. J.; Mann, S., Growth and form of gold nanorods prepared by seed-mediated, surfactant-directed synthesis. *Journal of Materials Chemistry* 2002, 12 (6), 1765-1770.

33. Xiong, Y.; Cai, H.; Yin, Y.; Xia, Y., Synthesis and characterization of fivefold twinned nanorods and right bipyramids of palladium. *Chemical Physics Letters* 2007, 440 (4-6), 273-278.
34. Wiley, B. J.; Chen, Y.; McLellan, J. M.; Xiong, Y.; Li, Z. Y.; Ginger, D.; Xia, Y., Synthesis and optical properties of silver nanobars and nanorice. *Nano letters* 2007, 7 (4), 1032-6.
35. Peng, H. C.; Xie, S.; Park, J.; Xia, X.; Xia, Y., Quantitative analysis of the coverage density of Br- ions on Pd{100} facets and its role in controlling the shape of Pd nanocrystals. *Journal of the American Chemical Society* 2013, 135 (10), 3780-3.
36. Zheng, Y.; Zeng, J.; Ruditskiy, A.; Liu, M.; Xia, Y., Oxidative Etching and Its Role in Manipulating the Nucleation and Growth of Noble-Metal Nanocrystals. *Chemistry of Materials* 2014, 26 (1), 22-33.
37. Wiley, B.; Herricks, T.; Sun, Y.; Xia, Y., Polyol Synthesis of Silver Nanoparticles: Use of Chloride and Oxygen to Promote the Formation of Single-Crystal, Truncated Cubes and Tetrahedrons. *Nano letters* 2004, 4 (9), 1733-1739.
38. Wiley, B. J.; Xiong, Y.; Li, Z. Y.; Yin, Y.; Xia, Y., Right bipyramids of silver: a new shape derived from single twinned seeds. *Nano letters* 2006, 6 (4), 765-8.
39. Wiley, B.; Sun, Y.; Xia, Y., Polyol synthesis of silver nanostructures: control of product morphology with Fe(II) or Fe(III) species. *Langmuir: the ACS journal of surfaces and colloids* 2005, 21 (18), 8077-80.

Example 2

Synthesis of Ag Nanowires

In a typical synthesis, two solutions of AgNO$_3$ (100 mM) and NaBr (50 mM) in ethylene glycol (EG) were prepared. At the same time, 25 mg PVP (MW~1,300,000) was dissolved in 4 mL of EG hosted in a 20 mL vial and heated in an oil bath (held at 170° C.) for 60 min under magnetic stirring (320 rpm). After 60 min, 0.06 μL of the NaBr solution was added into the vial in one shot with the use of a pipet. After another 5 min, 1.5 mL of the AgNO$_3$ solution was added using a syringe pump at an injection rate of 0.15 mL/min. The synthesis was quenched by immersing the vial in an ice-water bath 35 min after the introduction of AgNO$_3$ solution. The dispersion of Ag nanowires was crushed out with acetone (15 mL) and re-dispersed in 10 mL DI water. The suspension was centrifuged at a speed of 800 rpm for 15 min to remove the Ag nanoparticles (typically larger than 100 nm in diameter) contained in the product. The supernatant containing Ag nanowires was collected while the precipitate (containing Ag nanoparticles and some Ag nanowires) was discarded. This washing procedure was repeated three additional times. Then, the Ag nanowires were collected by centrifugation at 3,000 rpm for 10 min. Finally, the product was collected and suspended in DI water (0.5 mL). FIGS. 2.1A-B show a typical UV-Vis spectrum and TEM image of the Ag nanowires.

Deposition of Au Sheath onto the Ag Nanowire

In a typical procedure, HAuCl$_4$ was first incubated with NaOH to obtain Au(OH)$_4^-$ solution, which was then used as a precursor for the Au deposition experiment. Specifically, 0.1 mL HAuCl$_a$ solution (20 mM), 2 mL NaOH (200 mM), and 17.9 mL DI water were added into a 20 mL vial, and the mixture was incubated at room temperature on an orbital shaker for 1 h. This solution is consisted of Au(OH)$_4^-$ at a concentration of 0.1 mM, as well as NaOH of about 20 mM (Table 2.1).

In a typical deposition process, 1 mL PVP solution (MW~55,000 Da, 40 mg/mL) and 2 mL DI water was added to a 20 mL glass vial. The mixture was then heated to 60° C. under magnetic stirring at a speed of 400 rpm. After that, 70 μL of the Ag nanowires suspension was added, followed by 150 μL aqueous ascorbic acid (AA, 100 mM) and 100 μL aqueous NaOH (200 mM) sequentially. The solution of Au(OH)$_4^-$ (0.1 mM) in NaOH (20 mM) was added into the vial using a syringe pump at an injection rate of 0.02 mL/min. In one of the demonstrations, 2 mL of the Au(OH)$_4^-$ solution was added to coat the Ag nanowires with Au sheaths and thus obtain Ag@Au core-sheath nanowires. Afterwards, the Ag@Au core-sheath nanowires were centrifuged at 3,500 rpm for 10 min and re-dispersed in 0.2 mL DI water to remove the remaining NaOH, PVP and AA. FIG. 2.2A shows the UV-vis spectra of the Ag@Au core-sheath nanowires prepared by adding different volumes of the Au(OH)$_4^-$ solution. FIG. 2.2B shows a typical TEM image of the Ag@Au core-sheath nanowires prepared by using 2 mL of the Au(OH)$_4^-$ solution.

TABLE 2.1

Gold contents in the Ag@Au core-sheath nanowires prepared by adding different volumes of the Au(OH)$_4^-$ solution (0.5, 1.0, 1.5 and 2.0 mL) determined by ICP-MS.

| Volume of Au(OH)$_4^-$ solution added (mL) | n(Au):n(Ag + Au) |
|---|---|
| 0.5 | 5.1% |
| 1.0 | 6.6% |
| 1.5 | 7.6% |
| 2.0 | 10.8% |

This deposition process is affected by many factors. Firstly, the PVP concentration should be kept in a suitable region. When a low concentration of PVP was used, self-nucleation of Au would occur, leading to the formation of Au nanoparticles, as indicated by a ruby color for the reaction mixture. On the other hand, when the concentration of PVP was too high, the Ag nanowires would precipitate. Secondly, the concentrations of NaOH and AA would affect the reduction rate of Au precursor. Inadequate NaOH and/or AA would lead to a galvanic replacement reaction between Ag(0) and Au(III), while too much NaOH and/or AA would result in self-nucleation for the Au atoms, greatly reducing the amount of Au that can be deposited onto the Ag nanowires. Thirdly, the reaction temperature is crucial for the successful deposition of Au. From a control experiment carried out at room temperature, we found that after the reduction of Au(III) to Au atoms, they tend to deposit on the edges of Ag nanowires (as indicated in FIGS. 2.3A-B). For the protection purpose, a complete Au sheath on the Ag nanowire is required. As a result, one has to promote the diffusion of Au atoms from the edges to the sides of Ag nanowires. To facilitate this process, the reaction was carried out at an elevated temperature of 60° C. to enhance the thermo-driven diffusion of Au atoms. However, the reaction temperature cannot go too high. As shown in FIG. 2.4, when 80° C. was used, an obvious broadening of the LSPR peak of Ag nanowires was observed, possibly due to the side galvanic replacement reaction. Finally, the injection rate of Au(OH)$_4^-$ should be kept low enough so that there is enough time for Au atoms to be deposited onto Ag nanowires and diffuse to the whole surface of Ag nanowires for the protection purpose.

Another Method for Au Deposition

Instead of reacting HAuCl$_4$ with NaOH separately, we can also use a co-injection method to prepare Ag@Au core-sheath nanowires. Specifically, 1 mL of PVP solution (MW~55,000, 40 mg/mL) and 2 mL DI water was added into a 20 mL glass vial. The mixture was heated at 60° C. with magnetic stirring at a speed of 400 rpm. 70 µL of the Ag nanowire suspension was added, followed by 150 µL aqueous ascorbic acid (AA, 100 mM) and 100 µL aqueous NaOH solution (200 mM) sequentially. A solution of HAuCl$_4$ (0.1 mM) was then injected into the vial using a syringe pump at an injection rate of 0.02 mL/min. Simultaneously, a solution of NaOH (40 mM) was injected through another syringe pump at a rate of 0.01 mL/min. In one of the demonstrations, 2 mL HAuCl$_4$ solution and 1 mL NaOH were added to coat the Ag nanowires with Au sheaths to obtain Ag@Au core-sheath nanowires. Afterwards, the Ag@Au core-sheath nanowires were collected by centrifugation at 3,500 rpm for 10 min and then re-dispersed in 0.2 mL DI water.

Etching of Ag@Au Core-Sheath Nanowires with H$_2$O$_2$

To demonstrate improvement in chemical stability for the Ag@Au core-sheath nanowires, we conducted an etching experiment with aqueous H$_2$O$_2$. To a 1.5 mL centrifuge tube, 0.2 mL the Ag@Au core-sheath nanowires suspension was added, followed by the addition of 0.2 mL 6% aqueous H$_2$O$_2$ solution. The mixture was vortexed for 5 s and then kept at room temperature for 1 h. The final concentration of H$_2$O$_2$ in the mixture was 3%. Afterwards, the mixture was centrifuged at 3,500 rpm for 10 min to collect Ag@Au core-sheath nanowires. After removing the supernatant and washing the sample with 0.5 mL DI water, the Ag@Au core-sheath nanowires were finally dispersed in 0.2 mL DI water. UV-vis spectrum was used to characterize the core-sheath nanowires.

Example 3

We report a robust synthesis of Ag@Au core-shell nanocubes by directly depositing Au atoms on the surfaces of Ag nanocubes as conformal, ultrathin shells. Our success relies on the introduction of a strong reducing agent to compete with and thereby block the galvanic replacement between Ag and HAuCl$_4$. An ultrathin Au shell of 0.6 nm thick was able to protect the Ag in the core in an oxidative environment such as 2.3% aqueous H$_2$O$_2$. Significantly, the core-shell nanocubes exhibited surface plasmonic properties essentially identical to those of the original Ag nanocubes while the SERS activity showed a 5.4-fold further enhancement owing to an improvement in chemical enhancement. The combination of excellent SERS activity and chemical stability may enable a variety of new applications.

Silver nanocrystals have fascinating optical properties known as localized surface plasmon resonance (LSPR), which is essential to applications for surface-enhanced Raman scattering (SERS), optical sensing, and bio-imaging.[1] Silver nanocubes, in particular, have strong electromagnetic field enhancements at their sharp corners, which can drastically increase the Raman scattering cross sections of molecules at these sites for SERS detection and imaging.[2] However, the susceptibility of elemental Ag to oxidation often leads to corner truncation and thus deterioration of SERS activity. The toxicity of the released Ag$^+$ ions also limits the SERS application of Ag nanocubes in a biological system. In contrast, Au is well-known for its resistance to oxidation and excellence in biocompatibility,[3] but its performance in SERS and other plasmonic applications is worse than Ag by an order of magnitude.[4] In principle, by depositing a conformal, thin shell of Au on the surface of a Ag nanocube, one would create a Ag@Au core-shell nanocube with excellence in both chemical stability (from the Au shell) and SERS activity (from the Ag core).

One approach to the formation of Ag@Au nanocube is to epitaxially deposit Au atoms on the surface of a Ag nanocube in a fashion similar to seeded growth. Since the original work by Murphy and others,[5] seeded growth has emerged as a prevalent route to the syntheses of nanocrystals from a number of noble metals, such as Ag,[6] Au,[7] Pd,[8] and Pt,[9] as well as some of their bimetallic combinations.[10] Despite the remarkable success, the capability of seeded growth is still restricted to two metals with no galvanic replacement between them. As reported by many groups,[11] a galvanic reaction will occur instantaneously when Ag nanocubes are mixed with HAuCl$_4$ in an aqueous solution, even at a temperature approaching 0° C.[12] As a result, it has been difficult or impossible to generate Ag@Au nanocubes using seeded growth. Several groups have attempted to solve this problem by retarding the galvanic reaction between Ag and HAuCl$_4$.[13] Yin reported the generation of Au-coated Ag nanoplates by decreasing the reduction potential of Au$^{3+}$ through complexation with I$^-$ ions.[13a] However, small voids could still be observed on the surfaces of their Au-coated Ag nanoplates, suggesting the involvement of galvanic reaction. Mirkin reported the deposition of corrugated Au on Ag nanoprisms by using ascorbic acid (AA) as a reducing agent and cetyltrimethylammonium bromide (CTAB) as a capping agent.[13b] They acknowledged that galvanic replacement occurred at the corners of Ag nanoprisms even in the presence of AA and NaOH. By replacing AA with hydroxylamine (HyA), Xue reported the formation of Au-coated Ag—Au alloy nanoprisms. In this case, galvanic reaction still occurred but the Ag$^+$ ions dissolved through galvanic reaction were reduced back to Ag atoms by HyA and re-deposited onto the Ag nanoprisms.[13c] Most recently, Kitaev demonstrated the use of galvanic replacement for depositing uniform layers of Au on the surfaces of Ag decahedra and pentagonal nanorods with enhanced chemical stability and plasmonic properties.[13e] They used an extremely slow injection rate and a dilute concentration for the HAuCl$_4$ solution over a period of 12 hours to avoid any possible formation of pits or voids in the Ag templates. When higher injection rates and higher concentrations were used, however, they were unable to completely block the galvanic reaction by adjusting other experimental parameters, including the use of mild reducing agents, complexing agents, and varying the pH of the reaction solution. Also, there were no direct evidences such as atomic-resolution TEM images to demonstrate the formation of a continuous conformal shell of Au on the surface of the Ag nanostructure.

In this Example, we report the galvanic replacement-free deposition of Au on Ag nanocubes in an aqueous solution by introducing a fast parallel reduction by AA to compete with and thereby block the galvanic reaction. By simply increasing the pH to optimize the reduction power of AA, the added HAuCl$_4$ was exclusively reduced by AA before it could participate in the galvanic reaction with Ag nanocubes. As a result, the newly formed Au atoms were conformally deposited on the surfaces of Ag nanocubes to generate Ag@Au core-shell nanocubes. By increasing the amount of HAuCl$_4$ added into the solution, we could control the thickness of the Au shell from three to six atomic layers. With a thickness of three atomic layers (0.6 nm), the Au shell could effectively protect the Ag core to preserve its LSPR properties in an oxidative environment. Because of the stronger adsorption of probe molecules on the Au relative to Ag, the Ag@Au nanocubes exhibited a SERS enhancement factor stronger than that of Ag nanocubes. This approach worked well for Ag nanocubes with various sizes.

When $HAuCl_4$ is introduced into an aqueous suspension of Ag nanocubes in the presence of a reducing agent such as AA, it will be reduced to generate Au atoms through two parallel reactions involving Ag and AA, respectively. The reduction by Ag is a galvanic reaction (with a rate of $R_{gal}$) that will lead to the formation of a hollow structure whereas the reduction by AA (with a rate of $R_{red}$) will result in the formation of a conformal Au shell on the Ag nanocube. As illustrated in FIG. 3.1, the final product is determined by the relative magnitudes of these two reaction rates. When $R_{red} \ll R_{gal}$, galvanic reaction dominates, generating a hollow nanocube with a thin layer of Au—Ag alloy on the surface (Route I).[14] Alternatively, when $R_{red} \gg R_{gal}$, the Au atoms are epitaxially deposited on the Ag nanocube, leading to the formation of Ag@Au nanocube (Route II). Because the $HAuCl_4$ is titrated into the reaction solution at a slow rate, self-nucleation is eliminated to promote the conformal deposition of Au atoms only on the surface of Ag nanocube. It has been reported that the reducing power of AA can be greatly enhanced by increasing the pH of reaction solution.[15] We can keep $R_{gal}$ and manipulate $R_{red}$ by adjusting the pH of the solution to control the reaction pathway and thus the structure of final product.

In the first set of experiments, we used Ag nanocubes of 38.0 nm in average edge length, together with slightly rounded corners (FIG. 3.5A). Typically, we dispersed the Ag nanocubes in an aqueous solution containing poly(vinyl pyrrolidone) (PVP, a capping agent and stabilizer) and AA (10 mM), followed by the introduction of 0.4 mL $HAuCl_4$ solution (0.1 mM) using a syringe pump at room temperature. When the pH was adjusted to 2.63 with the addition of HCl, we observed voids in the Ag nanocubes (FIG. 3.5 C). Upon removal of the pure Ag remaining in the nanocubes with 2.3% aqueous $H_2O_2$, we noticed the formation of Ag—Au hollow nanocubes with multiple pores in the walls (FIG. 3.5D). These results suggest that galvanic reaction dominated in an acidic solution because of $R_{red} \ll R_{gal}$, which is consistent with the previous findings.[14] In contrast, when the pH was increased to 11.02 with the addition of NaOH, we obtained Ag@Au core-shell nanocubes with a well-preserved cubic shape (FIG. 3.2A). The average edge length of the Ag nanocubes was increased from 38.0 nm to 39.2 nm and no void was observed in the final products. To confirm the formation of complete Au shells on the Ag nanocubes, we incubated the as-prepared samples with an excess amount of a 2.3% aqueous solution of $H_2O_2$ and no morphological changes was observed for a period up to 2 hours (FIG. 3.2B). We also extended the Au coating procedure to Ag nanocubes with an edge length of 106.5 nm (FIG. 3.5B). Upon deposition of Au shells, the cubic shape was retained while the edge length was increased to 108.0 nm (FIG. 3.2C). Again, the Ag@Au nanocubes were stable in the aqueous solution of $H_2O_2$ for a period of at least 2 hours (FIG. 3.2D).

We also replaced the AA/NaOH combination with another strong reducing agent such as $NaBH_4$ and performed a similar synthesis with the 38.0-nm Ag nanocubes. As anticipated, the Au atoms were uniformly deposited on the surfaces of Ag nanocubes to generate Ag@Au nanocubes (FIG. 3.6A). When mixed with the aqueous $H_2O_2$, no change was observed for the structure and shape for a period of at least 2 hours (FIG. 3.6B). These results confirm that the rapid reduction of $HAuCl_4$ by a strong reducing agent could completely suppress the galvanic reaction between Ag nanocubes and $HAuCl_4$, leading to the generation of conformal, thin shells of Au on the surfaces of Ag nanocubes.

It is important to note that pH plays an important role in regulating $R_{red}$ and ultimately achieving galvanic replacement-free deposition of Au on Ag nanocubes. For example, when the 38-nm Ag nanocubes were dispersed in an aqueous solution containing 0.5 mL of AA (10 mM), 0.1 mL of NaOH (200 mM), and 2 mL of PVP-55 (1 mM), we found that the titration of $HAuCl_4$ (0.1 mM) resulted in a constant decrease in pH for the reaction solution (FIG. 3.7 A). At 0.6 mL (pH=9.69), galvanic replacement was still inhibited as indicated by the absence of voids (FIG. 3.7B). However, with the addition of 0.8 mL of $HAuCl_4$ (pH=9.54), we observed voids at the corners of nanocubes (FIG. 3.7C).

We also investigated the role of AA concentration in affecting $R_{red}$ and thereby the outcome of a synthesis. Specifically, we performed another set of experiment to keep other reaction parameters unaltered, except for the use of 100 mM AA and 0.5 mL of NaOH to adjust the initial pH to 11.60. During the titration of $HAuCl_4$, we also observed a constant decrease in pH (FIG. 3.8 A). In this case, no voids was observed in the nanocubes at 0.8 mL (pH=9.71) but at 1.0 mL (pH=9.12) (FIGS. 3.8B-C). Collectively, our results confirm the dominating role of pH and we concluded that the reduction of $HAuCl_4$ by AA at pH 9.5 and above could completely suppress the galvanic reaction, leading to the generation of conformal, thin shells of Au on the surfaces of 38-nm Ag nanocubes. However, it is worth noting that galvanic reaction did not occur when 1.5 mL of $HAuCl_4$ was reacted with the 106-nm Ag nanocubes, even though the pH value had dropped to 9.25. In this case, we did not observe voids in the nanocubes before and after etching with the aqueous $H_2O_2$ (FIGS. 3.9A-B).

We used aberration-corrected high-angle annular dark-field scanning TEM (HAADF-STEM) to characterize the Ag@Au nanocubes. When $R_{red} \gg R_{gal}$, the thickness of the Au shell could be increased by increasing the amount of $HAuCl_4$ added. FIGS. 3.3A and 3.3C, show HAADF-STEM images of two different samples of Ag@Au nanocubes prepared using 0.4 and 0.8 mL of $HAuCl_4$, respectively. The contrast between the Au shell and Ag core can be attributed to the difference in atomic number between Ag and Au. We clearly observed the difference in Au thickness. When the nanocube was titled to the [001] zone axis, the atomic-resolution HAADF-STEM image (FIGS. 3.3B and 3.3D) offered details of the atomic arrangement for the columns of Au and the Ag atoms. On average, three and six atomic layers of Au were deposited for these two samples. The outmost surface layer of Au may not be complete, resulting in a slightly dark image contrast. There might be some interatomic diffusion between Ag and Au (as illustrated in FIG. 3.1) but it is extremely difficult to quantify the composition of the outmost surface layer.

We used UV-vis spectroscopy to characterize the LSPR properties of the Ag@Au nanocubes. Previous studies reported that the LSPR peaks of Ag—Au bimetallic nanoparticles were considerably broader than those of pure Ag or Au nanoparticles because of scattering at the interface between these two metals and frequency dependence of the dielectric constants.[16] However, when compared with the Ag nanocubes, we found that the LSPR peak of the Ag@Au nanocubes with three atomic layers of Au only showed negligible broadening in peak width, together with a slight red-shift from 435 to 443 nm (FIG. 3.4A). Our results suggest that an ultrathin shell of Au would not cause significant changes to the dielectric constants. The slight red-shift in the peak position likely arose from an increase in edge length upon Au deposition. We also used UV-vis to monitor the stability of the Ag@Au cubes when they were exposed to a strong oxidant. It was found that the LSPR peak was only red-shifted from 443 to 447 nm while the peak intensity remained the same upon mixing with 2.3% aqueous $H_2O_2$ for 10 h. In comparison, the Ag nanocubes were completely etched within 3 min (FIG. 3.10).[14b] The Ag@Au nanocubes also showed good chemical stability when they were incubated with 1.0 μM aqueous solution of NaHS for 2 days (FIGS. 3.11A-B). These results indicate that the Ag@Au nanocubes embrace LSPR properties essentially identical to Ag nanocubes, whereas their chemical stability in an oxidative environment is greatly improved.

We evaluated the SERS activity of the Ag@Au nanocubes by benchmarking against the Ag nanocubes. To exclude any possible contribution to SERS from particle aggregation in the solution, we collected UV-vis spectra from the nanocubes before and after they had been functionalized with 1,4-benzenedithiol (1,4-BDT). As shown in FIG. 3.12, the LSPR peak of the functionalized Ag@Au nanocubes was only red-shifted by 13 nm because of changes to the surface. No shoulder peak next to the major LSPR peak was observed, indicating that aggregation was negligible. To avoid plasmon dephasing associated with the interband transition of Au at 2.5 eV (~500 nm), we collected SERS spectra using 785 nm excitation.[17] FIG. 3.4B shows the SERS spectra of 1,4-BDT adsorbed on the surfaces of the 38-nm Ag nanocubes and the corresponding Ag@Au nanocubes with three atomic layers of Au. Based on a reported protocol,[18] we employed the SERS peak at 1565 $cm^{-1}$ to calculate the SERS enhancement factor (EF). When determining the number of molecules probed in SERS, it was assumed that the surface was covered by a complete monolayer of 1,4-BDT molecules with a footprint of 0.54 $nm^2$.[19] As a result, the calculated value represents a theoretical maximum number of molecules and thereby the EF reported here should be an underestimate of the actual value. The EF of the Ag@Au nanocubes was calculated to be $9.7\times10^5$, 5.4-fold stronger than that of the Ag nanocubes, 5.4- and 5.7-fold greater than the values previously reported for Ag concave octahedra[20] and dimmers of Ag nanospheres in the solution phase,[21] respectively.

To understand the higher SERS activity of Ag@Au nanocubes than that of Ag nanocubes, we evaluated the contributions from both electromagnetic field (EM) and chemical (CHEM) enhancements. Many other groups have demonstrated that the EM enhancement of Ag is about 2-3 orders of magnitude stronger than that of Au.[22] Also, EM enhancement is considered as a long-range interaction that does not require the probe molecules to be directly attached to the metal surface.[23] As shown in FIG. 3.4A, we found that the Ag@Au nanocubes exhibited LSPR features of essentially identical to those of the Ag nanocubes. Likely, the 1,4-BDT molecules attached to the Au shell of 0.6 nm thick could still be influenced by the strong EM enhancement from the Ag core, leading to a EM-based SERS activity comparable to that of the original Ag nanocubes. On the other hand, it is documented that the Au-thiolate bonding is much stronger than that of Ag-thiolate.[24] Previous studies indicated that the charge transfer between a Au surface and the adsorbed molecules may promote stronger CHEM enhancement with a typical value in the range of 10-100.[25] The CHEM enhancement is considered to be a short range effect that requires the probe molecules in contact with the surface of Au or Ag. In our case, the stronger binding of 1,4-BDT to the Au surface could contribute to a larger CHEM enhancement factor, leading to a further enhanced SERS EF for the Ag@Au nanocubes. Additionally, as shown in FIG. 3.4B, we noticed that the SERS activity of 1,4-BDT on the Ag@Au nanocubes remained the same over a period up to 7 days, indicating that the chemical stability of the Au shell could be used to preserve the SERS activity.

In conclusion, we have demonstrated a strategy for depositing uniform, conformal shells of Au on the surfaces of Ag nanocubes to generate Ag@Au core-shell nanocubes with greatly enhanced chemical stability and SERS activity. As long as the reduction of $HAuCl_4$ was dominated by AA at a sufficiently high pH, the galvanic replacement could be completely blocked to generate Au shells with controllable thickness. The Au shell of three atomic layers was able to protect the Ag nanocube in the core from oxidation. The Ag@Au nanocubes embraced LSPR characteristics essentially identical to that of the Ag nanocubes while their SERS activity was much stronger because of stronger binding of a thiolate to the Au surface for an improved CHEM enhancement.

Preparation of Ag Nanocubes:

The Ag nanocubes were prepared using a polyol method, with ethylene glycol (EG, J. T. Baker) and silver trifluoroacetate ($CF_3COOAg$, Aldrich) as a solvent and a precursor to silver, respectively. In a typical synthesis, 5 mL of EG was introduced into a round bottom flask (100 mL, ACE Glass) and heated under magnetic stirring in an oil bath at 150° C., followed by the introduction of 0.06 mL of NaHS (3 mM in EG, Aldrich). After 2 min, 0.5 mL of HCl (3 mM in EG, Aldrich) was introduced, followed by the addition of 1.25 mL of poly(vinyl pyrrolidone) (20 mg/mL in EG, MW≈55,000, PVP-55, Aldrich). After another 2 min, 0.4 mL of $CF_3COOAg$ (282 mM in EG) was injected into the mixture. During the entire synthesis, the flask was capped with a glass stopper, except for the introduction of reagents. We obtained Ag nanocubes of 38.0 nm in edge length by quenching the reaction with an ice-water bath as soon as the major UV-vis absorption peak of the suspension was shifted to 434 nm. We then used the 38-nm Ag nanocubes as seeds to grow larger nanocubes with edge length of 106.5 nm. In a typical synthesis, 20 mL of EG was added into a flask and heated in an oil bath at 150° C. under magnetic stirring. After 10 min, 6 mL of PVP solution (20 mg/mL, M.W.≈55,000, in EG) was added using a pipette. After another 10 min, 200 μL of the 38-nm Ag nanocubes ($5.0\times10^{12}$ particles/mL) was introduced, followed by the addition of 4 mL of $AgNO_3$ solution (282 mM, in EG) using a pipette. The 106-nm Ag nanocubes were collected by quenching the reaction with an ice-water bath when the major LSPR peak of the product had reached 620 nm. After centrifugation and washing with de-ionized (DI) water and acetone three times, Ag nanocubes with both sizes were collected, dispersed, and stored in water.

Synthesis of the Ag@Au Nanocubes with Three Atomic Layers of Au in the Shell:

In a standard synthesis, 2 mL of PVP-55 (1 mM) solution was introduced into a 20 mL glass vial, followed by the addition of 0.5 mL of ascorbic acid (AA, 10 mM), 0.1 mL of aqueous NaOH solution (200 mM), and 0.01 mL of the suspension of Ag nanocubes (4.92 mg/mL) under magnetic stirring. Next, 0.4 mL of aqueous $HAuCl_4$ solution (0.1 mM) was titrated into the mixture using a syringe pump at a rate of 0.02 mL/min. After reaction for 10 min, the product was collected by centrifugation at 15,000 rpm and washed with DI water four times prior to TEM characterization.

Synthesis of the Ag@Au Core-Shell Nanocubes with Six Atomic Layers of Au in the Shell:

In a standard synthesis, 2 mL of PVP-55 (1 mM) solution was introduced into a 20 mL glass vial, followed by the addition of 0.5 mL of ascorbic acid (AA, 100 mM), 0.5 mL of aqueous NaOH solution (200 mM), and 0.01 mL of the suspension of Ag nanocubes (4.92 mg/mL) under magnetic stirring. Next, 0.8 mL of aqueous HAuCl$_4$ solution (0.1 mM) was titrated into the mixture using a syringe pump at a rate of 0.02 mL/min. After reaction for 10 min, the product was collected by centrifugation at 15,000 rpm and washed with DI water four times prior to TEM characterization.

Synthesis of the Au—Ag Hollow Nanocubes:

The protocol was the same as the standard procedure used for the synthesis of Ag@Au nanocubes with three atomic layers of Au, except for the substitution of NaOH by 0.1 mL of aqueous HCl (100 mM).

Synthesis of the Ag@Au Core-Shell Nanocubes with NaBH$_4$ as a Reducing Agent:

The protocol was the same as the standard procedure used for the synthesis of the Ag@Au nanocubes with three atomic layers of Au, except for the substitution of AA/NaOH mixture with 0.5 mL NaBH$_4$ (100 mM).

Instrumentation and Characterization:

The UV-vis spectra were recorded using a Cary 50 spectrometer (Agilent Technologies). Transmission electron microscopy (TEM) images were taken using a Hitachi HT7700 microscope operated at 120 kV. High-angle annular dark-field scanning TEM (HAADF-STEM) images were acquired with a JEOL 2200FS STEM/TEM microscope equipped with a CEOS GmbH probe corrector.

Surface-Enhanced Raman Scattering Measurements and Calculation of Enhancement Factor:

The 38-nm Ag nanocubes and Ag@Au core-shell nanocubes were incubated with a 0.6 mM 1,4-BDT solution in ethanol for 1 h. The nanostructures were then washed with DI water twice and re-dispersed in water at a particle number concentration of 0.05 nM. The Raman spectra were recorded from the suspension using a Renishaw inVia Raman spectrometer using a 100× objective lens. The excitation wavelength was 785 nm, in conjunction with a grating of 1,200 lines/mm. Data was collected from the suspension at a laser power of 100 mW with a collection time of 30 s for all samples. A sample cell was constructed by placing a glass cover slip on top of a cylindrical hole (20 µL in volume) punched in a piece of polydimethylsiloxane block. The cover slip also serves as a reference point, from which the focal plane was positioned at 200 µm into the sample.

We employed the SERS peak at 1565 cm$^{-1}$ (the benzene ring mode, 8a) of 1,4-BDT molecule to calculate the SERS enhancement factor (EF) using the following equation $$EF = (I_{SERS} \times N_{bulk}) / (I_{bulk} \times N_{SERS}) \quad (1)$$

where $I_{SERS}$ and $I_{bulk}$ are the intensities of the same band for the SERS and ordinary spectra from a bulk sample, $N_{bulk}$ is the number of bulk molecules probed for a bulk sample, and $N_{SERS}$ is the number of molecules probed in SERS. $I_{SERS}$ and $I_{bulk}$ were determined by the area of 8 A bands. $N_{bulk}$ was determined from the ordinary Raman spectrum of a 0.1 M 1,4-BDT solution in 12 M aqueous NaOH and the focal volume of our Raman system. It is worth nothing that we used the same set of parameters to collect ordinary Raman and SERS in the solution phase, and as such, the focal volume remained the same in all measurements. FIG. 6 shows a table that shows examples of Ag—Au nanostructures that have been reported in the literature.

REFERENCES (1) a) Rycenga, M.; Cobley, C. M.; Zeng, J.; Li, W.; Moran, C. H.; Zhang, Q.; Qin, D.; Xia, Y. *Chem. Rev.* 2011, 111, 3669; b) Nie, S.; Emory, S. R. *Science* 1997, 275, 1102; c) Nicewarner-Pena, S. R.; Freeman, R. G.; Reiss, B. D.; He, L.; Pena, D. J.; Walton, I. D.; Cromer, R.; Keating, C. D.; Natan, M. J. *Science* 2001, 294, 137; d) Dick, L. A.; McFarland, A. D.; Haynes, C. L.; Van Duyne, R. P. *J. Phys. Chem. B* 2002, 106, 853; e) Jones, R. M.; Osberg, K. D.; Macfarlane, R. J.; Langille, M. R.; Mirkin, C. A. *Chem. Rev.* 2011, 111, 3736.

(2) a) Tao, A.; Sinsermsuksakul, P.; Yang, P. *Angew. Chem. Int. Ed.* 2006, 45, 4597; b) Tao, A.; Sinsermsuksakul, P.; Yang, P. *Nat. Nanotechnol.* 2007, 2, 435; c) Rycenga, M.; Xia, X.; Moran, C. H.; Zhou, F.; Qin, D.; Li, Z.-Y; Xia, Y. *Angew. Chem. Int. Ed.* 2011, 50, 5587.

(3) a) Cobley, C. M.; Chen, J.; Cho, E. C.; Wang, L. V.; Xia, Y. *Chem. Soc. Rev.* 2011, 40, 44; b) Lim, I.-I. S.; Chandrachud, U.; Wang, L.; Gal, S.; Zhong, C.-J. *Anal. Chem.* 2008, 80, 6038.

(4) a) Jakab, A.; Rosman, C.; Khalavka, Y.; Becker, J.; Trugler, A.; Hohenester, U.; Sonnichsen, C. *ACS Nano* 2011, 5, 6880. b) Alvarez-Puebla, R. A. *J. Phys. Chem. Lett.* 2012, 3, 857; c) Lismont, M.; Dreesen, L. *Mater. Sci. Eng. C* 2012, 32, 1437.

(5) a) Jana, N. R.; Gearheart, L.; Murphy, C. J. *J. Phys. Chem. B* 2001, 105, 4065; b) Sun, Y.; Gates, B.; Mayers, B.; Xia, Y. *Nano Lett.* 2002, 2, 165.

(6) Pietrobon, B.; McEachran, M.; Kitaev, V. *ACS Nano* 2009, 3, 21.

(7) a) Sau, T. K.; Murphy, C. J. *J. Am. Chem. Soc.* 2004, 126, 8648; b) Seo, D.; Yoo, C. I.; Park, J. C.; Park, S. M.; Ryu, S.; Song, H. *Angew. Chem. Int. Ed.* 2008, 47, 775; c) Personick, M. L.; Langille, M. R.; Wu, J.; Mirkin, C. A. *J. Am. Chem. Soc.* 2013, 135, 3800.

(8) a) Wang, F.; Li, C. H.; Sun, L. D.; Xu, C.-H.; Wang, J. F.; Yu, J. C.; Yan, C.-H. *Angew. Chem. Int. Ed.* 2012, 51, 4872; b) Chen, Y.-S.; Hung, H.-H.; Huang, M. H. *J. Am. Chem. Soc.* 2009, 131, 9114.

(9) a) Mahmoud, M. A.; Tabor, C. E.; El-Sayed, M. A.; Ding, Y.; Wang, Z. L. *J. Am. Chem. Soc.* 2008, 130, 4590; b) Lee, H.; Habas, S. E.; Kweskin, S.; Butcher, D.; Somorjai, G. A.; Yang, P. *Angew. Chem. Int. Ed.* 2006, 45, 7824.

(10) a) Rogers, J. A.; Someya, T.; Huang, Y. *Science* 2010, 327, 1603; b) Yoo, H.; Millstone, J. E.; Li, S.; Jang, J.-W.; Wei, W.; Wu, J.; Schatz, G. G.; Mirkin, C. A. *Nano Lett.* 2009, 9, 3038; c) Peng, Z.; Yang, H. *J. Am. Chem. Soc.* 2009, 131, 7542; d) Habas, S.; Lee, H.; Radmilovic, V.; Somorjai, G. A.; Yang, P. *Nature Mater.* 2007, 6, 692.

(11) a) Sun, Y.; Mayers, B.; Xia, Y. *Adv. Mater.* 2003, 15, 641; b) McEachran, M.; Keogh, D.; Pietrobon, B.; Cathcart, N.; Gourevich, I.; Coombs, N.; Kitaev, V. *J. Am. Chem. Soc.* 2011, 133, 8066; c) Hong, X.; Wang, D.; Cai, S.; Rong, H.; Li, Y. *J. Am. Chem. Soc.* 2012, 134, 18165; d) Zhang, Q.; Xie, J.; Lee, J. Y.; Zhang, J.; Boothroyd, C. *Small*, 2008, 4, 1067; e) Sun, Y.; Wang, Y. *Nano Lett.* 2011, 11, 4386.

(12) Seo, D.; Song, H. J. *Am. Chem. Soc.* 2009, 131, 18210.

(13) a) Gao, C.; Lu, Z.; Liu Y.; Zhang, Q.; Chi M.; Cheng, Q.; Yin, Y. *Angew. Chem. Int. Ed.* 2012, 51, 5629; b) Sanedrin, R. G.; Georganopoulou, D. G.; Park, S.; Mirkin, C. A. *Adv. Mater.* 2005, 17, 1027; c) Shahjamali, M. M.; Bosman, M.; Cao, S.; Huang, X.; Saadat, S.; Martinsson, E.; Aili, D.; Tay, Y. Y.; Liedberg, B.; Loo, S. C. J.; Zhang, H.; Boey, F.; Xue, C. *Adv Funct. Mater.* 2012, 22, 849; d) Murshid, N.; Gourevich, I.; Coombs, N.; Kitaev, V. *Chem. Commun.* 2013, 49, 11355.

(14) a) Sun, Y.; Xia, Y. *J. Am. Chem. Soc.* 2004, 126, 3892; b) Yin, Y.; Zhang, Q.; Fu, Z.; Qin, D. *ACS App. Mater. Interfaces* 2014, 6, 3750.

(15) a) Luty-Blocho, M.; Paclawski, K.; Wojnicki, M.; Fitzner, K. *Inorg. Chim. Acta.* 2013, 395, 189; b) Personick, M.; Mirking, C. A. *J. Am. Chem. Soc.* 2013, 135, 18238;

(16) a) Wang, X.; Zhang, Z.; Hartland, G. V. *J. Phys. Chem. B* 2005, 109, 20324; b) Coronado, E. A.; Schatz, G. C. *J. Chem. Phys.* 2003, 119, 3926.

(17) Rycenga, M.; Hou, K. K.; Cobley, C. M.; Schwartz, A. G.; Camargo, P. H. C.; Xia, Y. *Phys. Chem. Chem. Phys.* 2009, 11, 5903.

(18) Stiles, P. L.; Dieringer, J. A.; Shah, N. C.; Van Duyne, R. P. *Annu. Rev. Anal. Chem.* 2008, 1, 601.

(19) Cho, S. H.; Han, H. S.; Jang, D. J.; Kim, K.; Kim, M. S. *J. Phys. Chem.* 1995, 99, 10594.

(20) Xia, X.; Zeng, J.; McDearmon, B.; Zheng, Y.; Li, Q.; Xia, Y. *Angew. Chem. Int. Ed.* 2011, 123, 12750.

(21) Li, W.; Camargo, P. H. C.; Lu, X.; Y.; Xia, Y. *Nano Lett.* 2009, 9, 485.

(22) Garcia de Abajo, F. J. *Rev. Mod. Phys.* 2007, 79, 1267.

(23) Schatz, G. C. *Acc. Chem. Res.* 1984, 17, 370.

(24) Ulman, A. *Chem. Rev.* 1996, 96, 1533.

(25) a) Morton, S. M.; Jensen, L. *J. Am. Chem. Soc.* 2009, 131, 4090. b) Wu, D.-Y.; Liu, X.-M.; Duan, S.; Xu, X.; Ren, B.; Lin, S.-H.; Tian, Z.-Q. *J. Phys. Chem. C* 2008, 112, 4195; c) Valley, N.; Greeneltch, N.; Van Duyne, R. P.; Schatz, G. C. *J. Phys. Chem. Lett.* 2013, 4, 2599.

Example 4

We report a new strategy for the transformation of Ag nanocubes into Ag@Ag—Au core-frame nanocubes by co-titrating AgNO$_3$ and HAuCl$_4$ concomitantly into an aqueous suspension of Ag nanocubes in the presence of ascorbic acid (AA) and poly (vinylpyrrolidone) at room temperature. When the molar ratio of AgNO$_3$ to HAuCl$_4$ was above a threshold of 3, we discovered that the added Ag$^+$ ions could effectively push the galvanic replacement reaction between Ag nanocubes and HAuCl$_4$ backward and thereby inhibit it, making it possible to achieve the co-reduction of the two precursors by AA without involving any galvanic replacement. As the volume of the co-titrated precursors was increased, we confirmed that the added AgNO$_3$ and HAuCl$_4$ were completely reduced to Ag and Au atoms, followed by their co-deposition onto the edges, corners, and then side faces of the Ag nanocubes in the fashion of seeded growth. As a result, the co-titration offers an exquisite control over the relative amounts of Ag and Au atoms being deposited by simply varying the feeding ratio between the two precursors. In comparing to Ag nanocubes, the Ag@Ag—Au nanocubes exhibited unique plasmonc properties. Upon removal the Ag cores in aqueous H$_2$O$_2$, we obtained Ag—Au nanoframes at atomic molar ratio of Ag and Au at 2:1, which could serve as an active catalyst for the reduction of 4-nitrophenol by NaBH$_4$.

Introduction

Noble-metal nanocrystals have received growing interests in recent years owning to their fascinating properties and widespread use in applications that include heterogeneous catalysis,[1-3] plasmonics,[4] optoelectronics,[5] optical sensing,[6,7] biomedical imaging,[8,9] and nanomedicine.[10,11] Over the past two decades, significant progress has been made in controlling the physical parameters of these nanocrystals.[12-14] Among those methods, seeded growth has emerged as the most versatile and powerful approach with exquisite controls over the products.[15-19] This approach involves the use of nanocrystals with a uniform size and shape as seeds for the heterogeneous nucleation and growth of the same or a different metal to produce nanocrystals with new properties. By simply maneuvering the experimental parameters, including the type of precursor, the reducing agent, and the amount of precursor relative to the number of seeds involved, one can obtain nanocrystals with many different sizes, shapes, compositions, and structures. The concept of seeded growth has been successfully applied to essentially all noble metals in both mono- and bimetallic formats.[20-31]

Despite the remarkable success, the capability of seeded growth involving two different metals has long been limited by the galvanic replacement reaction between the seeds and the precursor to the second metal. For example, when seeds made of Ag are mixed with HAuCl$_4$ (a precursor to Au), the more reactive Ag will be spontaneously oxidized and dissolved (partially or completely) from the seeds.[32] Likewise, Ag seeds could also react with Na$_2$PdCl$_4$ or K$_2$PtCl$_4$ in an aqueous solution, leading to their transformation into bimetallic hollow nanostructures comprised of a Ag—Pd or Ag—Pt alloy.[33-36] To this end, the destruction of the original seeds that are supposed to serve as the physical templates only to guide the deposition of another metal makes it difficult to control the growth pattern and generate the desired structures. Ideally, galvanic replacement should be eliminated in order to make the best use of seeded growth for generating bimetallic nanocrystals with precisely controlled structures and well-defined spatial distributions of elements.

One effective strategy for circumventing the galvanic replacement reaction between the seeds and a precursor to the other metal is to introduce a faster parallel reduction reaction to compete with and thereby block the galvanic reaction. The argument is that the precursor will be reduced to atoms immediately upon introduction into the reaction solution before it can undergo galvanic replacement with the seeds. In the absence of self-nucleation, the newly formed atoms will nucleate and then grow on the seeds to generate bimetallic nanocrystals with a well-controlled shape and structure. Mirkin was among the first to demonstrate this concept by depositing Au on Ag nanoprisms for the formation of Ag—Au alloy shell on the surfaces of nanoplates.[37] Most recently, we have validated this hypothesis for the deposition of Au atoms on Ag nanocubes to generate Ag@Au core-shell nanocubes.[38] In a typical process, we titrated an aqueous HAuCl$_4$ solution into an aqueous suspension that contained Ag nanocubes, ascorbic acid (AA), and poly(vinylpyrrolidone) (PVP). The added HAuCl$_4$ could be reduced by both the Ag nanocubes (via galvanic replacement, with a rate of R$_{gal}$) and AA (via chemical reduction, with a rate of R$_{red}$). By simply adding NaOH to increase the pH of reaction solution to 11.2, we were able to achieve the condition of R$_{red}$>R$_{gal}$, under which HAuCl$_4$ was exclusively reduced by AA to generate Au atoms for their conformal deposition onto the surfaces of Ag nanocubes in a layer-by-layer fashion.

An alternative approach for achieving the condition of R$_{red}$>R$_{gal}$ is to retard the galvanic replacement reaction (i.e., to reduce R$_{gal}$) between Ag and HAuCl$_4$. To this end, Yin and co-workers introduced I$^-$ ions into a system involving Ag nanoplates, HAuCl$_4$, and AA. The complexation of Au$^{3+}$ with I$^-$ ions could decrease the reduction potential of Au$^{3+}$ and thereby reduce R$_{gal}$. Consequently, the reduction of $AuI_4^-$ precursor by AA would generate Au atoms for their deposition onto the Ag nanoplates to generate Ag@Au core-shell nanoplates.[38] Using a similar approach, Kitaev and co-workers successfully deposited thin shells of Au on the surfaces of Ag decahedra or pentagonal nanorods by titrating aqueous $HAuCl_4$ into a suspension of the Ag nanocrystals at a rate of 3.2 nmol h$^{-1}$ up to 12 h.[39] Their results suggest that an extremely low concentration of $HAuCl_4$ in the reaction solution could diminish $R_{gal}$ and thus eliminate the possibility to generate pits on the Ag templates.

These prior studies have clearly demonstrated the ability to block the galvanic replacement reaction between Ag and $HAuCl_4$, but all of them only involved the titration of pure $HAuCl_4$ for the deposition of Au shells on the surfaces of Ag templates. Under these conditions, the shell should be made of essentially pure Au due to the limited inter-diffusion between the Ag atoms in the core and the Au atoms in the shell. Nevertheless, in many applications related to localized surface plasmon resonance (LSPR) and surface-enhanced Raman spectroscopy (SERS), it will be beneficial to have the capability to generate Au—Ag alloyed shells with a well-controlled composition on the Ag nanocrystals to further tailor their LSPR property and enhance their SERS activity. A simple and straightforward approach to generating such nanostructures with controls in morphology and composition is to co-titrate $AgNO_3$ and $HAuCl_4$ solutions at a specific feeding ratio into a suspension of Ag seeds in the presence of a reducing agent. If the added $AgNO_3$ and $HAuCl_4$ can both be reduced completely to Ag and Au atoms and then co-deposited onto the Ag seeds, this co-titration method would provide a simple and versatile route to a new class of Ag—Au hybrid nanocrystals. The availability of these Ag@Ag—Au nanocrystals with well-defined elemental distributions will advance our understanding of their LSPR properties for the development of better SERS probes.

Herein, we report a systematic study that involves the co-titration of aqueous $AgNO_3$ and $HAuCl_4$ into an aqueous suspension of Ag nanocubes in the presence of AA and PVP. We discovered, for the first time, that the supply of $AgNO_3$ and $HAuCl_4$ at a molar ratio of 3 and above could impede the galvanic replacement reaction between Ag nanocubes and $HAuCl_4$ by accelerating its reverse process, achieving conformal deposition of Ag—Au alloys on the surfaces of Ag nanocubes for the generation of Ag@Ag—Au nanocubes. In contrast, when the molar ratio of $AgNO_3$ to $HAuCl_4$ was below 3, galvanic replacement would still occur in the presence of AA, transforming the Ag nanocubes into hollow nanostructures covered by Ag—Au alloyed shells.[41] Remarkably, we validated that all the added $AgNO_3$ and $HAuCl_4$ could be completely reduced by AA to produce Ag and Au atoms, followed by their co-deposition onto the Ag nanocubes. As a result, the co-titration method offers an exquisite control over the relative amounts of Ag and Au atoms being deposited by simply varying the feeding ratio between the two precursors. When the co-titration volume of the two precursors was gradually increased, the newly generated Ag and Au atoms were progressively co-deposited onto the edges, corners, and then side faces of the Ag nanocubes. The Ag@Ag—Au nanocubes exhibited unique LSPR properties, together with improved performance for SERS at an excitation wavelength of 785 nm relative to the original Ag nanocubes. Upon removal of the Ag templates using an oxidant such as $H_2O_2$, we obtained Ag-enriched Ag—Au alloyed nanoframes with catalytic activity toward the reduction of 4-nitrophenol (4-NP) to 4-aminophenol (4-AP) by $NaBH_4$.

Results and Discussion

In a typical process, we used the published protocol to synthesize Ag nanocubes with an average edge length of 39.2±1.6 nm, together with slight truncation at the corners and edges.[42] We then dispersed the Ag nanocubes in an aqueous solution that contained AA and PVP at pH=3, followed by the co-titration of $AgNO_3$ and $HAuCl_4$ at a specific molar ratio using a dual-channel syringe pump at room temperature. It is worth mentioning that we cannot premix these two precursors for single titration because of the formation of AgCl precipitate. Also, we employed a slow co-titration rate of 0.02 mL/min to maintain $AgNO_3$ and $HAuCl_4$ at relatively low concentrations in the reaction system. As a result, we were able to avoid the formation of AgCl precipitate and the possible self-nucleation for both the Ag and Au atoms derived from the reduction by AA. During the co-titration process, we collected aliquots of samples from the reaction solution at different co-titration volumes and characterized the products by elemental analysis, electron microscopy, and UV-vis spectroscopy.

Firstly, we used inductively coupled plasmon mass spectrometry (ICP-MS) to measure the Ag and Au contents in the as-obtained samples after the Ag nanocubes had reacted with different volumes of the co-titrated precursors. In a typical analysis, we collected both solid products and supernatants after centrifugation to determine their Ag and Au contents by ICP-MS analysis. We found that the amounts of both Ag and Au in the solid products increased linearly with the volumes of $AgNO_3$ and $HAuCl_4$ co-titrated into the reaction solution (FIG. 4.1, solid lines). The deviations for Ag measurements were significantly larger than those for Au because it was difficult to quantify the amount of newly deposited Ag due to the interference from the original Ag nanocubes. By assuming that the added precursors were completely reduced to Ag and Au atoms and then co-deposited on the Ag nanocubes, we also calculated the amounts of Ag and Au that would be added onto the Ag nanocubes at different co-titration volumes (see the dotted lines in FIG. 4.1). Within reasonable errors, the added and actually deposited amounts of Ag and Au matched well to each other for every solid product. Furthermore, our ICP-MS analysis confirmed that the Ag and Au contents in the supernatants were below $8.6 \times 10^{-4}$ and $2 \times 10^{-5}$ mM, respectively, during the entire co-titration process. Collectively, our data support the argument that the co-titrated $AgNO_3$ and $HAuCl_4$ precursors were completely reduced by AA to generate Ag and Au atoms, respectively, followed by their co-deposition onto the Ag nanocubes.

We used electron microscopy to resolve changes to the morphology of Ag nanocubes during the co-titration process. FIG. 4.2, A-D, shows SEM images of the Ag nanocubes after they had reacted with different volumes of $AgNO_3$ (0.3 mM) and $HAuCl_4$ (0.1 mM) in the presence of AA at pH=3. With the addition of 0.2 and 0.4 mL for each precursor, the SEM images confirmed that the cubic shape of the original particles was well preserved and no pits could be identified on each particle. TEM images indicated that the average edge length of the Ag nanocubes was increased from 39.2±1.6 nm to 40.9±2.3 and 42.8±1.64 nm, respectively. The increase in size indicates the co-deposition of Ag and Au atoms onto the Ag nanocubes. TEM images also confirmed the absence of voids/pits in/on each nanocube, excluding the possible involvement of galvanic replacement between the Ag nanocubes and the added $HAuCl_4$. With further increase of the titration volume to 0.8 and 1.5 mL for each precursor, the nanocubes showed more truncation at the corner sites. Again, we did not observe any voids or pits from the TEM image of the nanocubes. It was difficult to resolve possible truncation for the corners and edges of nanocubes from the TEM images.

To identify the deposition pathway, we used 3% aqueous $H_2O_2$ to remove the original Ag nanocubes in the cores while making the deposited Ag—Au alloy structures intact. FIG. 4.3, A-D, shows TEM images of the resultant nanostructures after selective removal of the Ag templates from the Ag@Ag—Au nanocubes by etching for 1 h. With the introduction of 0.2 mL of each precursor, we observed the formation of Ag—Au alloyed nanoframes with thin ridges and some coverage for the {111} facets at the corners (FIG. 4.3A). At 0.4 mL for each precursor, we noticed the formation of Ag—Au nanoframes with thicker ridges as well as flat planes at the corner sites, together with some deposition of Ag and Au on the side faces (FIG. 4.3B). With continuous increase in titration volume to 0.8 and 1.5 mL for each precursor, we noticed that more Ag—Au showed up on the side faces of each nanocube, leading to the formation of nanocages with decreasing porosity on the side faces (FIGS. 4.3, C and D).

Based on the results shown in FIGS. 4.1-3, we proposed a plausible mechanism that can account for the co-reduction and co-deposition of Ag and Au on Ag nanocubes (FIG. 4.4). There are three competing reactions involved in the co-titration process: i) the galvanic replacement between Ag nanocubes and $HAuCl_4$, ii) the reduction of $HAuCl_4$ by AA, and iii) the reduction of $AgNO_3$ by AA. It is critical to co-titrate $AgNO_3$ and $HAuCl_4$ at a proper molar ratio in order to provide an adequate amount of $Ag^+$ ions in the reaction solution to effectively push the galvanic replacement reaction backward and eventually block it. Also, it is essential to introduce the $AgNO_3$ precursor drop-wise to keep the local concentration of $Ag^+$ ions at a sufficiently low level for eliminating the possible formation of AgCl precipitate due to the presence of $Cl^-$ ions from $HAuCl_4$. When the molar ratio of $AgNO_3$ to $HAuCl_4$ was increased to 3 and above, we could achieve the condition of $R_{red}>R_{gal}$, and as a result, the added $HAuCl_4$ was immediately reduced by AA before it could participate in the galvanic reaction with the Ag nanocubes. Combined together, the co-reduction of $AgNO_3$ and $HAuCl_4$ by AA would generate Ag and Au atoms for their co-deposition onto the Ag nanocubes in a fashion similar to the conventional seeded growth.

According to the standard reduction potentials of $Ag^+/Ag$ (0.79 V) and $AuCl_4^-/Au$ (0.99 V) at room temperature,[43] we anticipate that $AuCl_4^-$ should be reduced firstly by AA to generate Au atoms for their deposition onto the Ag nanocubes. In the following step, $Ag^+$ ions will go through underpotential deposition onto the Au atoms to generate a Au—Ag alloy.[44] In a sense, we believe that the Au and Ag atoms were deposited concomitantly.[45,46] Because the {100} facets of a Ag nanocube are selectively passivated by PVP, the specific surface free energies of its low-index facets should increase in the order $\gamma_{100}<\gamma_{111}<\gamma_{110}$. At the early stage of co-deposition, the Ag and Au atoms should preferentially nucleate on the {110} facets with the highest energy, and as such, these atoms would be largely deposited on the edges of the Ag nanocube. As the volumes of the two precursors are increased, more atoms will be generated for their continuous deposition onto the {110} facets, followed by their successive migration of atoms via surface diffusion to the {111} facets (corners) and {100} facets (side faces) of the Ag nanocube, respectively,[47] leading to the formation of core-frame nanocubes and then truncated nanocubes. This proposed growth pathway is consistent with our recent work for the generation of Ag@Pd—Ag nanocubes.[48]

It is well-known that Au and Ag nanocrystals have distinctive LSPR properties that are strongly dependent on parameters that include size, shape, morphology, and internal structure (solid versus hollow).[49] When these two metals are alloyed together, the LSPR properties should be sensitive to the elemental composition. In this work, we used the UV-vis spectroscopy to characterize the LSPR properties of the Ag@Ag—Au nanocubes. FIG. 4.5A shows UV-vis spectra of an aqueous suspension of the Ag nanocubes before and after they had reacted with different volumes of co-titrated $AgNO_3$ (0.3 mM) and $HAuCl_4$ (0.1 mM) in the presence of AA. Because we corrected the dilution factor caused by the titration of different volumes of the precursor solutions, the change in peak intensity could be directly correlated to the variation in extinction coefficient associated with the resultant products. With a co-titration volume of 0.05 and 0.1 mL (for each precursor), the major LSPR peak of the Ag nanocubes was red-shifted from 437 to 446 and 452 nm, respectively, together with a major drop in intensity and some broadening in width. According to previous studies, these changes to the LSPR features could be attributed to the scattering at an interface between Ag and Au due to the deposition of Au on the Ag nanocubes.[50] With further increase of co-titration volume to 0.2, 0.4 and 0.8 mL, the major LSPR peak was red-shifted to 458, 469 and 475 nm, respectively, with slight increases for both intensity and width. The red-shift in peak position can be ascribed to the increase in edge length for the nanocubes. Because Ag has a stronger plasmon resonance than that of Au,[51] the increase in peak intensity for the samples obtaining with co-titration volume increasing from 0.2 to 0.8 mL can be attributed to the deposition of a significantly larger amount of Ag than Au during the co-titration process. When the titration volume was further increased from 0.8 to 1.5 mL, however, the major LSPR peak was slightly blue-shift from 475 to 473 nm, together with an increase in intensity, suggesting the formation of nanocubes with significantly truncated corners as the deposition progressed. The information derived from the UV-vis spectra is consistent with the observations by SEM and TEM imaging.

To further elucidate the role of Au in manipulating the LSPR properties of Ag nanocubes, we performed a control experiment to titrate different volumes of $AgNO_3$ (0.3 mM) in the absence of $HAuCl_4$ while leaving the other experimental parameters unchanged. Different from those shown in FIG. 5.5A, we found that the LSPR of Ag nanocubes was red-shifted from 437 to 448 nm at 0.2 mL and then slightly blue shifted from 448 to 443 nm gradually as the titration volume was increased up to 1.5 mL. The spectra confirmed that the involvement of Au could be manipulated to tailor the LSPR properties of Ag nanocubes through the co-deposition of Ag and Au atoms at a well-controlled ratio and partial distribution.

We also monitored the changes to the LSPR of the Ag nanocubes when the molar ratio of the two precursors was set to 1 below the threshold of 3 for the galvanic-free co-deposition. As shown in FIG. 5.5B, we found that the LSPR peak of the Ag nanocubes was continuously shifted to the red, together with a decrease in intensity. At a co-titration volume of 0.4 mL, the LSPR peak was changed from 437 to 469 nm and there was more broadening in peak width, indicating the involvement of galvanic replacement reaction. TEM characterization also confirmed the formation of voids in the nanocubes. At 1.5 mL, the LSPR peak was further shifted to 493 nm with considerably broadening in peak width. TEM image indicated the transformation of Ag nanocubes into Ag—Au hollow nanocubes. This data suggest that, when an inadequate amount of AgNO$_3$ was involved in the co-titration process to inhibit galvanic replacement reaction, Ag nanocubes were transformed into hollow nanostructures made of an Au—Ag alloy, consistent with our previous study.[41]

We evaluated the SERS performance of the Ag@Ag—Au nanocubes by benchmarking against the original Ag nanocubes. Specifically, we collected SERS spectra of 1,4-benzenedithiol (1,4-BDT) molecules adsorbed on the surfaces of the Ag nanocubes and Ag@Ag—Au nanocubes obtained by co-titrating 0.4 mL for AgNO$_3$ (0.3 mM) and HAuCl$_4$ (0.1 mM). We observed distinctive SERS properties for the Ag@Ag—Au nanocubes at visible and near-infrared excitation wavelengths. At 532 nm laser excitation wavelength, we found that the SERS peak at 1562 cm$^{-1}$ (the benzene ring mode 8a) decreased in intensity with the involvement of Au (FIG. 4.6A). Because the inter-band transition of Au is positioned at 2.5 eV (~500 nm),[52] the inclusion of Au into Ag nanostructures would lead to a stronger plasmon damping at visible excitation wavelength and thereby attenuate SERS intensity. When we switched the laser excitation to 785 nm, we noticed that the intensity of the same SERS peak at 1562 cm$^{-1}$ was increased by ~3 times (FIG. 4.6B), suggesting that the co-deposition of Ag and Au onto the surfaces of Ag nanocubes could enhance the SERS activity for biological detection in the near-infrared region.

In additional to the unique LSPR and SERS properties for the Ag@Ag—Au nanocubes, we also demonstrated the potential use of the Ag—Au nanoframes as a catalyst for the reduction of 4-nitrophenol (4-NP) to 4-aminophenol (4-AP) by NaBH$_4$.[53] Specifically, we prepared the sample with a co-titration volume of 0.2 mL for each precursor and then removed the Ag templates with 3% H$_2$O$_2$ (see FIG. 4.3A). We obtained a Ag to Au molar ratio of 2:1 by ICP-MS analysis. Upon the introduction of 1.42×10$^{11}$ nanoframes, we collected a series of UV-vis spectra of 4-NP as a function of time (FIG. 4.7A). By monitoring the decay of the absorption peak at 400 nm, we plotted ln[A$_0$/A$_t$] vs time and obtained a straight line (FIG. 4.7B). Our result indicates that the reaction follows the first-order kinetics, with a rate constant of 0.123 min$^{-1}$.

Conclusions

We have demonstrated the co-deposition of Ag and Au atoms on Ag nanocubes for the generation of Ag@Ag—Au nanocrystals through the co-titration of AgNO$_3$ and HAuCl$_4$ in the presence of AA. The co-titration process could be used to effectively block the galvanic replacement reaction between Ag nanocubes and HAuCl$_4$ when the added AgNO$_3$ was sufficient to push this reaction backward. As a result, the two precursors would be reduced completely by AA for the generation of Ag and Au atoms, followed by their deposition onto the Ag nanocubes in a fashion similar to the conventional seeded growth. Initially, the Au and Ag atoms were deposited on the edges and corners of the Ag nanocubes to generate Ag@Ag—Au core-frame nanocubes. As the co-titration volume was increased, more Ag and Au atoms were co-deposited at the edge and corner sites and then allowed to migrate to the side faces through surface diffusion. We used UV-vis spectroscopy to monitor changes to the LSPR properties of the Ag nanocubes during their transformation into Ag@Ag—Au nanocubes. The co-deposition of Ag and Au atoms on the surfaces of Ag nanocubes could be used to enhance the SERS activity of Ag nanocubes at an excitation wavelength of 785 nm. Additionally, upon the removal Ag templates from the Ag@Ag—Au nanocubes by H$_2$O$_2$ etching, we obtained Ag-enriched Ag—Au nanoframes with catalytic activity toward the reduction of 4-NP by NaBH$_4$.

REFERENCES (1) Burda, C.; Chen, X.; Narayanan R.; El-Sayed, M. A. Chem. Rev. 2005, 105, 1025-1102.
(2) Zhang, H.; Jin, M.; Xia, Y. Angew. Chem. Int. Ed. 2012, 51, 7656-7673.
(3) Joo, S. H.; Park, J. Y.; Tsung, C. K.; Yamada, Y.; Yang, P.; Somorjai, G. A. Nat. Mater. 2009, 8, 126-131.
(4) Halas, N. J.; Lai, S.; Chang, W. S.; Link, S.; Nordlander, P. Chem. Rev. 2011, 111, 3913-3961.
(5) Knight, M. W.; Sobhani, H.; Nordlander, P.; Halas, N. J. Science, 2011, 332, 702-704.
(6) Haes, A. J.; Haynes, C. L.; McFarland, A. D.; Schatz, G. C.; Van Duyne, R. P.; Zou, S. MRS Bulletin 2005, 30, 368-375.
(7) Willets K. A.; Van Duyne, R. P. Ann. Rev. of Phys. Chem. 2007, 58, 267-297.
(8) Xia, Y.; Li, W.; Cobley, C. M.; Chen, J.; Xia, X.; Zhang, Q.; Yang, M.; Cho, E. C.; Brown, P. K. Acc. Chem. Res. 2011, 44, 914-924.
(9) Rosi, N. L.; Mirkin, C. A. Chem. Rev. 2005, 105, 1547-1562.
(10) Qian, X. M. X.; Peng, H.; Ansari, D. O.; Yin-Goen, Q.; Chen, G. Z.; Shin, D. M.; Yang, L.; Young, A. N.; Wang M. D.; Nie, S. M. Nat. Biotech. 2008, 26, 83-90.
(11) Lal, S.; Clare, S. E.; Halas, N. J. Acc. Chem. Res. 2008, 41, 1842-1851.
(12) Xia, Y.; Xiong, Y.; Lim, B.; Skrabalak, S. E. Angew. Chem. Int. Ed. 2009, 48, 60-103.
(13) Macfarlane, R. J.; Langille, M. R.; Mirkin, C. A. Chem. Rev. 2011, 111, 3736-3827.
(14) Zhang, Q.; Lee, I.; Joo, J. B.; Zaera, F.; Yin, Y. Acc. Chem. Res. 2013, 44, 1618-1824.
(15) Zhang, H.; Jin, M.; Xia, Y. Chem. Soc. Rev. 2012, 41, 8035-8049.
(16) Gao, C.; Goebl, J.; Yin Y. J. Mater. Chem. C, 2013, 1, 3898-3909.
(17) Lohse, S. E.; Burrows, N. D.; Scarabelli, L.; Liz-Marzán L. M.; Murphy, C. J. Chem. Mater. 2014, 26, 34-43.
(18) Niu, W.; Zhang, L; Xu, G. Nanoscale 2013, 5, 3172-3181.
(19) Nikoobakht, B.; El-Sayed, M. A. Chem. Mater. 2003, 15, 1957-1962.
(20) Jana, N. R.; Gearheart, L.; Murphy, C. J. J. Phys. Chem. B 2001, 105, 4065-4067.
(21) Sun, Y.; Gates, B.; Mayers, B.; Xia, Y. Nano Lett. 2002, 2, 165-168.
(22) DeSantis, C. J.; Skrabalak, S. E. J. Am. Chem. Soc. 2013, 135, 10-13.
(23) Langile, M. R.; Personick, M. L.; Zhang, J.; Mirkin, C. A. Am. Chem. Soc. 2013, 134, 14542-14554.
(24) Crane, C. C.; Tao, J.; Wang, F.; Zhu, Y.; Chen, J. J. Phys. Chem. C 2014, 118, 28134-28142.
(25) Jing, H.; Zhang, Q.; Large, N.; Yu, C.; Blom, D. A.; Nordlander, P.; Wang, H. Nano Lett. 2014, 14, 3674-3682.
(26) Peng, Z.; Yang, H. J. Am. Chem. Soc. 2009, 131, 7542-7543.
(27) Lohse, S. E.; Burrows, N. D; Scarabelli, L.; Liz-Marzan, L.; Murphy, C. J. Chem. Mater. 2014, 2 6, 34-43.
(28) Murphy, C. J.; Sau, T. K.; Gole, A.; Orendorff, C. J. MRS Bulletin 2005, 30, 349-355.

(29) Guerrero-Martinez, A.; Barbosa, S.; Pastoriza-Santos, I.; Liz-Marzán, L. M. *Curr. Op. Colloid Interface Sci.* 2011, 16, 118-127.
(30) Samal, A. K.; Polavarapu, L.; Rodal-Cedeira, S.; Liz-Marzán, L. M.; Pérez-Juste, J.; Pastoriza-Santos, I. *Langmuir,* 2013, 29, 15076-15082.
(31) DeSantis, C. J.; Weiner, R.; Radmilovic, A.; Bower, M. M.; Skrabalak, S. E. *J. Phy. Chem. Lett.,* 2013, 4, 3072-3082.
(32) Sun; Y. Xia, Y. *J. Am. Chem. Soc.* 2004, 126, 3892-3901.
(33) Chen, J.; Wiley, B.; McLellan, J.; Xiong, Y.; Li, Z.-Y. Xia, Y. *Nano Lett.* 2005, 5, 2058-2062.
(34) Hong, J. W.; Kang, S. W.; Choi, B.-S.; Kim, D.; Lee, S. B. Han S. W. *ACS Nano* 2012, 3, 2410-2419.
(35) Zhang, W.; Yang, J.; Lu, X. *ACS Nano* 2012, 6, 7397-405.
(36) Liang, H. P.; Zhang, H. M.; Hu, J. S.; Guo, Y. G.; Wan, L. J.; Bai, C. L. *Angew. Chem. Int. Ed.* 2004, 43, 1540-1543.
(37) D. G.; Park, S.; Mirkin, C. A. *Adv. Mater.* 2005, 17, 1027.
(38) Yang, Y.; Liu, J.; Fu, Z. W.; Qin, D. *J. Am. Chem. Soc.* 2014, 136, 8153-8156.
(39) Gao, C.; Lu, Z.; Liu Y.; Zhang, Q.; Chi M.; Cheng, Q.; Yin, Y. *Angew. Chem. Int. Ed.* 2012, 51, 5629-5633.
(40) Murshid, N.; Gourevich, I.; Coombs, N.; Kitaev, V. *Chem. Commun.* 2013, 49, 11355-11357.
(41) Yang, Y.; Zhang, Q.; Fu, Z.-W.; Qin, D. *ACS Appl. Mater. Interfaces* 2014, 6, 3750-3757.
(42) Q. Zhang, W. Li, L. P. Wen, J. Chen and Y. Xia, *Chem. Eur. J.,* 2010, 16, 10234-10239.
(43) Milazzo, G.; Caroli, S.; Braun, R. D. *J. Electrochem. Soc.* 1978, 125, 261C-261C.
(44) Herrero, E.; Buller, L. J.; Abruna, H. D. *Chem. Rev.* 2001, 101, 1897-1930.
(45) Link, S.; Wang, Z. L.; El-Sayed, M. A. *J. Phys. Chem. B,* 1999, 103, 3529-3533.
(46) Mallin, M. P.; Murphy, C. J. *Nano. Lett.* 2002, 2, 1235-1237.
(47) Xia, X.; Xie, S.; Liu, M.; Peng, H.-C.; Lu, N.; Wang, J.; Kim, M. J.; Xia. Y. *Proc. Natl. Acad. Sci. USA* 2013, 110, 6669-6673.
(48) Li, J.; Liu, J.; Yang, Y.; D. Qin, *J. Am. Chem. Soc.* 2015, 137, 7039-7042.
(49) Rycenga, M.; Cobley, C. M.; Zeng, J.; Li, W.; Moran, C. H.; Zhang, Q.; Qin, D.; Xia, Y. *Chem. Rev.* 2011, 111, 3669-3712.
(50) Wang, X.; Zhang, Z.; Hartland, G. V. *J. Phys. Chem. B* 2005, 109, 20324-20330.
(51) Lismont, M.; Dreesen, L. *Mater. Sci. Eng. C* 2012, 32, 1437-1442.
(52) Johnson, P.; Christy, R. *Phys. Rev. B: Solid State,* 1972, 6, 4370-4379.
(53) Pradhan, N.; Pal, A.; Pal, T. *Langmuir,* 2001, 17, 1800-1802.

Example 5

We report a route to the facile synthesis of Ag@Pd—Ag nanocubes by co-titrating $Na_2PdCl_4$ and $AgNO_3$ into an aqueous suspension of Ag nanocubes at room temperature in the presence of ascorbic acid and poly(vinyl pyrrolidone). With increasing the total volume of the solutions titrated, we observed the co-deposition of Pd and Ag atoms onto the edges, corners, and side faces of Ag nanocubes in a site-by-site fashion. By maneuvering the ratio of Pd to Ag, we could optimize the SERS and catalytic activities of the Ag@Pd—Ag nanocubes for in situ SERS monitoring of Pd-catalyzed reduction of 4-nitrothiophenol by $NaBH_4$.

Noble-metal nanocrystals with well-defined shapes or facets have received significant attention as heterogeneous catalysts in recent years because of their remarkable activity and selectivity.[1] Most of these nanocrystals, however, cannot be combined with a spectroscopy method to measure the reaction kinetics and elucidate the mechanism by monitoring a catalytic reaction in situ.[2] Conceptually, surface-enhanced Raman spectroscopy (SERS) could serve as a powerful platform for the in situ monitoring of a catalytic reaction by developing bifunctional noble-metal nanocrystals with an integration of SERS and catalytic activities. Among noble metals, it has been established that Ag and Au nanocrystals embrace strong localized surface plasmon resonance (LSPR) peaks in the visible region for SERS applications.[3] For example, many groups have demonstrated that Ag nanocubes with sharp corners and edges could enhance the Raman scattering cross-section by $10^7$ to $10^8$ folds in terms of enhancement factor (EF).[4] Unfortunately, the reactions that could be catalyzed by Ag and Au nanocrystals are rather limited.[2b,5] In contrast, Pd and Pt nanocrystals are able to catalyze a larger number of chemical reactions,[6] but both Pd and Pt are extremely poor SERS substrates because of the very weak coupling between their free electrons and the visible light.[7] The SERS EF of 40-nm Pd nanocubes are only $10^3$-$10^4$, which are $10^4$ folds weaker than that of Ag nanocubes with a similar size.[8] Taken together, it is extremely difficult to achieve the desired activities for both SERS and catalysis using monometallic Ag, Au, Pd or Pt nanocrystals.

One approach to integrate the SERS and catalytic properties on a single nanocrystal is to directly deposit Pd or Pt on the surfaces of Au or Ag nanocrystals for the formation of bimetallic nanocrystals with dual functionality. Many groups have made significant contributions to the fabrication of Au@Pd/Pt/Ag bifunctional nanocrystals by using Au as the core for SERS and a thin layer of Pd, Pt, or Ag as the shell for catalysis. The bifunctional nanocrystals were further demonstrated for in situ SERS monitoring of the reduction of 4-nitrothiophenol (4-NTP) to 4-aminothiophenol (4-ATP) by $NaBH_4$. For example, Schlucker and co-workers reported the formation of Au@Pt/Au core-shell nanoscale raspberries by depositing Ag on Au nanoparticles, followed by the galvanic replacement of Ag with a Pt or Au precursor.[2b] Han and others demonstrated the selective deposition of Au—Pd alloy at the ends of Au nanorods for the generation of Au—Pd alloy horns.[9] Wang and co-workers created high-index facets of Ag on the surfaces of Au nanorods via selective deposition of Ag on the nanorods and selective chemical etching of Ag.[10] In contrast to their Au counterparts, the use of Ag nanocrystals has been met with limited success for the formation of Ag—Pd/Pt bifunctional nanocrystals because of the galvanic replacement between elemental Ag and a Pd/Pt precursor.[11] While the replacement reaction allows for the formation of Ag—Pd/Pt bimetallic hollow nanostructures with the catalytic properties associated with Pd/Pt atoms,[12] the significant loss of Ag content during galvanic replacement often leads to the deterioration in SERS activity. Recently, we reported a strategy to complement galvanic replacement with the co-reduction by ascorbic acid (AA) for recovering the galvanized Ag back to the surfaces of Ag nanocubes, ultimately obtaining Ag—Au hollow nanocubes with strong SERS activity.[13] Most recently, Wang and co-workers successfully demonstrated that a combination of galvanic replacement and co-reduction by AA allowed for the generation of Ag—Pd bimetallic hollow nanocubes with an edge length of 100 nm.[12b] They evaluated the catalytic activity of the Ag—Pd hollow nanostructures for the hydrogenation of p-nitrophenol by NaBH$_4$. Like many other groups, they did not report the use of their Ag—Pd nanostructures for in situ SERS monitoring of a catalytic reaction, probably due to the lack of detection sensitivity.

In this Example, we report the co-deposition of Pd and Ag atoms onto the surfaces of Ag nanocubes for the generation of Ag@Pd—Ag nanocubes with integrated SERS and catalytic activities. Specifically, we co-titrated Na$_2$PdCl$_4$ and AgNO$_3$ into an aqueous suspension of Ag nanocubes in the presence of AA (reductant) and PVP (a capping agent and a colloidal stabilizer) at a slow injection rate and at room temperature. We found that the galvanic reaction between Ag nanocubes and Na$_2$PdCl$_4$ was effectively suppressed due to the involvement of Ag$^+$ ions and AA, leading to the co-deposition of Pd and Ag atoms on the surfaces of Ag nanocubes in a site-by-site manner.[14] By simply increasing the total volume of precursor solutions added into the reaction system, we could control the growth pattern to have the Pd and Ag atoms progressively deposited on the edges, corners, and then side faces of Ag nanocubes. We confirmed that the catalytic activity of resultant Ag@Pd—Ag nanocubes could be manipulated by varying the amount of Pd atoms deposited on the surfaces of nanocubes. Furthermore, through the inclusion of additional Ag, we found that the Ag@Pd—Ag nanocubes could embrace both LSPR and SERS properties similar to those of the original Ag cubes. By optimizing the ratio of Pd to Ag, we successfully demonstrated the feasibility of using Ag@Pd—Ag nanocubes for in situ SERS monitoring of Pd-catalyzed reduction of 4-NTP to 4-ATP by NaBH$_4$. To our knowledge, this work represents the first demonstration of Ag-based nanocrystals that integrate two distinct functionalities into one single entity.

We firstly prepared the Ag nanocubes with an edge length of 39.2±1.6 nm, together with slight truncation at corners and edges (FIG. 5.5). Next, we dispersed the Ag nanocubes in an aqueous solution containing AA and PVP, followed by the co-titration of two precursor solutions, Na$_2$PdCl$_4$ (0.2 mM) and AgNO$_3$ (0.1 mM), at an injection rate of 0.02 mL/min under ambient conditions using a syringe pump. FIGS. 5.1A-C show TEM images of the Ag@Pd—Ag nanocubes prepared after adding different total volumes of the two precursor solutions. Because of the similar atomic numbers of Pd and Ag, it was difficult to differentiate the Ag nanocube in the core from the Pd—Ag alloy in the shell by TEM. However, we noticed that the corners and edges of the Ag nanocubes were sharpened, implying the preferential deposition of Pd and Ag atoms at these sites. With an increase in volume to 0.3 mL for each precursor solution, the edge length of the nanocubes was increased from 39.2±1.6 to 41.5±1.4 nm (Table 5.1). These results suggest the formation of Ag@Pd—Ag nanocubes with a shell thickness of about 1.1 nm. There was no void in each individual core-shell particle.

TABLE 5.1

Edge lengths of the Ag@Pd-Ag nanocubes.

| Volume of Na$_2$PdCl$_4$ and AgNO$_3$ (mL) | Edge length[a] (nm) |
|---|---|
| 0.0 and 0.0 | 39.2 ± 1.6 |
| 0.1 and 0.1 | 39.9 ± 1.8 |
| 0.2 and 0.2 | 40.8 ± 1.5 |
| 0.3 and 0.3 | 41.5 ± 1.4 |
| 0.5 and 0.5 | 43.1 ± 1.4 |

[a]Obtained from an analysis of 100 nanoparticles in the TEM images.

We also monitored the UV-vis spectra of the Ag nanocubes after they had reacted with different volumes of Na$_2$PdCl$_4$ and AgNO$_3$ (FIG. 5.6A). During the co-titration up to 0.3 mL for each solution, the major LSPR peak of the Ag nanocubes was only red-shifted from 436 to 445 nm, together with slight peak broadening. These results imply that the LSPR property of the original Ag nanocubes was well-preserved in the Ag@Pd—Ag nanocubes. To confirm the deposition of Pd on Ag nanocubes, we used inductively coupled plasma mass spectrometry (ICP-MS) to measure the Pd and Ag contents in the core-shell nanocubes. The Pd content was increased from 2.2% to 7.3% as the co-titration volume went from 0.1 to 0.5 mL, respectively (Table 5.2). These results suggest that we could maneuver the amount of Pd deposited on the Ag nanocubes by simply varying the volume of Na$_2$PdCl$_4$ titrated into the reaction solution. Unfortunately, it was difficult to qualify the amount of the newly deposited Ag due to the interference of Ag from the original Ag nanocubes.

To resolve the distribution of Pd atoms on the surfaces of Ag nanocubes, we used 2.3% aqueous H$_2$O$_2$ to selectively remove the Ag component while leaving the Pd component intact. FIGS. 5.1D-F show TEM images of the resultant nanostructures after selective etching of Ag from the Ag@Pd—Ag nanocubes (FIGS. 5.1A-C) with H$_2$O$_2$. At 0.1 mL, we observed the formation of nanoframes with thin ridges and little coverage for the {111} facets at the corners (FIG. 5.1D). As the volume of co-titration was increased to 0.2 and 0.3 mL for each solution, nanoframes with thicker ridges (as well as flat planes at the corners, FIG. 5.1E) and nanocages (FIG. 5.1F) were formed, respectively.

FIG. 5.2 outlines the proposed pathways for explaining the selective deposition of Pd and Ag atoms on a Ag nanocube. Because it is extremely difficult, if not impossible, to resolve the deposition sites for the newly formed Ag atoms, we assumed that Pd and Ag atoms were deposited concomitantly. In principle, for metal nanocrystals with a face-centered cubic (fcc) structure, the surface free energies of low-index facets increase in the order of $\gamma_{111} < \gamma_{100} < \gamma_{110}$. In our case, the selective passivation of {100} facets of Ag nanocubes by PVP would result in the reduction of $\gamma_{100}$, and thus a new order of $\gamma_{100} < \gamma_{111} < \gamma_{110}$. At an early stage of reaction (e.g., 0.1 mL), the Pd and Ag atoms would preferentially nucleate on the high-energy {110} facets and thereby these atoms would be largely confined to the edges of Ag nanocubes. This observation is consistent with previous findings in the synthesis of other bimetallic nanostructures.[15] As the volumes of Pd and Ag precursors were increased to 0.2 and 0.3 mL, respectively, more atoms were generated for their deposition onto the {110} facets, making the ridges thicker. Our results suggest that some atoms could sequentially migrate to the {111} facets (corners) and then {100} facets (side faces) of the Ag nanocubes by surface diffusion.[16]

We used 1,4-benzenedithiol (1,4-BDT) as a Raman probe to evaluate the SERS property of the Ag@Pd—Ag nanocubes. FIG. 5.3A shows the SERS spectra recorded from Ag nanocubes before and after they had reacted with different volumes of Pd and Ag precursors. By monitoring the SERS peak at 1562 cm$^{-1}$ (the benzene ring mode of 1,4-BDT), we found that its intensity dropped by 20%, 30%, 46%, and 81% as the co-titration volume was increased from 0.1, 0.2, 0.3 to 0.5 mL, respectively. These results suggest that the deposition of Pd atoms on Ag nanocubes would deteriorate their SERS activity, which is consistent with previous findings.[2a, 17] On the other hand, we speculated that the new Ag atoms deposited through the co-titration process could help alleviating the damper effect of Pd on the LSPR and SERS properties of Ag nanocubes. To verify our hypothesis, we titrated Na$_2$PdCl$_4$ without the involvement of AgNO$_3$ while keeping all other experiential conditions unaltered. FIG. 5.7A shows TEM image of the nanocubes after they had reacted with 0.2 mL of Na$_2$PdCl$_4$. FIG. 5.7B indicates the formation of nanoframes upon etching with 2.3% H$_2$O$_2$, suggesting the selective deposition of Pd onto edges and corners for the generation of Ag@Pd nanocubes. FIG. 5.6B shows UV-vis spectra of the Ag nanocubes before and after they had reacted with different volumes of NaPdCl$_4$. In this case, the LSPR of Ag nanocubes was slightly red-shifted from 436 to 439 and 443 nm at titration volumes of 0.1 and 0.2 mL, followed by more significant red-shift to 448 and 454 nm (together with great reduction in intensity) at titration volumes of 0.3 and 0.5 mL, respectively. We also collected SERS spectra from the Ag@Pd nanocubes prepared with the addition of different volumes of NaPdCl$_4$. As shown in FIG. 5.3B, the peak intensity at 1562 cm$^{-1}$ was more drastically reduced by 39%, 64%, 93%, and 100% as the titration volume was increased from 0.1, 0.2, 0.3 to 0.5 mL, respectively. Collectively, our results suggest that it is essential to include Ag atoms during the deposition of Pd atoms in order to retain the remarkable LSPR and SERS properties of the Ag nanocubes. It is worth noting that the co-titration of Pd and Ag precursors would allow the deposition of both Pd and Ag on the outer surface of each nanocube, making it possible to retain the SERS activity due to a stronger binding between the Raman probe molecules and Ag relative to Pd.

Next, we assessed the catalytic activity of the Ag@Pd—Ag nanocubes using the reduction of 4-nitrophenol (4-NP) to 4-aminophenol (4-AP) by NaBH$_4$ as a model reaction.[12b, 18] The procedure was described in detail in the Supporting Information. Specifically, we used UV-vis spectroscopy to monitor the decay of the absorption peak of 4-NP at 400 nm as reduction proceeded after the addition of a catalyst. FIG. 5.8A shows the absorption spectra of 4-NP as a function of time when the reduction was catalyzed by the Ag@Pd—Ag nanocubes prepared with a co-titration volume of 0.2 mL. We also benchmarked the performance of the Ag@Pd—Ag nanocubes prepared with different co-titration volumes against the original Ag nanocubes at a fixed particle number of 1.5×10$^{10}$. FIG. 5.8B shows the extinction (normalized to the initial value) at the peak position of 4-NP (400 nm) as a function of time for four catalysts: Ag nanocubes, Ag@Pd nanocubes prepared with the addition of 0.2 mL Na$_2$PdCl$_4$, and Ag@Pd—Ag nanocubes obtained with co-titration volumes of 0.2 and 0.3 mL, respectively. Our results confirmed that the Pd deposited on the Ag nanocubes could accelerate the reduction reaction. It is worth noting that the co-deposition of Ag atoms during a co-titration process did not cause any significant change to the catalytic activity when comparing the two samples prepared using the same amount (e.g., 0.2 mL) of Na$_2$PdCl$_4$.

Finally, we leveraged the bifunctional property of the Ag@Pd—Ag nanocubes for in situ SERS monitoring of the Pd-catalyzed reduction of 4-NTP in a colloidal suspension. The Ag@Pd—Ag nanocubes were prepared with a co-titration volume of 0.2 mL for each precursor, and then incubated with a 4-NTP solution. After surface functionalization, we recorded a UV-vis spectrum for the 4-NTP-functionalized nanocubes (FIG. 5.9), which was essentially identical to that of the as-prepared Ag@Pd—Ag nanocubes. This result confirms the preservation of sharpness for the corners and edges during surface functionalization. We then added NaBH$_4$ into the colloidal suspension to initiate the catalytic reaction, followed by the collection of SERS spectra at different reaction times. At t=0, FIG. 5.4A shows the SERS spectrum of 4-NTP with three characteristic vibrational bands (marked by dashed orange lines) at 1108 (O—N—O stretching), 1336 (O—N—O stretching), and 1572 cm$^{-1}$ (phenol-ring mode),[9] respectively. As the reaction progressed, the intensities of these bands decreased progressively in 10 min with the concomitant emergence of a new band corresponding to the phenol-ring mode of 4-ATP at 1591 cm$^{-1}$ (marked by a dashed black line). It is worth noting that the other vibrational modes shown in the SERS spectra can also be assigned to those shown in the Raman spectra of 4-NTP and 4-ATP (FIG. 5.10 and Table 5.3). In order to rule out the photo-induced reduction of 4-NTP to 4-ATP, we recorded the time-dependent SERS spectra of 4-NTP-functionalized Ag@Pd—Ag nanocubes in the absence of NaBH$_4$ upon continuous laser irradiation. As shown in FIG. 5.11, the SERS spectra remained the same after the illumination with 532 nm laser for 30 min. We also used in situ SERS to monitor the reduction of 4-NTP in the presence of Ag nanocubes as a catalyst (FIG. 5.4B). After 60 min, the SERS spectra remained essentially the same, indicating that the Ag nanocubes were unable to catalyze this reaction. Furthermore, we used the Ag@Pd nanocubes for in situ SERS monitoring. As shown in FIG. 5.12, these nanocubes only with Pd deposited on the surfaces could also accelerate the reaction rate. However, the SERS peak intensities were weaker in comparison with those of the Ag@Pd—Ag nanocubes, which is consistent with the results shown in FIG. 5.3B. Collectively, these results reiterate the critical roles of Pd and Ag atoms for enhancing catalytic and SERS activities, respectively.

TABLE 5.2

The Pd and Ag contents in the as-prepared Ag@Pd-Ag nanocubes (i.e., the solid product collected from a synthesis).

| Volume of the two precursors (mL) | Mass of Pd$^a$ mg (×10$^{-4}$) | Mass of Ag$^a$ mg (×10$^{-4}$) | Pd content$^b$ (wt %) |
|---|---|---|---|
| 0.1, 0.1 | 11.1 | 491 | 2.21 ± 0.22 |
| 0.2, 0.2 | 20.8 | 551 | 3.63 ± 0.26 |
| 0.3, 0.3 | 28.3 | 584 | 4.63 ± 0.30 |
| 0.5, 0.5 | 46.6 | 595 | 7.27 ± 0.19 |

$^a$Measured using ICP-MS.
$^b$The Pd weight percentage (wt %) was calcualted from the mass ratio of Pd to Ag + Pd in the solid, the standard deviations were obtained from three experimental runs.

TABLE 5.3

The SERS and normal Raman shifts of 4-ATP and 4-NTP and their assignments.

| | SERS (cm$^{-1}$) | Normal Raman (cm$^{-1}$) | Assignment |
|---|---|---|---|
| 4-ATP | 1078 | 1080 | C—S stretching |
| 4-ATP | 1173 | 1170 | C—H in plane bending |
| 4-ATP | | 1494 | C—N stretching |
| 4-ATP | 1591 | 1594 | phenyl-ring mode |
| 4-NTP | 854 | 854 | C—H wagging |
| 4-NTP | 1080 | 1100 | C—S stretching |
| 4-NTP | 1108 | 1098 | O—N—O stretching |
| 4-NTP | 1336 | 1331 | O—N—O stretching |
| 4-NTP | 1572 | 1576 | phenyl-ring mode |

In conclusion, we have demonstrated a facile synthesis of Ag@Pd—Ag nanocubes through the co-titration of Na$_2$PdCl$_4$ and AgNO$_3$ into an aqueous suspension of Ag nanocubes in the presence of AA and PVP. We discovered that the Pd and Ag atoms were initially deposited on the edges, followed by surface diffusion to the corners and side faces of nanocubes. By simply controlling the titrated volumes of Pd and Ag precursors, we could control the ratio of Pd to Ag, and ultimately, integrate the optimal SERS and catalytic properties into a single nanocube for highly sensitive monitoring of Pd-catalytic reactions by SERS.

Experimental Section

Preparation of Ag Nanocubes:

The Ag nanocubes were prepared using a published protocol[13a] that included the use of silver trifluoroacetate (CF$_3$COOAg, Aldrich) and ethylene glycol (EG, J. T. Baker) as a precursor and a reducing agent (as well as a solvent), respectively. Firstly, 5 mL of EG was added into a 100 mL of round-bottom flask (ACE Glass) and heated to 150° C. in an oil bath under magnetic stirring. Next, 0.06 mL of 3 mM NaHS (in EG, Aldrich) was quickly injected. After the reaction had progressed for 2 min, 0.5 mL of 3 mM HCl (in EG, Aldrich) and 1.25 mL of 20 mg/mL poly(vinyl pyrrolidone) (PVP-55, MW≈55,000, Aldrich, in EG) were sequentially introduced into the flask. After another 2 min, 0.4 mL of 282 mM CF$_3$COOAg (in EG) was injected. During the entire procedure, the flask was capped with a glass stopper, except for the introduction of reagents. After the major LSPR peak of the Ag nanocubes had shifted to 436 nm, the flask was immersed in an ice-water bath to terminate the reaction. The nanocubes were washed with acetone and deionized (DI) water three times through centrifugation and re-dispersion, followed by the dispersion in DI water for further use.

Synthesis of Ag@Pd—Ag Nanocubes:

In a standard synthesis, we introduced 2 mL of 1 mM PVP-29 (MW≈29,000) aqueous solution into a 23 mL of glass vial, followed by the addition of 0.5 mL of ascorbic acid (100 mM, in DI water) and 8 µL of the aqueous suspension of Ag nanocubes (1.01×10$^{11}$ particles) under magnetic stirring. Next, we co-titrated different volumes of Na$_2$PdCl$_4$ (0.2 mM) and AgNO$_3$ (0.1 mM) aqueous solutions into the vial at a rate of 0.02 mL/min with the assistance of a syringe pump. After reaction for another 1 h, we collected the products by centrifugation at 8,000 rpm for 15 min, washed with DI water three times, and then dispersed them in DI water for further use. The etching of Ag from the Ag@Pd—Ag nanocubes was carried out by mixing the as-obtained sample (3.7×10$^{10}$ particles in total) with 1 mL of 2.3% aqueous H$_2$O$_2$ at room temperature for 1 h. The resultant nanostructures were washed twice with DI water and dispersed in DI water for TEM characterization.

Synthesis of Ag@Pd Nanocubes:

We followed the standard procedure for the synthesis of Ag@Pd—Ag nanocubes, except that the co-titration of 0.1 mM AgNO$_3$ and 0.2 mM Na$_2$PdCl$_4$ was replaced by the titration of 0.2 mM Na$_2$PdCl$_4$ solution.

SERS Measurements:

The nanocubes were mixed with 1 mL of ethanol containing 1,4-BDT (0.6 mM) at room temperature for 1 h. The 1,4-BDT-functionalized nanocubes were washed with DI water twice and dispersed in DI water to achieve a concentration of approximately 1.87×10$^{10}$ particles/mL. The SERS spectra were recorded from solution phase with a 100× objective lens. The collection time was 30 s for all samples, together with a power of 50 mW for the 532 nm excitation laser. A sample cell was fabricated by attaching a polydimethylsiloxane (PDMS) block with a small cavity capable of holding 20 µL of liquid sample to a glass slide. Upon the addition of liquid sample to fill the cavity, a glass cover slip with a thickness of 170 µm was placed carefully on the top of the PDMS cell to prevent solvent from evaporating. The surface of the cover slip also serves as a reference point from which the focal plane was positioned 200 µm into the sample for SERS measurements.

Nanocube-Catalyzed Reduction of 4-Nitrophenol:

Typically, 2 mL of 4-nitrophenol (4-NP, 0.2 M), 5 mL of DI water, and 1 mL of NaBH$_4$ (50 mg/mL, freshly prepared, ice-cold) were added into a 23 mL glass vial, followed by the addition of nanocubes, such as Ag nanocubes, Ag@Pd—Ag nanocubes, and Ag@Pd nanocubes with a fixed number at 1.5×10$^{10}$ particles, to initiate the reaction. We monitored the progress of the reaction by withdrawing 1 mL of the solution every 2 min for the collection of the corresponding UV-vis spectrum in the range of 250-550 nm. We then plotted the extinction at 400 nm versus time.

In Situ SERS Monitoring of Nanocube-Catalyzed Reduction of 4-Nitrothiophenol:

The Ag, Ag@Pd—Ag or Ag@Pd nanocubes were dispersed in 1 mL of ethanol containing 4-nitrothiophenol (4-NTP, 10$^{-6}$ M) and incubated at room temperature for 1 h. The 4-NTP-functionalized nanocubes were then washed with DI water twice and re-suspended in DI water to achieve a concentration of approximately 8.7×10$^{10}$ particles/mL. Upon mixing 100 µL of the nanocube suspension with 100 µL of 1 mg/mL aqueous NaBH$_4$ solution in a 1.5 mL centrifuge tube, the nanocube-catalyzed 4-NTP reduction proceeded at room temperature. We withdrew 20 µL of the reaction solution every 2 min and placed the sample in a PDMS sample cell for monitoring the progress of the reaction by SERS. The SERS spectra were recorded from the solution phase with a 5× objective lens. The data was collected with a collection time of 7 s for all samples at a power of 50 mW for the 532 nm excitation laser. Successive SERS spectra were collected during the reaction until the complete reduction of 4-NTP to 4-ATP. Normal Raman spectra were obtained from the powders of pure 4-NTP and 4-ATP supported on glass slides under the same conditions.

Instrumentation and Characterization:

Transmission electron microscopy (TEM) images were captured using a Hitachi HT7700 microscope (Hitachi, Japan) operated at 120 kV. The UV-vis spectra were collected using a Cary 50 spectrometer (Agilent Technologies, Santa Clara, Calif.). The Pd and Ag contents in each sample were analyzed using an inductively coupled plasma mass spectrometer (ICP-MS, NexION 300Q, PerkinElmer, Waltham, Mass.). A conventional centrifuge (Eppendorf 5430) was used for the collection and washing of the as-prepared samples. The SERS spectra were recorded using a Renishaw inVia Raman spectrometer coupled with a Leica microscope. The excitation wavelength was 532 nm and the scattered light was dispersed using a holographic notch filter with a grating of 1,200 lines/mm.

REFERENCES (1) (a) Zhu, W.; Michalsky, R.; Metin, Ö.; Lv, H.; Guo, S.; Wright, C. J.; Sun, X.; Peterson, A. A.; Sun, S. *J. Am. Chem. Soc.* 2013, 135, 16833; (b) Millstone, J. E.; Hurst, S. J.; Métraux, G. S.; Cutler, J. I.; Mirkin, C. A. *Small* 2009, 5, 646; (c) Xia, B. Y.; Wu, H. B.; Wang, X.; Lou, X. W. *Angew. Chem. Int. Ed.* 2013, 52, 12337; (d) Hu, Y.; Liu, Y.; Sun, Y. *Adv. Funct. Mater.* 2015, 25, 1638.

(2) (a) Heck, K. N.; Janesko, B. G.; Scuseria, G. E.; Halas, N. J.; Wong, M. S. *J. Am. Chem. Soc.* 2008, 130, 16592; (b) Xie, W.; Herrmann, C.; Kompe, K.; Haase, M.; Schlucker, S. *J. Am. Chem. Soc.* 2011, 133, 19302; (c) Kim, H.; Kosuda, K. M.; Van Duyne, R. P.; Stair, P. C. *Chem. Soc. Rev.* 2010, 39, 4820.

(3) (a) Kneipp, K.; Kneipp, H.; Itzkan, I.; Dasari, R. R.; Feld, M. S. *Chem. Rev.* 1999, 99, 2957; (b) Rycenga, M.; Cobley, C. M.; Zeng, J.; Li, W.; Moran, C. H.; Zhang, Q.; Qin, D.; Xia, Y. *Chem. Rev.* 2011, 111, 3669; (c) Yang, Y.; Zhong, X.-L.; Zhang, Q.; Blackstad, L. G; Fu, Z.-W.; Li, Z.-Y.; Qin, D. *Small* 2014, 10, 1430; (d) Jones, M. R.; Osberg, K. D.; Macfarlane, R. J.; Langille, M. R.; Mirkin, C. A. *Chem. Rev.* 2011, 111, 3736; (e) Xia, Y.; Xiong, Y.; Lim, B.; Skrabalak, S. E. *Angew. Chem. Int. Ed.* 2009, 48, 60.

(4) (a) Sherry, L. J.; Chang, S.-H.; Schatz, G C.; Van Duyne, R. P.; Willey, B. J.; Xia, Y. *Nano Lett.* 2005, 5, 2034; (b) McLellan, J. M.; Li, Z.-Y.; Siekkinen, A. R.; Xia, Y. *Nano Lett.* 2007, 7, 1013; (c) Rycenga, M.; Xia, X.; Moran, C. H.; Zhou, F.; Qin, D.; Li, Z.-Y.; Xia, Y. *Angew. Chem. Int. Ed.* 2011, 50, 5473.

(5) Cai, W.; Tang, X.; Sun, B.; Yang, L. *Nanoscale* 2014, 6, 7954.

(6) (a) Ruditskiy, A.; Choi, S.; Peng, H.-C.; Xia, Y. *MRS Bulletin* 2014, 39, 727; (b) Zhang, H.; Jin, M.; Xia, Y. *Chem. Soc. Rev.* 2012, 41, 8035; (c) Dasgupta, N. P.; Liu, C.; Andrews, S.; Prinz, F. B. Yang, P. *J. Am. Chem. Soc.* 2013, 135, 12932.

(7) (a) Zou, S.; Chan, H. Y. H.; Williams, C. T.; Weaver, M. J. *Langmuir* 2000, 16, 754; (b) Tian, Z.-Q.; Ren, B. *Annu. Rev. Phys. Chem.* 2004, 55, 197; (c) McLellan, J. M.; Xiong, Y.; Hu, M.; Xia, Y. *Chem. Phys. Lett.* 2006, 417, 230.

(8) Tian, Z.-Q.; Ren, B.; Li, J.-F.; Yang, Z.-L. *Chem. Commun.* 2007, 34, 3514.

(9) Huang, J.; Zhu, Y.; Lin, M.; Wang, Q.; Zhao, L.; Yang, Y.; Yao, K. X.; Han, Y. *J. Am. Chem. Soc.* 2013, 135, 8552.

(10) Jing, H.; Zhang, Q.; Large, N.; Yu, C.; Blom, D. A.; Nordlander, P.; Wang, H. *Nano Lett.* 2014, 14, 3674.

(11) Xia, X.; Wang, Y.; Ruditskiy, A.; Xia, Y. *Adv Mater.* 2013, 25, 6313.

(12) (a) Zhang, H.; Jin, M.; Liu, H.; Wang, J.; Kim, M. J.; Yang, D.; Xie, Z.; Liu, J.; Xia, Y. *ACS Nano* 2011, 5, 8212; (b) Jing, H.; Wang, H. *Chem. Mater* 2015, DOI: 10.1021/acs.chemmater.5b00199. (c) Mahmoud, M. A.; El-Sayed, M. A. *Langmuir* 2012, 28, 4051. (d) Zhang, W.; Yang, J.; Lu, X. *ACS Nano* 2012, 6, 7397.

(13) (a) Yang, Y.; Zhang, Q.; Fu, Z.-W.; Qin, D. *ACS Appl. Mater. Interfaces* 2014, 6, 3750; (b) Sanedrin, R. G.; Georganopoulou, D. G.; Park, S.; Mirkin, C. A. *Adv. Mater.* 2005, 17, 1027.

(14) (a) Jana, N. R.; Gearheart, L.; Murphy, C. J. *J. Phys. Chem. B* 2001, 105, 4065; (b) DeSantis, C. J.; Peverly, A. A.; Peters, D. G; Skrabalak, S. E. *Nano Lett.* 2011, 11, 2164; (c) Liu, X.; Yin, Y.; Gao, C. *Langmuir,* 2013, 29, 10559; (d) Xia, X.; Figueroa-Cosme, L.; Tao, J.; Peng, H.-C.; Niu, G; Zhu, Y.; Xia, Y. *J. Am. Chem. Soc.* 2014, 136, 10878; (e) Straney, P. J.; Marbella, L. E.; Andolina, C. M.; Nuhfer, N. T.; Millstone, J. E. *J. Am. Chem. Soc.* 2014, 136, 7873.

(15) (a) Xia, X.; Zeng, J.; Oetjen, L. K.; Li, Q.; Xia, Y. *J. Am. Chem. Soc.* 2012, 134, 1793; (b) Zhang, L.; Niu, W.; Gao, W.; Qi, L.; Lai, J.; Zhao, J.; Xu, G. *ACS Nano* 2014, 8, 5953; (c) Sau, T. K.; Murphy, C. J. *J. Am. Chem. Soc.* 2004, 126, 8648; (d) Wu, Y.; Wang, D.; Zhou, G.; Yu, R.; Chen, C.; Li, Y. *J. Am. Chem. Soc.* 2014, 136, 11594.

(16) (a) Wu, J.; Gao, W; Wen, J.; Miller, D. J.; Lu, P.; Zuo, J.-M.; Yang, H. *Nano Lett.* 2015, DOI: 10.1021/acs.nanolett.5b00414; (b) Weiner, R. G.; DeSantis, C. J.; Cardoso, M. B. T.; Skrabalak, S. E. *ACS Nano* 2014, 8, 8625; (c) Xia, X.; Xie, S.; Liu, M.; Peng, H.-C.; Lu, N.; Wang, J.; Kim, M. J.; Xia. Y. *Proc. Natl. Acad. Sci. USA* 2013, 110, 6669.

(17) Hu, J.-W.; Zhang, Y.; Li, J.-F.; Liu, Z.; Ren, B.; Sun, S.-G; Tian, Z.-Q.; Lian, T. *Chem. Phys. Lett.* 2005, 408, 354.

(18) Zhang, J.; Hou, C.; Huang, H.; Zhang, L.; Jiang, Z.; Chen, G.; Jia, Y.; Kuang, Q.; Xie, Z.; Zheng, L. *Small* 2013, 9, 538.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the measuring technique and the numerical value. In addition, the phrase "about 'x' to 'y'" includes "about 'x' to about 'y'".

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:
1. A structure comprising:
a core-shell nanostructure, wherein the core is a silver nanostructure, and wherein the shell is M-Ag, wherein M is selected from the group consisting of: Au, Pd, and Pt.

2. The structure of claim 1, wherein the silver nanostructure is selected from the group consisting of: a nanorod, a nanowire, a nano-sized polyhedron, and a nano-sized prism or thin plate.

3. The structure of claim 1, wherein the shell has a thickness of about one to ten atomic layers.

4. The structure of claim 2, wherein the nanowire has a diameter of about 5 to 25 nm and an aspect ratio of about 500 to 5000.

5. The structure of claim 2, wherein the nano-sized polyhedron has a length, a width, and a height of about 15 to 250 nm.

6. A structure comprising:
   a core-shell nanocube, wherein the core is a silver nanostructure, and wherein the shell is M-Ag, wherein M is selected from the group consisting of: Au, Pd, and Pt.

7. The structure of claim 6, wherein the shell has a thickness of about one to ten atomic layers.

8. The structure of claim 6, wherein the nanocube has a length, a width, and a height of about 15 to 250 nm.

* * * * *